US012733645B2

(12) United States Patent
Jennings

(10) Patent No.: US 12,733,645 B2
(45) **Date of Patent: *Sep. 15, 2026**

(54) PHYTOTOXIC MICRONUTRIENT COMBINATIONS FOR SELECTIVE CONTROL OF INVASIVE PLANT SPECIES

(71) Applicant: Edaphix, LLC, Bozeman, MT (US)

(72) Inventor: Stuart Jennings, Bozeman, MT (US)

(73) Assignee: Edaphix, LLC, Bozeman, MT (US)

( * ) Notice: Subject to any disclaimer, the term of this patent is extended or adjusted under 35 U.S.C. 154(b) by 117 days.

This patent is subject to a terminal disclaimer.

(21) Appl. No.: 16/988,553

(22) Filed: Aug. 7, 2020

(65) Prior Publication Data

US 2021/0037830 A1 Feb. 11, 2021

Related U.S. Application Data

(60) Provisional application No. 62/883,729, filed on Aug. 7, 2019.

(51) Int. Cl.

| | |
|---|---|
| ***A01N 59/14*** | (2006.01) |
| ***A01N 25/32*** | (2006.01) |
| ***A01N 33/04*** | (2006.01) |
| ***C05G 3/60*** | (2020.01) |

(52) U.S. Cl.

CPC ............. *A01N 59/14* (2013.01); *A01N 25/32* (2013.01); *A01N 33/04* (2013.01); *C05G 3/60* (2020.02)

(58) Field of Classification Search

CPC ........ A01N 59/14; A01N 37/44; A01N 39/04; A01N 43/40; A01N 43/50; A01N 43/66; A01N 47/36; A01N 57/20; A01N 59/16

See application file for complete search history.

(56) References Cited

U.S. PATENT DOCUMENTS

| | | | | |
|---|---|---|---|---|
| 2,544,141 | A | 3/1951 | Donleavy | |
| 2,618,545 | A | 11/1952 | Newcomer | |
| 2,626,211 | A * | 1/1953 | Sowa | A01N 59/16 504/187 |
| 2,894,020 | A | 7/1959 | McManimie | |
| 2,993,923 | A | 7/1961 | Warner et al. | |
| 3,004,844 | A * | 10/1961 | Stahler | A01N 59/14 504/122 |
| 3,034,949 | A | 5/1962 | Ryker | |
| 3,064,025 | A | 11/1962 | Warner et al. | |
| 3,429,687 | A | 2/1969 | Weil | |
| 5,180,415 | A | 1/1993 | Omid | |
| 6,972,273 | B2 | 12/2005 | Sedun et al. | |
| 7,112,806 | B2 | 9/2006 | Lussier | |
| 8,835,355 | B2 | 9/2014 | Jennings | |
| 9,096,478 | B2 * | 8/2015 | Jennings | C05D 9/02 |
| 9,377,404 | B2 | 6/2016 | Takayama et al. | |
| 9,416,363 | B2 | 8/2016 | Ader et al. | |
| 9,578,884 | B2 | 2/2017 | Kennedy | |
| 9,775,357 | B2 * | 10/2017 | Jennings | A01N 59/20 |
| 10,018,999 | B2 | 7/2018 | Seo | |
| 10,028,452 | B2 | 7/2018 | Workman et al. | |
| 10,182,572 | B2 | 1/2019 | Cobb | |
| 10,234,439 | B2 | 3/2019 | Sutton | |
| 10,251,399 | B2 * | 4/2019 | Jennings | A01N 59/14 |
| 10,681,913 | B2 * | 6/2020 | Jennings | C05D 9/02 |
| 11,357,232 | B2 * | 6/2022 | Jennings | C05G 3/60 |
| 2010/0016158 | A1 * | 1/2010 | Kilian | A01N 43/68 504/133 |
| 2012/0088666 | A1 | 4/2012 | Gan | |
| 2014/0031221 | A1 * | 1/2014 | Yerkes | A01N 43/40 504/130 |
| 2014/0200143 | A1 * | 7/2014 | Jennings | C05D 9/02 504/187 |
| 2014/0342911 | A1 | 11/2014 | Jennings | |
| 2015/0351407 | A1 | 12/2015 | Jennings | |
| 2017/0318815 | A1 | 11/2017 | Jennings | |
| 2018/0110231 | A1 * | 4/2018 | Oeser | A01N 43/68 |
| 2018/0289008 | A1 * | 10/2018 | Sebastian | A01N 43/68 |
| 2019/0183128 | A1 | 6/2019 | Jennings | |
| 2019/0185390 | A1 | 6/2019 | Shirley, Jr. et al. | |
| 2020/0123075 | A1 | 4/2020 | Al et al. | |
| 2020/0187504 | A1 | 6/2020 | Jennings | |
| 2020/0260735 | A1 | 8/2020 | Jennings | |
| 2022/0272983 | A1 | 9/2022 | Jennings | |
| 2024/0188568 | A1 | 6/2024 | Jennings | |

FOREIGN PATENT DOCUMENTS

| | | | |
|---|---|---|---|
| DE | 102006033828 | A1 | 1/2008 |
| EP | 1563734 | A1 | 8/2005 |
| GB | 1 589 362 | | 5/1981 |
| JP | H01157904 | A | 6/1989 |
| JP | H03264506 | A | 11/1991 |
| JP | H05271024 | A | 10/1993 |
| JP | 2009-240230 | A | 10/2009 |

(Continued)

OTHER PUBLICATIONS

Ehow (https://web.archive.org/web/20100519193634/https://www.ehow.com/how_4868846_use-ammonia-fertilizer.html), no pagination. (Year: 2010).*

Borax (https://agriculture.borax.com/resources/agronomy-notes/soil-and-crop-issues/does-manure-contain-enough-boron), no pagination, no date.*

Indaziflam (https://www3.epa.gov/pesticides/chem_search/ppls/000432-01518-20190402.pdf), Apr. 2, 2019, p. 1-22. US EPA pesticide product label for Indaziflam. (Year: 2019).*

Sebastian et al. (Rangeland Ecology and Mgmt, 2016, 69, 195-198) (Year: 2016).*

Sukhoverkov et al. (https://www.biorxiv.org/content/10.1101/2021.02.08.430187v2.full), BioRxiv (the preprint server for Biology), posted Feb. 24, 2021, p. 1-22. (Year: 2021).*

(Continued)

*Primary Examiner* — Erin E Hirt

(74) *Attorney, Agent, or Firm* — Weatherly IP Solutions, LLC; Karen P. Bechtold; James M. Weatherly

(57) ABSTRACT

This disclosure provides compositions or combinations of (A) phytotoxic micronutrients and (C) agricultural compositions and their use for selectively and effectively controlling invasive plants.

9 Claims, 4 Drawing Sheets

(56) References Cited

FOREIGN PATENT DOCUMENTS

| | | | |
|---|---|---|---|
| NZ | 270128 | A | 5/1996 |
| SU | 1634198 | A1 | 3/1991 |
| WO | WO 2014/113475 | A1 | 7/2014 |
| WO | 2022221270 | A1 | 10/2022 |

OTHER PUBLICATIONS

Virginia Polytechnic, Pest Management Series 5, Extension Division: "Chemical control of Brush and Weeds in forests and non-crop areas", 1977, p. 1-11, (https://vtechworks.lib.vt.edu/server/api/core/bitstreams/6a97c923-d20a-4274-90a7-d388b271). (Year: 1977).*
Lee, Chiwon W., et al. "Micronutrient Toxicity in Seed Geranium (Pelargonium × hortorum Bailey)." J. Amer. Soc . Hort. Sci. (1996); 121(1): 77-82.
International Search Report and Written Opinion for International Application No. PCT/US2022/024408, dated Jun. 29, 2022, 7 pages.
Jarosz, Z. et al. "Fluoride Toxiciy Limit-Can the Element Exert a Positive Effect on Plants?" Sustainability, Nov. 1, 2021, 13(12065):1-10.
Pscheidt, J. "Fluorine Toxicity in Plants," Pacific Northwest Plant Disease Management Handbook, downloaded from internet at https://pnwhandbooks.org/node/273 on Sep. 30, 2022, 3 pages.
Anonymous, "Weed Killer Made With Borax," http://www.gardenguides.com/102157-weed-killer-made-borax.html (retrieved Mar. 7, 2014), 2 pages.
Beck, et al., "Invasive Species Defined in a Policy Context: Recommendations from the Federal Invasive Species Advisory Committee". Invasive Plant Science and Management (Oct. 1, 2008); 1(4): 414-421.
Choi, et al., "Micro nutrient toxicity in French marigold." J. Plant Nut. (1996); 19(6): 901-916.
Collier, Jr., Clifford, "Liming the Lawn", Cooperative Extension Service (1984); publication 502, 2 pages.
Dahiya, et al., "Allelopathy for sustainable weed management". Journal of Pharmacognosy and Phytochemistry (2017); SP1: 832-837.
Fageria, et al., "Foliar Fertilization of Crop Plants." Journal of Plant Nutrition (May 2009); 32(6): 1044-1064.
Fernández and Eichert, "Uptake of Hydrophilic Solutes Through Plant Leaves: Current State of Knowledge and Perspectives of Foliar Fertilization", Critical Reviews in Plant Sciences (2009); 28(1-2): 36-68.
Flanigan, A., "Homemade Borax-Based Weed Killer", Updated Nov. 28, 2018, 3 pages, retrieved from https://homeguides.sfgate.com/homemade-boraxbased-weed-killer-46378.html A51.
Forbes and Gelman, "Copper and other minerals in herbage species and varieties on copper-deficient soils." Grass and Forage Science (1981); 36(1): 25-30.
Anonymous, Gardenguides.com skellog Apr. 4, 2008, pp. 1-5.
Hammer, P.A. and Bailey, D.A., "Poinsettia tolerance of molybdenum." HortScience (1987); 22: 1284-1285.
Hanley and Weinard, "The chemical eradication of lawn weeds." Proc Amer Soc Hort Sci (1937) (1938); 35: 845-849.
Kabata, et al., "Trace Elements in Soils and Plants." Third Edition. (2001); CRC Press, pp. 169-179.
Keren, R. and Bingham, F.T., "Boron in water, soils, and plants." Adv. Soil Sci. (1985); 1: 230-276.
Lee, Chiwon W., et al. "Micronutrient Toxicity in Seed Geranium (Pelargonium x hortorum Bailey)," J. Amer. Soc. Hort. Sci. (1996); 121(1): 77-82.
Llambí, et al., "Ecophysiology of Dominant Plant Species during Old-Field Succession in a High Tropical Andean Ecosystem", Arctic, Antarctic, and Alpine Research (2003); 35(4): 447-453.
Marousky, F.J. "Symptomatology of fluoride and boron injury in Lilium longiflorum." J. Amer. Soc. Hort. Sci. (1981); 106: 341-344.
McLendon and Redente, "Effects of nitrogen limitation on species replacement dynamics during early secondary succession on a semiarid sagebrush site". Oecologia (1992); 91: 312-317.
Munshower, et al., "Relative Boron Tolerance of Some Western Revegetation Species", Proceedings America Society of Mining and Reclamation (2006); pp. 553-562.
Olff, et al., "Species dynamics and nutrient accumulation during early primary succession in coastal sand dunes". Journal of Ecology (1993); 81: 693-706.
Patil, et al., "Foliar application of nutrients". Marumegh (2018); 3(1): 49-53.
Ripa, A.K., et al., "Growing conditions of lawn grasses along highways and recommendations for their creation and maintenance." Latvijas Psr Zinatnu Akademijas Vestis (1979), No. 7, pp. 110-117, with English Abstract.
Shurkhno et al. "Activity of the Rhizosphere of Perennial Leguminous Grasses under Conditions of Biological Agriculture." Russian Agricultural Sciences (2008); vol. 34, No. 6, pp. 389-392.
Silversides, W.H., "The Rate and Mode of Penetration of Herbicides. I. Copper Nitrate Solutions." Canadian Journal of Agricultural Science (1940); 20 (7): 419-423.
Smetanka, M.J., "Some 'organic' weed-control remediesaren't as safe as they sound", Aug. 29, 2015, 2 pages, retrieved from https://www.startribune.com/some-organic-weed-control-remedies-aren-t-as-safe-as-they-sound/323254201/.
Tukey, et al., "Absorption of nutrients by stems and branches of woody plants". Science (Aug. 15, 1952); 116(3007): 167-168.
Waraich, et al., "Foliar Applied Phosphorous Enhanced Growth, Chlorophyll Contents, Gas Exchange Attributes and PUE in Wheat (*Triticum aestivum* L.)", Journal of Plant Nutrition (2015); 38(12): 1929-1943.
Bangsund, Dean A., and F. Larry Leistritz. "Economic impacts of leafy spurge on grazing lands in the Northern Great Plains." NDSU Agriculture Economic Report No. 275-S (Nov. 1991), pp. 1-10.
Elliot, George C. and Paul V. Nelson, "Acute boron toxicity in Begonia X hiemalis 'Schwabenland Red'," Communications in Soil Science and Plant Analysis (1981); 12(8): 775-783.
Maxwell, B.D., et al., "Predicting the Evolution and Dynamics of Herbicide Resistance in Weed Populations". Weed Technology (1990); 4(1): 2-13.
Nable, R.O., et al., "Boron toxicity". Plant Soil (1997); 193(12): 181-198.
Pedrini, S., et al., "Seed Coating: Science or Marketing Spin?" Trends in Plant Science (Feb. 2017); 22(2): 106-116.
Pimentel, D., et al., "Economic and environmental threats of alien plant, animal, and microbe invasions". Agriculture, Ecosystems & Environment (2001); 84(1): 1-20.
Pimentel, D., et al., "Update on the environmental and economic costs associated with alien-invasive species in the United States". Ecological Economics (2005): 52(3): 273-288.
Reid, R., Identification of boron transporter genes likely to be responsible for tolerance to boron toxicity in wheat and barley. Plant Cell Physiol. (Dec. 2007); 48(12): 1673-1678.
Yamada, T., et al., "Glyphosate interactions with physiology, nutrition, and diseases of plants: Threat to agricultural sustainability?" European Journal of Agronomy (2009); 31(3): 111-113.
AFCP 2.0 and Amendment After Final for U.S. Appl. No. 15/655,004 mailed Oct. 26, 2018, 10 pages.
AFCP 2.0, Amendment After Final, and 1.132 Declaration for U.S. Appl. No. 14/038,006 submitted Jun. 16, 2014, 39 pages.
AFCP 2.0, Amendment After Final, and Terminal Disclaimer for U.S. Appl. No. 16/714,177 submitted May 3, 2023, 36 pages.
Amendment and Terminal Disclaimer for U.S. Appl. No. 16/281,401 submitted Jan. 28, 2020, 11 pages.
Amendment and Terminal Disclaimer for U.S. Appl. No. 16/868,118 submitted Nov. 1, 2021, 15 pages.
Amendment for U.S. Appl. No. 14/038,006 submitted Feb. 4, 2014, 21 pages.
Amendment for U.S. Appl. No. 14/760,905 submitted Feb. 9, 2017, 8 pages.
Amendment for U.S. Appl. No. submitted Jun. 21, 2018, 20 pages.
Amendment for U.S. Appl. No. 16/714,177 submitted Sep. 30, 2022, 19 pages.

(56) References Cited

OTHER PUBLICATIONS

Amendment Under 37 CFR 1.312 After Allowance for U.S. Appl. No. 14/451,946 submitted Apr. 29, 2015, 11 pages.
Amendment Under 37 CFR 1.312 After Allowance for U.S. Appl. No. 14/760,905 submitted Jul. 12, 2017, 15 pages.
Corrected Supplement Notice of Allowability for U.S. Appl. No. 14/760,906 mailed May 4, 2017, 5 pages.
Crafts, A., et al, "The herbicidal properties of boron compounds," Hilgardia, vol. 10, No. 10, pp. 343-374 (1936).
Final Office Action for U.S. Appl. No. 14/038,006 mailed Mar. 25, 2014, 8 pages.
Final Office Action for U.S. Appl. No. 15/855,004 malled Sep. 20, 2016, 9 pages.
Final Office Action for U.S. Appl. No. 16/714,177 mailed Jan. 3, 2023, 25 pages.
International Search Report PCT Appl. No. PCT/US2014/011680, 6 pages (Jun. 10, 2014).
Non-Final Office Action for U.S. Appl. No. 14/038,006 mailed Dec. 17, 2013, 10 pages.
Non-Final Ofice Action for U.S. Appl. No. 14/451,946 mailed Dec. 18, 2014, 9 pages.
Non-Final Office Action for U.S. Appl. No. 14/760,905 mailed Nov. 17, 2016, 10 pages.
Non-Final Office Action for U.S. Appl. No. 15/655,004 mailed Feb. 21, 2018, 8 pages.
Non-Final Office Action for U.S. Appl. No. 16/281,401, malled Oct. 29, 2019, 11 pages.
Non-Final Office Action for U.S. Appl. No. 16/714,177 mailed Jun. 2, 2022, 24 pages.
Non-Final Office Action for U.S. Appl. No. 16/714,177 mailed Jun. 21, 2023, 28 pages.
Non-Final Office Action for U.S. Appl. No. 16/868,118, mailed Aug. 2, 2021, 14 pages.
Non-Final Office Action for U.S. Appl. No. 17/737,708 mailed May 24, 2023, 14 pages.
Notice of Allowance for U.S. Appl. No. 14/038,006 mailed Jul. 9, 2014, 12 pages.
Notice of Allowance for U.S. Appl. No. 14/451,946 mailed Mar. 31, 2016, 8 pages.
Notice of Allowance for U.S. Appl. No. 14/760,905 mailed Apr. 20, 2017, 9 pages.
Notice of Allowance for U.S. Appl. No. 15/655,004 mailed Nov. 23, 2018, 9 pages.
Notice of Allowance for U.S. Appl. No. 16/281,401 mailed Feb. 7, 2020, 9 pages.
Notice of Allowance for U.S. Appl. No. 16/868,118 mailed Feb. 9, 2022, 8 pages.
Partial International Search Report, PCT appl. No, PCT/US2014/011690, 4 pages (Mar. 20, 2014).
Response to Restriction Requirement for U.S. Appl. No. 16/714,177 submitted Mar. 7, 2022, 5 pages.
Restriction Requirement for U.S. Appl. No. 16/714,177 mailed Jan. 6, 2022, 6 pages.
Supplemental Correct Notice for U.S. Appl. No. 14/451,946 mailed May 14, 2016, 4 pages.
Terminal Disclaimer for U.S. Appl. No. 14/451,946 submitted Mar. 18, 2015, 8 pages.
Paull, J.G. et al. "Responses of wheat and barley genotypes to toxic concentrations of soil boron," Euphytica, 1988, 39:137-144.
Indaziflam GRZ (https://ordspub.epa.gov/ords/pesticides/f?p=PPLS:102:::NO::102_REG_NUM:432-1609), Jun. 15, 2020, p. 1-14.
US EPA pesticide product label for Indaziflam GRZ. (2020).
Lawrence et al., "RejuvraTM: A New Herbicide for Battling Cheatgrass," University of Nebraska-Lincoln, Institute of Agriculture and Natural Resources, Cropwatch, 5 pages (Oct. 7, 2020), retrieved from https://cropwatch.unl.edu/2020/rejuvra-new-herbicide-battling-cheatgrass/.
Advisory Action for U.S. Appl. No. 16/714,177 mailed Jul. 31, 2024, 3 pages.
Advisory Action for U.S. Appl. No. 16/714,177 mailed Oct. 1, 2025, 5 pages.
Amendment After Final for U.S. Appl. No. 16/714,177 submitted Aug. 28, 2025, 15 pages.
Amendment After Final for U.S. Appl. No. 16/714,177 submitted Jul. 8, 2024, 232 pages.
Amendment for U.S. Appl. No. 16/714,177 submitted Jan. 13, 2025, 31 pages.
Amendment for U.S. Appl. No. 16/714,177 submitted Sep. 21, 2023, 26 pages.
Final Office Action for U.S. Appl. No. 16/714,177 mailed Apr. 29, 2025, 32 pages.
Final Office Action for U.S. Appl. No. 16/714,177 mailed May 7, 2024, 22 pages.
Non-Final Office Action for U.S. Appl. No. 16/714,177 mailed Aug. 29, 2024, 38 pages.
Non-Final Office Action for U.S. Appl. No. 16/714,177 mailed Sep. 13, 2024, 44 pages.
Notice of Abandonment for U.S. Appl. No. 16/714,177 mailed Nov. 14, 2025, 3 pages.
RCE Application and Response to Advisory Action for U.S. Appl. No. 16/714,177 submitted Jul. 31, 2024, 235 pages.
Sukhoverkov, et al., "A systematic approach for finding herbicide synergies," BioRxiv, posted Feb. 24, 2020, doi: https://doi.org/10.1101/2021.02.08430187, p. 1-22 (2020).
Supplemental Amendment After Final for U.S. Appl. No. 16/714,177 submitted Jul. 9, 2024, 8 pages.
Terminal Disclaimer for U.S. Appl. No. 16/714,177 submitted Jan. 13, 2025, 6 pages.

* cited by examiner

PHYTOTOXIC MICRONUTRIENT COMBINATIONS FOR SELECTIVE CONTROL OF INVASIVE PLANT SPECIES

CROSS REFERENCE TO RELATED APPLICATIONS

This application claims the benefit of priority to U.S. Provisional Patent Application No. 62/883,729, filed on Aug. 7, 2019, the entire contents of which are herein incorporated by reference.

FIELD OF THE DISCLOSURE

This disclosure relates to compositions, combinations, kits comprising a phytotoxic micronutrient and an agricultural composition, and their use for the control and eradication of invasive plant species (i.e., weeds) (e.g., dandelion, spotted knapweed, cheatgrass and others).

BACKGROUND OF THE DISCLOSURE

Invasive weeds are a serious worldwide problem and about 5% of the world economy 01.4 trillion) is spent annually on control. The approach to weed control currently used is ineffective, expensive and causes excessive harm to the environment. The current global practice for weed control involves spraying chemical weed control formulations, including synthetic herbicides derived from petrochemicals, on the live, above ground tissue of growing plants to selectively disrupt the physiological processes of the plant.

Invasive species are adapted to nutrient-poor soils and out-compete desirable native vegetation once established. As the human population has swelled from 1 billion to more than 7 billion people over the past 200 years, no corner of the globe has been spared from land disturbances including grazing, mining, logging, fires, road building, urbanization, and crop production. In many cases, land disturbances are severe and native soils have become depleted of nutrients (i.e. disturbed) resulting in a net ecological shift away from soils in geochemical equilibrium with the occupying plant community toward invasive species dominated soils with low fertility.

Plant-soil equilibrium exists through recycling of soil nutrients by decay of above ground biomass. Disequilibrium occurs when the above ground biomass is removed (e.g. heavy grazing or fire) and return of nutrients to the soil greatly reduced. The net condition of global soil is one of declining health and mining of soil nutrients without replacement. Declining soil health, declining plant production and invasion by weeds are the result. Agrarian societies dependent on agriculture output are diminished and made less secure.

In order to address this long-felt need for selectively controlling invasive plant species on disturbed lands, the present disclosure provides compositions and combinations comprising phytotoxic micronutrients as well as methods and systems for the controlling invasive species using the phytotoxic micronutrient compositions and combinations.

SUMMARY OF THE DISCLOSURE

The present disclosure provides a method of selectively controlling the growth of at least one invasive plant species. In one embodiment, the method provides controlling the growth of at least one invasive plant species in a perennial grass plant community or a perennial grass community rangeland or pastureland. In one embodiment, the method disclosed herein uses compositions and combinations comprising a phytotoxic micronutrient and an agricultural composition comprising a micronutrient, a macronutrient, a synthetic herbicide, a biological compound or a related carbon-based organic compound, an inorganic compound, a seed, a seed coating, or a seed inoculant.

In one embodiment, the present disclosure relates to methods for selectively controlling the growth of at least one invasive plant species existing in a perennial grass plant community, comprising applying: (i) a phytotoxic micronutrient; and (ii) an agricultural composition comprising one or more ingredients selected from a) a micronutrient; b) a macronutrient; c) an adjuvant; d) a synthetic herbicide; e) a biological compound or a related carbon-based organic compound; f) an inorganic compound; or g) a seed, a seed coating, or a seed inoculant.

In one embodiment, the present disclosure relates to methods for negatively impacting the growth of at least one invasive plant species, including the selective control of the invasive plant species, existing in a perennial grass plant community, while preserving the perennial grass plant community species, comprising applying: (i) a phytotoxic micronutrient; and (ii) an agricultural composition comprising one or more ingredients selected from a) a micronutrient; b) a macronutrient; c) an adjuvant; d) a synthetic herbicide; e) a biological compound or a related carbon-based organic compound; f) an inorganic compound; or g) a seed, a seed coating, or a seed inoculant.

In one embodiment of any one of the methods disclosed herein, the phytotoxic micronutrient comprises boron or a copper. In one embodiment, the phytotoxic micronutrient comprises boron. In one embodiment of any one of the methods disclosed herein, the phytotoxic micronutrient is applied to achieve a water soluble boron concentration in the soil of the perennial grass plant community from about 3 milligrams per liter to about 50 milligrams per liter. In one embodiment, the phytotoxic micronutrient is applied at a rate of about 1 pound of elemental boron per one acre to about 150 pounds of elemental boron per one acre. In other embodiments, the phytotoxic micronutrient is applied at a rate of about 5, about 10, about 15, about 25, about 50, about 75, or about 100 pounds of elemental boron per one acre.

In one embodiment of any one of the methods disclosed herein, the phytotoxic micronutrient comprises boron, wherein the boron in the phytotoxic micronutrient is phytotoxic to the at least one invasive plant species while maintaining or increasing the growth and vigor of the perennial grass.

In one embodiment of any one of the methods disclosed herein, the at least one invasive species is selected from the group consisting of cheatgrass, dandelion, Canadian thistle, kochia, knotweed, poison ivy and spotted knapweed. In one embodiment of any one of the methods disclosed herein, the perennial grass plant community comprises bluebunch wheatgrass, Western wheatgrass, slender wheatgrass, Idaho fescue, sheep fescue, orchard grass, smooth brome, timothy or Kentucky bluegrass.

In one embodiment of any one of the methods disclosed herein, the micronutrient in the agricultural composition is selected from copper, zinc, iron, boron, manganese, molybdenum, or chlorine.

In one embodiment of any one of the methods disclosed herein, the macronutrient in the agricultural composition is selected from nitrogen, phosphorous, or potassium.

In one embodiment of any one of the methods disclosed herein, the agricultural composition further comprises an organic fertilizer or an inorganic fertilizer.

In one embodiment of any one of the methods disclosed herein, the organic fertilizer or the inorganic fertilizer comprises calcium, magnesium, sulfur, carbon, hydrogen or oxygen elements.

In one embodiment of any one of the methods disclosed herein, the adjuvant in the agricultural composition is selected from a wetting agent, an activator, a crop oil concentrate, a buffer, a marker dye or a surfactant.

In one embodiment of any one of the methods disclosed herein, the synthetic herbicide in the agricultural composition is formulated from petrochemicals. In one embodiment, the synthetic herbicide in the agricultural composition is from Table 2 or agriculturally acceptable salts, esters or amides thereof. In one embodiment, the synthetic herbicide in the agricultural composition is selected from glyphosate, 2-4D, imazapic, rimsulfuron, indaziflam, FeHEDTA, or aminopyralid.

In one embodiment of any one of the methods disclosed herein, the biological compound and related carbon-based organic compound in the agricultural composition are selected from fungus, spores, bacteria, soluble carbon-based solids or liquids (including sugar), organic matter, mycorrhizae, biochar, hydromulch, hydraulic mulch, waste products such as sawdust, manure, straw, corn stover, shells, hulls, or meal.

In one embodiment of any one of the methods disclosed herein, the inorganic compound in the agricultural composition is selected from lime, silica, aluminosilicate, gypsum, or sulfur compound.

In one embodiment of any one of the methods disclosed herein, the inorganic compound in the agricultural composition is selected from calcium carbonate, calcium magnesium carbonate, calcium oxide, calcium hydroxide, cementitious waste product, or calcium sulfate.

In one embodiment of anyone of the methods disclosed herein, the phytotoxic micronutrient and the agricultural composition is in a dry granular formulation or in a liquid formulation.

In one embodiment of any one of the methods disclosed herein, the agricultural composition comprises an adjuvant and the agricultural composition is in a liquid formulation.

In one embodiment of any one of the methods disclosed herein, the agricultural composition comprises the micronutrient. In one embodiment, the agricultural composition comprises the macronutrient. In one embodiment, the agricultural composition comprises the synthetic herbicide. In one embodiment, the agricultural composition comprises the biological compound or related carbon-based organic compound. In one embodiment, the agricultural composition comprises the inorganic compound. In one embodiment, the agricultural composition comprises the seed, the seed coating, or the seed inoculant.

In one embodiment of any one of the methods disclosed herein, the agricultural composition comprises a synthetic herbicide, wherein the agricultural composition is applied at a rate of about 1 ounce of the synthetic herbicide per one acre to about 100 ounces of the synthetic herbicide per one acre. In one embodiment, the agricultural composition is applied at a rate of about 1 ounce of the synthetic herbicide per one acre to about 70 ounces of the synthetic herbicide per one acre. In one embodiment, the synthetic herbicide is FeHEDTA and the agricultural composition is applied at a rate of about 900 ounces per one acre to about 2250 ounces per acre.

In one embodiment of any one of the methods disclosed herein, the phytotoxic micronutrient and the agricultural composition are applied simultaneously or sequentially.

In one embodiment of any one of the methods disclosed herein, the application of the phytotoxic micronutrient and the agricultural composition provides a synergistic effect in controlling the growth of at least one invasive plant, compared to when the phototoxic micronutrient or the agricultural composition is applied alone.

In one embodiment, the present disclosure relates to methods for selectively controlling the growth of at least one invasive plant species existing in a perennial grass plant community, comprising applying an composition comprising: i) a phytotoxic micronutrient; and ii) a synthetic herbicide.

In one embodiment, the present disclosure relates to methods for negatively impacting the growth of at least one invasive plant species, including the selective control of the invasive plant species, existing in a perennial grass plant community, while preserving the perennial grass plant community species, comprising applying an composition comprising: i) a phytotoxic micronutrient; and ii) a synthetic herbicide.

In one embodiment of any one of the methods disclosed herein, the composition further comprises one or more ingredients selected from: a) a micronutrient; b) a macronutrient; c) an adjuvant; d) a biological compound or a related carbon-based organic compound; e) an inorganic compound; or f) a seed, a seed coating, or a seed inoculant.

In one embodiment of any one of the methods disclosed herein, the phytotoxic micronutrient comprises boron or copper. In one embodiment, the phytotoxic micronutrient comprises boron. In one embodiment, the phytotoxic micronutrient comprises boron in about 10% to about 30% by weight. In one embodiment, the phytotoxic micronutrient is applied to achieve a water soluble boron concentration in the soil of the perennial grass plant community from about 3 milligrams per liter to about 50 milligrams per liter. In one embodiment, the phytotoxic micronutrient is applied at a rate of about 1 pound of elemental boron per one acre to about 150 pounds of elemental boron per one acre. In one embodiment, the phytotoxic micronutrient is applied at a rate of about 5, about 10, about 15, about 25, about 50, about 75, or about 100 pounds of elemental boron per one acre.

In one embodiment of any one of the methods disclosed herein, the boron in the phytotoxic micronutrient is phytotoxic to the at least one invasive plant species while maintaining or increasing the plant health, growth and/or vigor of the perennial grass plants. Plant health, growth and/or vigor can be measured in various ways well known to those skilled in the art, including but not limited to measuring various morphological, phenotypical and/or physiological traits. Such measurements can include growth rate, changes in plant height or width or bulk, changes in plant weight, flowering patterns, absence or presence of one or more plant diseases, intensity of plant color, onset of maturity, seed maturation rate, degree of wilting, amount or percentage of dead or dying cells, cell matrix potentials and interactions, rate of water update, transpiration rates, amount and activity levels of chlorophyll, absence or presence of metabolic compounds, etc. For examples of methods of measuring plant health see, e.g., U.S. Pat. Nos. 7,112,806; 10,018,999; 10,028,452; 10,234,439 and 9,377,404.

In one embodiment of any one of the methods disclosed herein, the at least one invasive species is selected from the group consisting of cheatgrass, dandelion, Canadian thistle, kochia, knotweed, poison ivy and spotted knapweed. In one embodiment of any one of the methods disclosed herein, the perennial grass plant community comprises bluebunch wheatgrass, Western wheatgrass, slender wheatgrass, Idaho fescue, sheep fescue, orchard grass, smooth brome, timothy or Kentucky bluegrass.

In one embodiment of any one of the methods disclosed herein, the micronutrient is selected from copper, zinc, iron, boron, manganese, molybdenum, or chlorine.

In one embodiment of any one of the methods disclosed herein, the macronutrient is selected from nitrogen, phosphorous, or potassium.

In one embodiment of any one of the methods disclosed herein, the composition further comprises an organic fertilizer or an inorganic fertilizer. In one embodiment, the organic fertilizer or the inorganic fertilizer comprises calcium, magnesium, sulfur, carbon, hydrogen or oxygen elements.

In one embodiment of any one of the methods disclosed herein, the adjuvant is selected from a wetting agent, an activator, a crop oil concentrate, a buffer, a marker dye or a surfactant.

In one embodiment of any one of the methods disclosed herein, the synthetic herbicide is formulated from petrochemicals. In one embodiment, the synthetic herbicide is from Table 2 or agriculturally acceptable salts, esters or amides thereof. In one embodiment, the synthetic herbicide is selected from glyphosate, 2-4D, imazapic, rimsulfuron, indaziflam, FeHEDTA, or aminopyralid.

In one embodiment of any one of the methods disclosed herein, the biological compound and related carbon-based organic compound is selected from fungus, spores, bacteria, soluble carbon-based solids or liquids (including sugar), organic matter, mycorrhizae, biochar, hydromulch, hydraulic mulch, waste products such as sawdust, manure, straw, corn stover, shells, hulls, or meal.

In one embodiment of any one of the methods disclosed herein, the inorganic compound is selected from lime, silica, aluminosilicate, gypsum, or sulfur compound. In one embodiment, the inorganic compound is selected from calcium carbonate, calcium magnesium carbonate, calcium oxide, calcium hydroxide, cementitious waste product, or calcium sulfate.

In one embodiment of any one of the methods disclosed herein, the composition is in a dry granular formulation. In one embodiment, the composition comprises an adjuvant and the agricultural composition is in a liquid formulation.

In one embodiment of any one of the methods disclosed herein, the composition comprises the micronutrient. In one embodiment, the composition comprises the macronutrient. In one embodiment, the composition comprises the synthetic herbicide. In one embodiment, the composition comprises the biological compound or related carbon-based organic compound. In one embodiment, the composition comprises the inorganic compound. In one embodiment, the composition comprises the seed, the seed coating, or the seed inoculant.

In one embodiment of any one of the methods disclosed herein, the phytotoxic micronutrient is in a dry granular form or in a liquid form.

In one embodiment of any one of the methods disclosed herein, the composition is applied at a rate of about 1 ounce of the synthetic herbicide per one acre to about 100 ounces of the synthetic herbicide per one acre. In one embodiment, the composition is applied at a rate of about 1 ounce of the synthetic herbicide per one acre to about 70 ounces of the synthetic herbicide per one acre. In one embodiment, the composition comprises FeHEDTA and the composition is applied at a rate of about 900 ounces per one acre to about 2250 ounces per acre.

In one embodiment of any one of the methods disclosed herein, the application of the composition comprising the phytotoxic micronutrient and the synthetic herbicide provides a synergistic effect in controlling the growth of at least one invasive plant, compared to when the phototoxic micronutrient or the synthetic herbicide is applied alone.

In one embodiment, the present disclosure relates to a composition comprising a phytotoxic micronutrient and a synthetic herbicide.

In one embodiment of any one of the composition disclosed herein, the composition further comprising one or more ingredients selected from: a) a micronutrient; b) a macronutrient; c) an adjuvant; d) a synthetic herbicide; e) a biological compound or a related carbon-based organic compound; f) an inorganic compound; or g) a seed, a seed coating, or a seed inoculant.

In one embodiment of any one of the composition disclosed herein, the phytotoxic micronutrient comprises boron or copper. In one embodiment, the phytotoxic micronutrient comprises boron. In one embodiment, the phytotoxic micronutrient comprises boron in about 10% to about 30% by weight.

In one embodiment of any one of the composition disclosed herein, the micronutrient is selected from copper, zinc, iron, boron, manganese, molybdenum, or chlorine. In one embodiment of any one of the composition disclosed herein, the macronutrient is selected from nitrogen, phosphorous, or potassium.

In one embodiment of anyone of the agricultural composition disclosed herein, the composition further comprising an organic fertilizer or an inorganic fertilizer. In one embodiment, the organic fertilizer or the inorganic fertilizer comprises calcium, magnesium, sulfur, carbon, hydrogen or oxygen elements.

In one embodiment of any one of the composition disclosed herein, the adjuvant is selected from a wetting agent, an activator, a crop oil concentrate, a buffer, a marker dye or a surfactant.

In one embodiment of any one of the composition disclosed herein, the synthetic herbicide is formulated from petrochemicals. In one embodiment, the synthetic herbicide is selected from Table 2 or agriculturally acceptable salts, esters or amides thereof. In one embodiment, the synthetic herbicide is selected from glyphosate, 2-4D, imazapic, rimsulfuron, indaziflam, FeHEDTA, or aminopyralid.

In one embodiment of any one of the composition disclosed herein, the biological compound and related carbon-based organic compound is selected from fungus, spores, bacteria, soluble carbon-based solids or liquids (including sugar), organic matter, mycorrhizae, biochar, hydromulch, hydraulic mulch, waste products such as sawdust, manure, straw, corn stover, shells, hulls, or meal.

In one embodiment of any one of the composition disclosed herein, the inorganic compound is selected from lime, silica, aluminosilicate, gypsum, or sulfur compound. In one embodiment, the inorganic compound is selected from calcium carbonate, calcium magnesium carbonate, calcium oxide, calcium hydroxide, cementitious waste product, or calcium sulfate.

In one embodiment of any one of the composition disclosed herein, the composition is in a dry granular form. In one embodiment, the composition comprises the adjuvant and the composition is a liquid.

In one embodiment of any one of the composition disclosed herein, the composition comprises the micronutrient. In one embodiment, the composition comprises the macronutrient. In one embodiment, the composition comprises the synthetic herbicide. In one embodiment, the composition comprises the biological compound or related carbon-based organic compound. In one embodiment, the composition comprises the inorganic compound. In one embodiment, the composition comprises the seed, the seed coating or the seed inoculant.

In one embodiment, the present disclosure relates to an agricultural kit comprising: (i) a phytotoxic micronutrient; and (ii) an agricultural composition comprising one or more ingredients selected from a) a micronutrient; b) a macronutrient; c) a synthetic herbicide; d) a biological compound or a related carbon-based organic compound; e) an inorganic compound; or f) a seed, a seed coating, or a seed inoculant.

In one embodiment of any one of the agricultural kit disclosed herein, the agricultural composition is a liquid formulation further comprising an adjuvant.

In one embodiment of any one of the agricultural kit disclosed herein, the phytotoxic micronutrient comprises boron.

In one embodiment of any one of the agricultural kit disclosed herein, the agricultural composition comprises a synthetic herbicide.

In one embodiment, the present disclosure relates to an agricultural combination comprising: (i) a phytotoxic micronutrient; and (ii) an agricultural composition comprising one or more ingredients selected from a) a micronutrient; b) a macronutrient; c) a synthetic herbicide; d) a biological compound or a related carbon-based organic compound; e) an inorganic compound; or f) a seed, a seed coating, or a seed inoculant.

In one embodiment of any one of the agricultural combination disclosed herein, the agricultural composition is a liquid formulation further comprising an adjuvant.

In one embodiment of any one of the agricultural combination disclosed herein, the phytotoxic micronutrient comprises boron.

In one embodiment of any one of the agricultural combination disclosed herein, the agricultural composition comprises a synthetic herbicide.

All patents, patent applications, provisional patent applications and publications referred to or cited herein, are incorporated by reference in their entirety to the extent they are not inconsistent with the teachings of the specification.

DETAILED DESCRIPTION OF DISCLOSURE

Figure 1:
FIG. 1 illustrates bluebunch wheatgrass seeds coated with a micronutrient slurry (made of B10 fertilizer).
Figure 2:
FIG. 2 illustrates bluebunch wheatgrass seeds coated with a micronutrient slurry (made of B20 fertilizer).
Figure 3:
FIG. 3 illustrates bluebunch wheatgrass seeds coated with a micronutrient slurry (made of B30 fertilizer).
Figure 4:
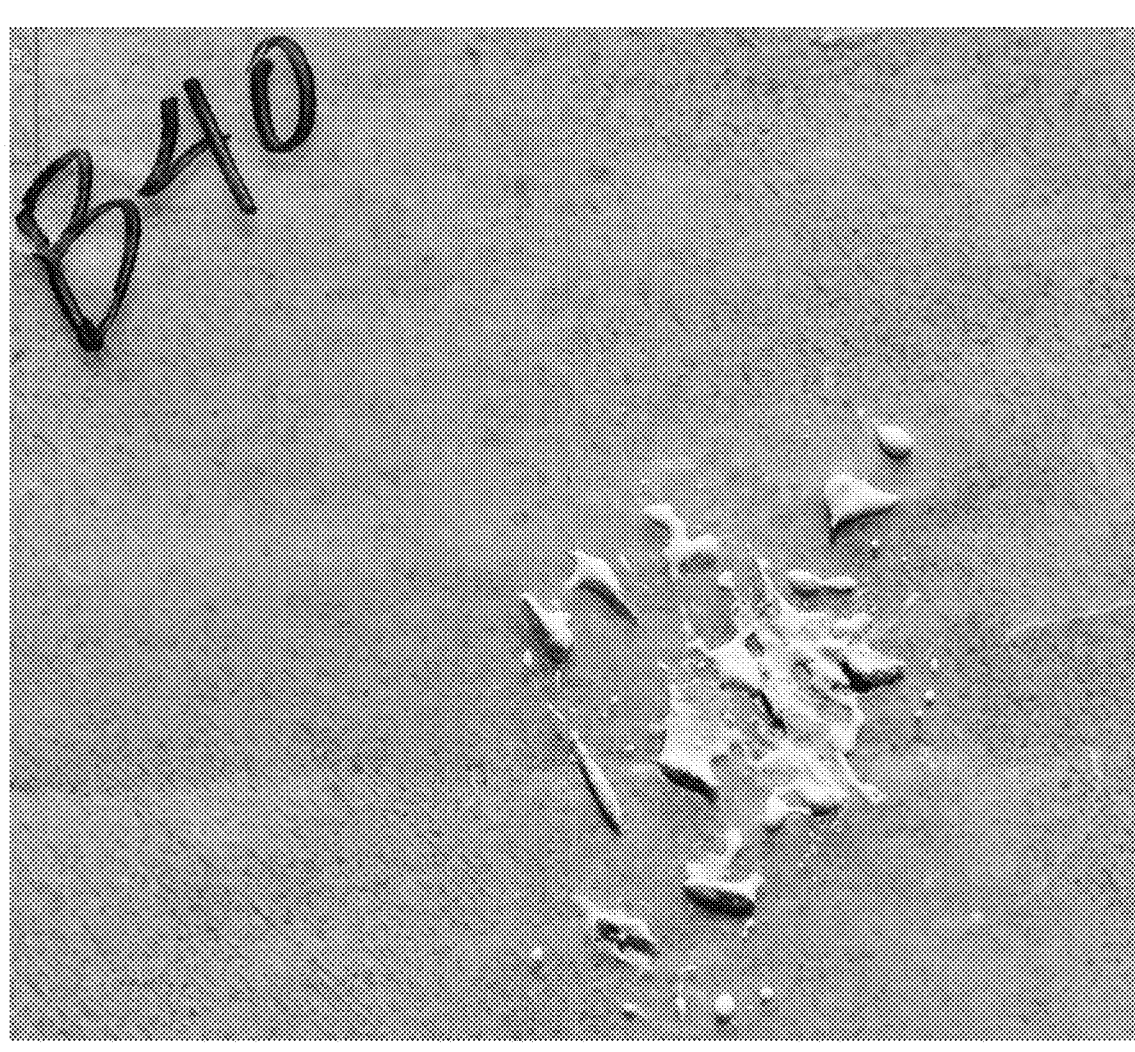
FIG. 4 illustrates bluebunch wheatgrass seeds coated with a micronutrient slurry (made of B40 fertilizer).

Invasive plants (i.e. weeds) are well established across the globe and contribute to economic losses, habitat degradation, losses in land productivity and value. Weeds have become established through a variety of landscape changes including, but not limited to, fire, grazing, land clearing, tillage, urbanization, and other land disturbing activities. Weed seeds have also traveled the globe becoming established as exotic species on continents on opposite sides of the world. Many of the noxious weeds found in the U.S. evolved naturally elsewhere, become established, and proliferate in the absence of natural controls.

Billions of dollars are spent annually controlling weeds. The Nature Conservancy Global Invasive Species Team reports worldwide damage from invasive species amounts to $1.4 trillion annually, or five percent of the global economy (Pimentel et al. 2001). In the U.S., impacts from invasive species amount to $120 billion annually with more than 100 million acres affected (Pimental et al. 2005). For example, leafy spurge (*Euphorbia esula*) infestations in the northern Great Plains costs ranchers $120 million annually (Bangsund et al. 1991).

Herbicides are the principal strategy for controlling weeds including synthetic formulations such as glyphosate (ROUNDUP®/Monsanto, and others), PLATEAU® (imazapic, BASF), JOURNEY® (imazapic+glyphosate, BASF), MATRIX® (sulfonylurea, DuPont), LANDMARK XP® (sulfometuron and chlorsulfuron, Dupont), and OUST® (sulfometuron, DuPont). Effectiveness of conventional herbicide applications is highly dependent on timing of herbicide application relative to both plant physiology/growth stage, specific contact with growing vegetation, and complimenting rainfall conditions. Land managers often rule out the use of herbicides for control of weeds due to high cost, low effectiveness and damage to desirable species. Effective weed control methods, which do not harm desirable species, are available, but often have limitations related to cost, need for repeated application and a general concern for the hazards associated with the application of organic chemicals in the environment. Most herbicides used for control of invasive species are organic liquid chemicals applied to the leaf tissue, which result in disruption of plant metabolic processes. These same organic chemicals are not naturally derived and may be harmful to water quality, wildlife and humans. Additionally, research suggests that some invasive plant species are developing resistance to herbicides (Maxwell et al. 1990; Heap 2006) and the widespread use of herbicides worldwide (i.e. glyphosate) may cause unintended consequences including limiting micronutrient availability (Yamada et al. 2009), as well as broad endocrine disruption.

Of the sixteen chemical elements known to be important to a plant's growth and survival, thirteen of those elements come from the soil and can be dissolved in water and absorbed through a plant's root system. In some instances, there are insufficient levels of these elements to sustain normal plant growth and development. Agriculturalists rely on the application of fertilizer to ameliorate elemental nutritional deficiencies, with the expectation of a positive, 'desirable' plant response to the added nutrient. It is known that all plant species have definable nutrient requirements and many plant species have unique sensitivities to trace elements, otherwise known as micronutrients. Some combinations and concentrations of these nutrients, particularly the micronutrients, can be detrimental or toxic to some plants. Sensitivities to low or high micronutrient levels can be expressed in plants as depressed or stunted growth, delayed maturity, incomplete physiological development, cell necrosis, or premature death (Kabata-Pendias and Pendias, 2001). The range of micronutrients required for optimal plant growth for each species may be broad or narrow. Soils have unique geochemical characteristics related to climate and parent material. Native plant communities have adapted to these unique conditions over thousands of years.

Under natural conditions, these plant-soil systems maintain an equilibrium level of nutrient availability until disturbed by natural or anthropogenic forces causing a geochemical disequilibrium, which makes these plant-soil systems susceptible to invasive species colonization.

Phytotoxic levels of trace elements in soils are known to occur naturally. Acid-sulfate soil systems are known to mobilize metals resulting in phytotoxic soil conditions for plant species not tolerant of soil acidity. Saline soil conditions are also known to occur in arid climates resulting in phytotoxic conditions for plant species not tolerant of elevated salinity. Anthropogenic releases of contaminants to the natural environment are also known to cause phytotoxic soil conditions. Mining and smelting are both known to cause acidic and metalliferous soil conditions, while agricultural practices such as fallow farming may lead to salinization of the soil resource.

Farmers may add fertilizers or soil amendments to increase the yield of crops and overcome any geochemical limitations of the soil, which affects crop yield. Plant macronutrients nitrogen, phosphorous and potassium are routinely added to soil to maximize crop yield. In some cases trace elements such as copper, zinc or boron may be added to the soil if the crop grown has unique trace element fertilization needs. Farmers may also add soil amendments such as lime (such as $CaCO_3$) to control soil acidity. Similarly, land reclamation scientists may add soil amendments and fertilizers to control undesirable soil geochemistry at disturbed sites. Seeding of plant species, which are tolerant of site-specific conditions, is also a common practice for revegetation of disturbed sites.

According to the present disclosure, minute concentrations of the plant micronutrients boron, copper, zinc, manganese, chlorine and molybdenum when applied to the soil, directly to weed seed, or to soil containing weed seed, result in seed death, failure of weed seed to germinate, and premature mortality of emerging seedlings through micronutrient induced phytotoxicity. The present disclosure further provides combinations of (A) phytotoxic micronutrients and (C) other agriculturally useful compositions including, but are not limited to: 1) one or more additional micronutrients or micronutrient fertilizers, 2) macronutrients or macronutrient fertilizers, 3) agriculturally acceptable adjuvants, 4) synthetic herbicides, 5) biological compounds or related carbon-based organic compounds, 6) inorganic additives, and/or 7) seed, seed coating, or seed inoculant. The present disclosure provides method of using the phytotoxic micronutrient compositions and combinations for selective control of the invasive species.

According to the present disclosure, soil conditions phytotoxic to weed species yet not phytotoxic to desirable plant species are made possible through knowledge of the dose-response curve for each unique micronutrient-plant interaction. The resulting modified geochemical soil conditions cause selective phytotoxic control of invasive plant species while allowing establishment and persistence of desirable plant species. Timing of application of the micronutrient is targeted to elevate soluble soil micronutrient concentrations in soil containing weed seed prior to seed germination. Thus, micronutrient application can be made any time following weed seed drop and before weed seed germination. The timing of micronutrient application is unique to the invasive species targeted and its growth cycle. Fundamentally, the elevated soil micronutrient conditions must exist while the plant is actively growing (whether seed is germinating below the soil surface or producing leaf tissue above the soil surface). The period of micronutrient application may encompass the entire calendar year, depending on the plant species and unique phenological needs for nutrients and site conditions including composition of desirable plant species present. Annual weeds growing from seed every year will require dissimilar timing strategies for phytotoxic micronutrient compound application compared to perennial weed species with extensive and long-lived root systems.

According to the present disclosure, mature growing invasive species can also be controlled by micronutrient addition. For example, weeds commonly grow to maturity early in the growing season and may produce and drop seed in late spring to mid-summer.

For reasons of convenience or performance, combinations of products for control of invasive plant species may be advantageous. In part, combination products are driven by the high labor and equipment costs associated with crop/pasture/landscape management across large acreage where it makes more sense to apply two or more beneficial ingredients at the same time. In part, combination products are driven by performance where the outcome of adding two or more beneficial ingredients is synergistic and product performance is accelerated or augmented by combinations of products for control of invasive plant species. In turf management "Weed and Feed" turf products routinely include both fertilizer and herbicide and are well known strategies for simultaneous applications and applied for reasons of either convenience or performance. Fertilization with macronutrients nitrogen, phosphorous and potassium are routinely applied as combination in varying percentages. Likewise, synthetic weed herbicides may be applied as a 'cocktail' of multiple herbicidal constituents sometimes including products produced by different manufacturers.

Although, organic chemical herbicides for control of invasive species are known, selective control of invasive plant species using phytotoxic micronutrients in addition to chemical herbicides or other agricultural compositions has not been practiced commercially. The present disclosure, among other things, discloses the combination of (A) a phytotoxic micronutrient and (C) an agricultural composition ("the combination of the disclosure"). Further, the present disclosure discloses uses of the combination of the disclosure for selective control of invasive species, soil health augmentation and stimulation of natural soil processes (biomimicry), and effective soil management and vegetation management.

The combination of the disclosure can be in a form where (A) and (C) are separately formulated and separately applied or used. The combination of the disclosure can also be in a form where (A) and (C) are in a single compositions. The combination of the disclosure can also apply to (A) and (C), which are formulated or in a form ready to be used as tank-mix partners.

(A) Phytotoxic Micronutrients

Of the sixteen chemical elements known to be important to a plant's growth and survival, thirteen come from the soil, are dissolved in water and absorbed through a plant's roots. In some instances, there are not always enough of these nutrients in the soil for a plant to grow healthy. In other instances, some combinations and concentrations of these nutrients, particularly the micronutrients, can be detrimental or toxic to some plants. Micronutrients, those elements essential for plant growth and which are needed in only very small (micro) quantities, are boron (B), copper (Cu), iron (Fe), chlorine (Cl), manganese (Mn), molybdenum (Mo) and zinc (Zn). These micronutrients play critical roles in carbohydrate transport, metabolic regulation, osmosis and ionic balance, enzyme and chlorophyll synthesis and function, internal chemical transformations, and cell reproduction/division.

According to one exemplary embodiment the present disclosure, the phytotoxic micronutrients comprises boron, copper, zinc, manganese, chlorine, and/or molybdenum. In one embodiment, the phytotoxic micronutrients comprises a boron source, a copper source, a zinc source, a manganese source, a chlorine source, and/or molybdenum source. As used herein the "source" for elemental micronutrients include organic and inorganic compounds and complexes that can provide soluble micronutrients (boron, copper, zinc, manganese, chlorine, molybdenum, etc.) in the soil.

In some embodiments, a boron source can include, but are not limited to, boric acid, sodium borate, sodium tetraborate, and disodium tetraborate.

In some embodiments, a copper source can include, but are not limited to, chelated copper such as $Na_2CuEDTA$, copper sulfate such as $CuSO_4.5H_2O$, cupric oxide (CuO), and cuprous oxide ($Cu_2O$).

In one embodiment, the phytotoxic micronutrients are useful in increasing the growth of desirable plant species (such as bluebunch wheatgrass and Kentucky bluegrass) while controlling invasive plant species (such as cheatgrass, dandelion and spotted knapweed). In one embodiment, the phytotoxic micronutrients comprises boron or a boron source. In one embodiment, boron is useful in increasing the growth of desirable plant species (such as bluebunch wheatgrass and Kentucky bluegrass) while controlling invasive plant species (such as cheatgrass, dandelion and spotted knapweed).

As used herein, the phrases "desirable plant species" and "desirable plants" refer to plants that are present in a specific location where they are wanted. As used herein, the phrases "invasive plant species" and "invasive plants" refer to plants that are present in a specific location where they are unwanted. Thus, according to the present disclosure, whether a plant is considered a desirable or an invasive plant in a particular situation depends on the specific location involved and the desires of the manager or owner of that location. For example, a certain grass species may be considered a desirable plant in a mixed alfalfa/grass field used for forage production or livestock grazing. That same grass species, however, may be considered an invasive plant in an alfalfa field to be used for certified alfalfa seed production. In the latter situation, the grass species would be classified a weed and if too many seeds or other parts of the grass species were harvested with the alfalfa seed that may result in the seed from that alfalfa production field being denied certification. On an un-tilled landscape occupied by native vegetation the colonization of the site by non-native or exotic plants is illustrative in that the native vegetation would be the "desirable species" and the non-native and exotic colonizing species would be an "invasive species".

A partial list of known invasive species would include, but not be limited to: cheatgrass (*Bromus*) (such as Downy brome (*Bromus tectorum*), Japanese brome (*bromus Japonicus*), etc.), dandelion (*Taraxacum officinale*), knapweeds (*Centaurea*) (such as spotted (*C. maculosa*)), diffuse (*C. diffusa*), Russian (*C. repens*), etc.), bindweed (*Convolvulus*), chickweed (*Stellaria media*), ground ivy (*Glechoma hederacea*), poison ivy (*Toxicodendron radicans*), Canada thistle (*Cirsium arvense*), burdock (*Arctium*), houndstongue (*Cynoglossum*), yellow star thistle (*Centaurea solstitialis*), Himalayan bush clover (*Lespedeza cuneata*), privet (*Ligustrum*), Russian thistle (*Salsola*), kochia (*Bassia*), halogeton (Halogeton), Japanese knotweed (*Fallopia japonica*) and related knotweeds (*Fallopia*), leafy spurge (*Euphorbia*), St. Johnswort (*Hypericum perforatum*), toadflax (*Linaria*) (such as yellow toadflax (*Linaria vulgaris*) and Dalmation toadflax (*Linaria dalmatica*)), tansy (*Tanacetum vulgare*), whitetop (*Lepidium draba*), hawkweed (*Hieracium*), cinquefoil (*Potentilla*), ox-eye daisy (*Leucanthemum vulgare*) and others either known to be a problematic invasive species and also those not yet determined to be such. For additional information on weeds see, e.g., R. Dickinson and F. Royer, Weeds of North America, 2014, University of Chicago Press, 656 pages; Invasive Weeds of North America: A Folding Pocket Guide to Invasive & Noxious Species (Wildlife and Nature Identification), 1$^{st}$ Edition, 2017; Thurlow Merrill Prentice, Weeds & Wildflowers of Eastern North America, First Edition, 1973, Peabody Museum of Salem; U.S. Dept. of Agriculture, Common Weeds of the United States, Revised Edition, 1971, Dover Publications, 480 pages; Weeds, 2001, Golden Guides from St. Martin's Press, 160 pages; R. L. Sheley and J. K. Petroff (eds.), Biology and Management of Noxious Rangeland Weeds, 1999, Barnes & Noble, 438 pages; U.S. Pat. Nos. 5,180,415; 9,416,363; and, R. P. Randall, A Global Compendium of Weeds, Third Edition, 2017, 3654 pages. The list of known invasive species can also include annuals: pigweed (*Amaranthus*), lambsquarters (*Chenopodium berlandien*), foxtail (*Setaria*), crabgrass (*Digitus*), wild mustard (*Sinapis arvensis*), field pennycress (*Thlaspi arvense*), ryegrass (*Lolium*), goosegrass (*Galium aparine*), chickweed, wild oats (*Avena fatua*), velvet leaf (*Abutilon theophrasti*), purslane (*Portulaca oleracea*), barnyard grass (*Echinochloa*), smartweed (*Polygonum pensylvanicum*), knotweed, cocklebur (*Xanthium*), wild buckwheat (*Fallopia convolvulus*), kochia, medic (*Medicago*), corn cockle (*Agrostemma githago*), ragweed (*Ambrosia*), sowthistle (*Sonchus*), coffeeweeds (common chicory (*Cichorium intybus*), Chinese senna or sicklepod (*Senna Obtusifolia*), coffee senna (*Senna occidentalis*), Colorado River hemp (*Sesbania herbacea*), croton (*Croton*), cuphea (Cuphea), dodder (*Cuscuta*), fumitory (*Fumaria*), groundsel (*Senecio*), hemp nettle (*Galeopsis*), knawel (*Scleranthus annuus*), spurge (*Euphorbia*), spurry (*Spergula*), jungle rice (*Echinochloa colona*), pondweed (*Potamogeton*), dog fennel (*Eupatorium capillifolium*), carpetweed (*Mollugo verticillata*), morning glory (*Convolvulaceae*), bedstraw (*Galium aparine*), or ducksalad (*Heteranthera limosa*); biennials such as wild carrot (*Daucus carota*), matricaria (*Matricaria*), wild barley (*Hordeum leporinum*), campion (*Silene*), chamomile (*Matricaria discoidea*), mullein (velvet plant), roundleaved mallow (*Malva*), bull thistle (*Cirsium vulgare*), moth mullein (*Verbascum blattaria*), and purple star thistle (*Centaurea calcitrapa*); or perennials such as white perennial ryegrass (*Lolium perenne*), quackgrass (*Elymus repens*), Johnson grass (*Sorghum halepense*), hedge bindweed (*Calystegia sepium*), Bermuda grass (*Cynodon dactylon*), sheep sorrel (*Rumex acetosella*), curly dock (*Rumex crispus*), nutgrass (*Cyperus rotundus*), field chickweed (*Cerastium arvense*), campanula (*Campanula*), field bindweed (Convolvulus arvensis), mesquite (*Prosopis*), toadflax, yarrow (*Achillea millefolium*), aster (*Aster*), gromwell (*Lithospermum*), horsetail (*Equisetum arvense*), ironweed (*Vernonia*), sesbania (*Sesbania*), bulrush (*Schoenoplectus*), cattail (*Typha*) or wintercress (*Barbarea*).

In some aspects of the present disclosure, annual grasses are a unique type of invasive plant found in degraded rangeland landscapes and have been implicated in outcompeting desirable and non-weedy perennial plants, competing for water and other soil resources and contributing to ever-worsening cycles of rangeland wildfires. These invasive annual grasses often have limited value to both wildlife and domesticated grazing livestock. These grasses may include, but are not limited to, downy brome (*Bromus tectorum*), Japanese brome (*Bromus Japonicus*), soft brome (*Bromus hordeaceus*), field brome (*Aegilops cylindrica*), red brome (*Bromus rubens*), Medusahead (*Taeniatherum caput-medusae*), ventenata (*Ventenata dubia*), bulbous bluegrass (*Poa bulbosa*), Annual wheatgrass (*Eremopyrum triticeum*, jointed goatgrass (*Aegilops cylindrica*) and others. Perennial turf and pasture grasses may be invaded by weedy annual grasses such as barnyard grass (*Echinochloa crusgalli*), rattail fescue (*Vulpia myuros*), goosegrass (*Eleusine indica*), Crabgrass (*Digitaria* spp.), annual bluegrass (*Poa annua*) annual ryegrass (*Lolium multiflorum*), *panicum* spp. and others.

In other aspects of the present disclosure, perennial grasses are typically desirable species in rangeland, pasture and turf applications and may be either of native origin (North American range and grassland) or introduced non-native and domesticated species commonly used in turf and pasture applications. These perennial species are typically deep-rooted and grow for many years from the same root stock and contribute to soil formation, water infiltration, carbon capture and many beneficial attributes unlike invasive species. Rangeland perennial grasses may include, but are not limted to, bluebunch wheatgrass (*Pseudoroegneria spicata*), Thurber needlegrass (*Achnatherum thurberianum*), needle-and-thread grass (*Hesperostipa comata*), western wheatgrass (*Pascopyrum smithii*), basin wildrye (*Elymus cinereus*), Idaho fescue (*Festuca idahoensis*), rough fescue (*Festuca altaica*), bottlebrush squirreltail (*Elymus elymoides*), Big bluegrass (*Poa secunda*), Indian ricegrass (*Achnatherum hymenoides*), blue grama (*Bouteloua gracilis*), thickspike wheatgrass (*Agropyron dasystachyum*), slender wheatgrass (*Elymus trachycaulus*), Big bluestem (*Andropogon gerardii*), mountain brome (*Bromus marginatus*), prairie sandreed (*Calamovilfa longifolia*), Canada wildrye (*Elymus canadensis*), Prairie Junegrass (*Koelaria pyramidata*), Sandberg bluegrass (*Poa secunda*), Sand dropseed (*Sporobolus cryptandrus*), Needle and thread (*Stipa comata*), Green needlegrass (*Stipa viridula*), and others.

In further aspeces of the present disclosure, perennial pasture and turf grasses may include, but are not limited to Crested/desert wheatgrass (*Agropyron desertorum*), Kentucky bluegrass (*Poa pratensis*), Canada bluegrass (*Poa compressa*), orchard grass (*Dactylis glomerata*), timothy (*phleum pratense*), smooth brome (*Broinus inermis*), perennial ryegrass (*Lolium perenne*), red fescue (*Festuca rubra*), tall fescue (*Festuca arundinacea*), intermediate wheatgrass (*Thinopyrum intermedium*), tall wheatgrass (*Thinopyrum ponticum*), bermudagrass (*Cynodon dactylon*), hard/sheep fescue (*Festuca ovina*), Russian wildrye (*Psathyrostachys junceus*), meadow brome (*Bromus biebersteinii*), bentgrass (*Agrostis* spp.), and others.

The present disclosure provides a list of known invasive species that include annual, biennial and perennial species such as: pigweed (*Amaranthus* spp.), lambsquarters (*Chenopodium berlandieri*), foxtail (*Setaria* spp.), crabgrass (*Digitus* spp.), wild mustard (*Sinapis arvensis*), field pennycress (*Thlaspi arvense*), ryegrass (*Lolium* spp), goosegrass (*Galium aparine*), chickweed (*Stellaria media*), wild oats (*Avena fatua*), velvet leaf (*Abutilon theophrasti*), purslane (*Portulaca oleracea*), barnyard grass (*Echinochloa* spp.), smartweed (*Polygonum pensylvanicum*), knotweed (*Polygonum* spp) and others.

The present disclosure teaches strategies for control of annual grasses, annual forbs and perennial forbs that are invasive. These control strategies work broadly for groups of plants listed above rather than by individual species. The control strategies relate to root structure (i.e. tap root versus branching/extensive roots in perennial and/or biennial forbs) and timing (i.e. early season for annual forbs and grasses). The present disclosure can be applied for controlling the broad groupings as well as the specific species.

As used herein, the term “hectare” refers to a metric unit of area equal to a square with 100-meter sides (1 $hm^2$), or 10,000 $m^2$, and is primarily used in the measurement of land. There are 100 hectares in one square kilometre. An acre is about 0.405 hectare and one hectare contains about 2.47 acres.

Cheatgrass, a non-native, invasive, Euro-Asian winter annual grass species, is present or dominant on some 100 million acres in the Great Basin and Intermountain West. Several thousand new acres are invaded by cheatgrass every day, with each plant producing upwards of 1,000 seeds. Cheatgrass is a principal driving force behind epidemic wildfires occurring continually and with greater frequency across the western U.S. and is largely responsible for decline of the sagebrush-steppe ecosystem, home to more than 1500 species of birds, vertebrate, and invertebrate species including iconic western ungulates deer, elk, antelope, and the endangered sage grouse; all of which are dependent on the habitat and health of this rapidly declining ecosystem. In one embodiment, the phytotoxic micronutrients This disclosure demonstrates that fertilization by micronutrients is selectively harmful to invasive plants while desirable species are either stimulated or tolerant of the same levels shown to be phytotoxic to the weedy species. This makes ecological sense as later successional plant communities have more highly evolved nutrient cycling and elevated levels of fertility. The desirable plants characteristic of the late successional plant communities are tolerant and benefit from higher levels of soil fertility and especially adequate amounts of trace elements (also known as micronutrients). Invasive species are intolerant of elevated micronutrient levels and thrive in low nutrient soils, thus, low nutrient soil are unable to retard weedy colonizers. The recycling of trace elements by later successional plant communities may have been a primary natural control on preventing weed invasion. Upon disturbance and loss of pre-disturbance fertility native plant communities become susceptible to weed invasion. The recovery of these systems through natural soil building and plant succession is likely to occur over long periods of time (hundreds to thousands of years) absent repeated disturbance.

Without bound to any theory, micronutrients translocated into the plant shoots and subsequent surface decay provides a weed-inhibiting function through nutrient cycling. The phytotoxic micronutrients fixes the soil required to create conditions conducive to perennial plants, so that means creating soil conditions favorable to late-successional ‘old growth’ rangeland plants rather than colonizers, while being phytotoxic to invasive species.

For example, consider a logging road built through a mountain meadow. The pre-disturbance desirable diverse vegetation exists on both sides of the road while the roadbed and cut/fill slopes become colonized by invasive species. Of relevance to the disclosure is that while the invasive species produce large amounts of seed that fall on the adjacent mountain meadow they fail to become established. Trace elements’ phytotoxicity to such weed seeds is an important control on the invasion of weedy species such as dandelions beyond the roadbed. In this disclosure soil health of disturbed lands is restored by reverse engineering the inorganic trace element/micronutrient fingerprint of the pre-disturbance soil and soil micronutrients by the application of the phytotoxic micronutrients (A) to control invasive species.

Weeds are negatively impacted by small quantities of micronutrients whereas more desirable species (perennial grasses, native forbs) are tolerant of these same levels. There is a differential tolerance between invasive species and desirable plants (see WO 2014/113475, which is hereby incorporated by reference in its entirety for all purposes). For example, consider the micronutrient copper, its total elemental amount in a given soil might be 50 mg/Kg with may be 0.1% plant available copper in any given year. If inputs and outputs of copper are in balance, the total amount of copper remains at 50 mg/Kg and the plant available amount remain at 0.1% of the total. In the example of overgrazing, copper translocated to the above ground biomass is removed from the system and micronutrient recycling to the soil is disrupted. Over time the total amount of copper in the soil begins to decline to <50 mg/Kg, but more significantly the plant available amount of copper sharply declines (the total elemental amount is attributable to geologic materials and is often very slowly weathered to plant available forms). For the sake of this example, assume that weeds are not tolerant of more than 0.1% plant available copper. If that level drops due to overgrazing to 0.01% plant available copper, then the site would likely become colonized by invasive plants if an invasive plant species seed source were nearby. Thus, fertilizing the soil to restore the pre-disturbance plant available copper level (target of 0.1%), with phytotoxic micronutrients (A) comprising copper or a copper source, would result in reduction or elimination of weeds and reestablishment of more desirable plant species either through natural recolonization or reseeding.

In one aspect, the role of the phytotoxic micronutrients is fundamentally about mass balance—restoring appropriate amounts of soil micronutrients in soil by replacing micronutrients lost due to land disturbance. According to the present disclosure, the consequences of restoring pre-disturbance levels of soil micronutrients include making the soil inhospitable to invasive species. Different invasive weed species have different sensitivities to the micronutrients compared to species that are more desirable.

How much micronutrients to add is a function of the existing amount of micronutrients in the soil and the specific weedy and specific desirable plant species present at a site on which the disclosure is to be practiced. The amount of micronutrients present in a disturbed soil is a unique quantity that can be measured by laboratory analysis. Geologic parent material, soil formation history, land use history, climate and other factors influence the elemental levels of all inorganic constituents in the soil. The process to determine the specific micronutrients and amounts of each to be applied involves collecting samples of soil from at least two representative areas or sites: at least one sample from an undisturbed portion of the site with desirable plant species and at least one sample from a disturbed portion of the site with invasive plant species and diminished desirable plant species cover. The difference in soil micronutrient levels between the "good" site and "bad" site form the basis for calculation of fertilizer application rates. The amount of micronutrients added is the difference between the degraded site with low fertility and the reference site with natural levels of soil fertility. According to the present disclosure, site-specific phytotoxic micronutrient prescription can be developed and applied. In larger landscapes with common soil and vegetation characteristics, generalized micronutrient application strategies may be applicable. In addition, when undisturbed sites cannot be found on the larger landscape, generalized micronutrient application may be required to control the targeted invasive species.

Plant micronutrient levels in soil are generally very low (roughly a few pounds per acre of a given plant available micronutrient). Correspondingly, the amount of micronutrient fertilizer to be added per acre would also be low and dependent on the elemental levels of micronutrient in the fertilizer to be applied. In the case where the micronutrient is impractical to apply at low rates (a few pounds per acre) due to the difficulty of applying a thin uniform amount of fertilizer using mechanical equipment, the fertilizer can be bulked up to add weight and/or volume to aid in spreading. Bulking of fertilizer can be accomplished using sand, rice hulls, corn meal, sawdust, crushed walnut shells, corn stover or equivalent. For example, if the target micronutrient application rate was 5 pounds per acre and the reasonable minimum application rate with a given piece of equipment was 10 pounds per acre, an additional 5 pounds of bulking material could be added to the 5 pounds of the micronutrients (the active ingredient).

A second factor affecting the amount of micronutrients to be added is the plant species present—both desirable and invasive. In this disclosure, it is recognized that each plant species has a unique trace element requirement: too little of a given micronutrient and the plant is deficient, too much of a given micronutrient and the plant experiences phytotoxicity. In one embodiment, invasive species have lower tolerance to a given soil micronutrient concentration compared to desirable plant species (typically perennial grasses). It is this differential sensitivity to micronutrients in the soil shown by desirable plants compared to invasive plant species that is important. The phytotoxic micronutrients will include levels of one or more micronutrients above phytotoxic levels for invasive plant species and below levels harmful to desirable species for a given site. In some embodiments, perennial grass species are much more tolerant of elevated micronutrient levels compared to weeds.

Perennial grass plant community is comprised of native plant species (e.g. bluebunch wheatgrass, etc.) and/or introduced plant species (e.g. Kentucky bluegrass, etc.).

Micronutrient application to the soil can occur at any time during the year; however, maximum affect has been observed when micronutrient fertilizer is applied in the late summer/early fall or early spring in advance of seasonal plant growth. In western landscapes occupied by invasive weeds, winters are typically cold with snow and frozen ground. Maximum plant growth typically occurs in the spring (April-June when snow melts, ground thaws, soil temperatures warm and spring rains occur). The effect of soil micronutrient application during this period may not be observed for one year as plant growth occurs due to existing soil nutrients rather than the added soil nutrients (unless the micronutrient is applied early in the spring and/or unless significant rainfall occurs). Invasive plant species appear most sensitive to elevated micronutrient levels when the plants are young. Annual plant species appear most sensitive during seed germination and establishment early in the phenology of the plant. It should be noted that the effect on invasive plants from micronutrient additions to soil are dissimilar from organic chemical based herbicides that kill plants over a period of days to weeks and are generally applied to the growing leaf tissue.

The phytotoxic micronutrient requires sufficient time for the fertilizer to be applied to the soil, become dissolved by rainfall or snowmelt and to change the chemistry of the soil solution such that germinating seed or young plants imbibe the applied trace element solution by root uptake. As discussed elsewhere herein, foliar application may, in some instances, result in folia nutrient uptake that could result in faster plant responses. Changes to the plant community are best observed over long-periods of time (months-years) compared to conventional organic herbicide applications that take affect over short periods of time. This disclosure also should be thought of in terms of greatly reducing the prevalence of weeds by changing the soil chemistry, but not eliminating all weeds. This is an ecological approach to restoring desirable plant communities and their soil quality. This approach to weed control is fundamentally different from the current practice, which focuses solely on the plant and invasive species control as a one-component system. The phytotoxic micronutrients changes the soil chemistry to change the plant community as a two-component system, each dependent on the other.

Further, an herbicidal application of organic chemicals is often an annual process as new plants grow from seed. In the subject disclosure, the phytotoxic micronutrient application is a one-time application intent on restoring soil health, plant community composition and long-term control of weeds through natural micronutrient cycling. Subsequent micronutrient applications may be required if target soil levels are not attained during a first application due to landscape factors, climate, grazing, fire or related land management activities. Multiple applications of micronutrients are not prohibited by this disclosure.

By creating phytotoxic soil, conditions through the application of the phytotoxic micronutrients in the uppermost soil layers (~1 inch depth) weed seeds and seedlings can be killed during or immediately following germination therein preventing the plant from growing to maturity and producing seed to sustain subsequent generation of plants. This effect may disrupt the life cycle of annual weedy plant species. Existing desirable perennial plant species are unharmed due to deeper roots, which are not exposed to phytotoxic surficial micronutrient levels. Over a period of months or years, the surface applied micronutrients will reach roots in the deeper soil at diluted concentrations, which are expected to have a long-lasting beneficial fertilization effect due to prior nutrient depletion caused by land disturbance and an inhibitory effect on perennial weeds. The application of phytotoxic micronutrient compounds to create weed-inhibitory conditions and persisting soil residual fertility are intended. Many disturbed sites are both water limited due to climate and nutrient limited due to soil depletion. The resulting ecological lift is caused by the combined effect of enhancing existing desirable vegetation and diminishing the frequency and extent of weedy plants.

In an illustrative example of the applicability of the micronutrients, plant community response to water soluble trace elements has been observed at the Anaconda Smelter Superfund site in Anaconda, MT At this site, uncontrolled releases of hazardous substances from the operation of a copper smelter have resulted in sharp gradients in soil concentrations of water-soluble copper and zinc. Immediately adjacent to the smelter stack (where the releases originated) soil levels of water soluble copper and zinc are highest and with increasing distance from the smelter stack soil levels of copper and zinc decrease. Along the gradient of water-soluble copper and zinc present in the soil, plant community zonation is observed with plants exhibiting tolerance to highly elevated copper and zinc found close to the smelter stack and plants with low tolerance to water-soluble copper and zinc found only a great distance from the smelter. Perennial grass species, for example, appear to be tolerant of elevated soil copper and zinc compared to native forbs, which are not found near the smelter stack. In the case of dandelions (an invasive plant species), healthy fields of dandelions are found in uncontaminated soils a distance from the smelter. A short distance closer to the smelter, dandelions are very stressed with black leaf spots and reddish leaf margins. Dandelions are not found where moderate to high levels of water-soluble copper and zinc are measured in the soil. In contrast the invasive plant species spotted knapweed is found growing in soils with low to high levels of water-soluble copper and zinc, suggested differential and elevated tolerance of copper and zinc compared to dandelion.

In one embodiment, the phytotoxic micronutrients is provided in a dry formulation. In one embodiment, the dry formulation is in a granular form. In one embodiment, the dry formulation can be in a dry powder or in a pelletized form. The dry formulation of the phytotoxic micronutrients can be applied to the soil surface with a tractor or a spreader. The dry formulation would become available to the plant upon rainfall or snowmelt.

In one embodiment, the phytotoxic micronutrient is in a dry formulation and the dry formulation is spread on the soil surface or onto vegetation, prior to filtering down to the soil surface by gravity or being dissolved into the soil by water addition by rainfall, snowmelt or irrigation practices.

In some embodiments, the phytotoxic micronutrients comprises boron, boron source, copper, copper source, zinc, zinc source, manganese, manganese source, molybdenum, molybdenum source, chlorine or a chlorine source. In some embodiments, the phytotoxic micronutrients comprises soluble sources of boron, copper, zinc, manganese, molybdenum or chlorine in the range of about 0.01 mg/L to about 50 mg/L, about 0.01 mg/L to about 0.5 mg/L, or about 0.5 mg/L to about 50 mg/L. The selection of a specific micronutrient and application rate will be made based on species-specific sensitivity to each micronutrient and cost for each micronutrient fertilizer.

In one embodiment, the phytotoxic micronutrient may be taken up by the plant as a foliar nutrient or the liquid spray drizzling down the vegetation tissue and into the soil to be taken up by roots, or in combination of uptake mechanisms. In other embodiments, the phytotoxic micronutrient compound is spread on the soil surface or onto vegetation prior to filtering down to the soil surface by gravity, prior to being dissolved into the soil by water addition by rainfall, snowmelt or irrigation practices.

In one embodiment, the phytotoxic micronutrients is provided in a liquid formulation. In one embodiment, the liquid formulation is in a spray mixture formulation. In one embodiment, a liquid formulation can be prepared by dissolving the phytotoxic micronutrients in water. In some embodiments, the phytotoxic micronutrients can be dissolved in any liquid not harmful to plants. In one embodiment, a liquid formulation can be applied with a sprayer as long as the application rates are appropriate to achieve the desired fertility goals.

In one embodiment of the liquid formulation of the phytotoxic micronutrients, the formulation is thoroughly mixed to assure complete dissolution of the micronutrients. The solution is can then be applied as an aerial spray to the target area. The solution can be applied to the surface of soil containing invasive species seed, directly to weed seed, or to senesced or live, seed-bearing weed plants at a rate of 2-200 milliliters per square meter. A target area may be any plant community where invasive species are present, e.g. urban land, rangeland, forestland, roadside, brownfield, or disturbed land.

As used herein, the phrase “urban land” refers to an area having the characteristics of a city or otherwise developed for human habitation, with intense development and a wide range of public facilities and services. Urban land includes turf and residential horticultural lands.

As used herein, the term “rangeland” refers to an expanse of land suitable for livestock or wildlife to wander and graze on.

As used herein, the term “forestland” refers to a section of land covered with forest or set aside for the cultivation of forests or as wildland without silvicultural intent.

As used herein, the term “brownfield” refers to a piece of industrial or commercial property that is abandoned or underused and often environmentally contaminated, especially one considered as a potential site for redevelopment.

As used herein, the phrase “disturbed land” refers to land that has been physically disturbed by resource operations (e.g., from mining, logging or construction) that cannot be used for other purposes (e.g., for agriculture or home sites). Disturbed land may be caused by, but not limited to, grazing by wildlife and domestic animals, fire, road construction, climate change, flooding, landslide, erosion, invasive species colonization, tillage for agriculture, urbanization, pipeline or utility installation, dam building (or removal), and the like.

In some embodiments of the present disclosure, the target area does not include land under intensive agronomical or horticultural production. For example, in some embodiments of the present disclosure, the target area does not include land being used to grow row crops, such as is used for large-scale growing of soybeans, maize/corn, cotton, dry peas and the like. In other examples, in some embodiments of the present disclosure, the target area does not include land being used to grow truck crops (i.e., large-scale vegetable crops), such as is used for large-scale growing of watermelons, fresh peas, peppers, cucumbers, tomatoes, onions and the like. In still other examples, in some embodiments for the present disclosure, the target area does not include land being used to grow large-scale production of flowers, such as is used for large-scale growing of tulips, daffodils, chrysanthemums and the like.

In one embodiment, the phytotoxic micronutrient is Edaphix. In one embodiment, the phytotoxic micronutrient is Edaphix B25 (25 lbs. Boron/acre), Edaphix B50 (50 lbs. Boron/acre), Edaphix B75 (75 lbs. Boron/acre), Edaphix B100 (100 lobs Boron/acre), or Edaphix B1300 (15 lbs. Boron/acre). B25, B50, B75 and B100 are applied to the soil in granular form. B1300 is applied to the foliage in liquid form.

Phytotoxic Micronutrients Comprising Boron or a Boron Source

In one embodiment, the phytotoxic micronutrients comprises boron or a boron source. In one embodiment, the boron source is boric acid, sodium borate, sodium tetraborate, or disodium tetraborate, or other soluble sources of boron. In some embodiments, soluble boron can be provided by dissolving boric acid, sodium borate, sodium tetraborate, or disodium tetraborate, or other soluble sources of boron, in water or alternative agriculturally acceptable liquid to create a boron-containing solution. In one embodiments, water soluble boron can be provided by dissolving boric acid, sodium borate, sodium tetraborate, or disodium tetraborate, or other water soluble sources of boron, in water.

In some embodiments, the phytotoxic micronutrient comprising boron or a boron source has a boron concentration ranging from about 0.01 mg/L to about 50 mg/L or from about 0.5 mg/L to about 50 mg/L of water soluble boron. In other embodiments, the applied liquid phytotoxic micronutrient solution comprising boron or a boron source has a boron concentration ranging from about 0.1 g/L to about 1 g/L, about 0.1 g/L to about 10 g/L, about 0.5 g/L to about 10 g/L, about 2 g/L to about 20 g/L, from about 3 g/L to about 30 g/L, from about 4 g/L to about 40 g/L, from about 5 g/L to about 50 g/L, about 6 g/L to about 60 g/L, about 7 g/L to about 70 g/L, about 8 g/L to about 80 g/L, about 9 g/L to about 90 g/L, or about 10 g/L to about 100 g/L of water soluble boron.

In some embodiments, the phytotoxic micronutrients comprising boron or a boron source is applied to a locus to achieve a water soluble boron soil concentration of about: 0.01 mg/L, 0.02 mg/L, 0.03 mg/L, 0.04 mg/L, 0.05 mg/L, 0.06 mg/L, 0.07 mg/L, 0.08 mg/L, 0.09 mg/L, 0.10 mg/L, 0.15 mg/L, 0.20 mg/L, 0.25 mg/L, 0.30 mg/L, 0.35 mg/L, 0.40 mg/L, 0.45 mg/L, 0.50 mg/L, 0.55 mg/L, 0.60 mg/L, 0.65 mg/L, 0.70 mg/L, 0.75 mg/L, 0.80 mg/L, 0.85 mg/L, 0.90 mg/L, 0.95 mg/L, 1.00 mg/L, 1.50 mg/L, 2.00 mg/L, 2.50 mg/L, 3.00 mg/L, 3.50 mg/L, 4.00 mg/L, 4.50 mg/L, 5.00 mg/L, 5.50 mg/L, 6.00 mg/L, 6.50 mg/L, 7.00 mg/L, 7.50 mg/L, 8.00 mg/L, 8.50 mg/L, 9.00 mg/L, 9.50 mg/L, 10.00 mg/L, 11.00 mg/L, 12.00 mg/L, 13.00 mg/L, 14.00 mg/L, 15.00 mg/L, 16.00 mg/L, 17.00 mg/L, 18.00 mg/L, 19.00 mg/L, 20.00 mg/L, 21.00 mg/L, 22.00 mg/L, 23.00 mg/L, 24.00 mg/L, 25.00 mg/L, 26.00 mg/L, 27.00 mg/L, 28.00 mg/L, 29.00 mg/L, 30.00 mg/L, 31.00 mg/L, 32.00 mg/L, 33.00 mg/L, 34.00 mg/L, 35.00 mg/L, 36.00 mg/L, 37.00 mg/L, 38.00 mg/L, 39.00 mg/L, 40.00 mg/L, 41.00 mg/L, 42.00 mg/L, 43.00 mg/L, 44.00 mg/L, 45.00 mg/L, 46.00 mg/L, 47.00 mg/L, 48.00 mg/L, 49.00 mg/L, and 50.00 mg/L of soil.

In other embodiments, the phytotoxic micronutrients comprising boron or a boron source is applied to a locus to achieve water soluble boron soil concentration ranges as follows (including any/all concentrations between these ranges): 0.01-0.02 mg/L, 0.02-0.03 mg/L, 0.03-0.04 mg/L, 0.04-0.05 mg/L, 0.05-0.06 mg/L, 0.06-0.07 mg/L, 0.07-0.08 mg/L, 0.08-0.09 mg/L, 0.09-0.10 mg/L, 0.10-0.15 mg/L, 0.15-0.20 mg/L, 0.20-0.25 mg/L, 0.25-0.30 mg/L, 0.30-0.35 mg/L, 0.35-0.40 mg/L, 0.40-0.45 mg/L, 0.45-0.50 mg/L, 0.50-0.55 mg/L, 0.55-0.60 mg/L, 0.60-0.65 mg/L, 0.65-0.70 mg/L, 0.70-0.75 mg/L, 0.75-0.80 mg/L, 0.80-0.85 mg/L, 0.85-0.90 mg/L, 0.90-0.95 mg/L, 0.95-1.00 mg/L, 1.00-1.50 mg/L, 1.50-2.00 mg/L, 2.00-2.50 mg/L, 2.50-3.00 mg/L, 3.00-3.50 mg/L, 3.50-4.00 mg/L, 4.00-4.50 mg/L, 4.50-5.00 mg/L, 5.00-5.50 mg/L, 5.50-6.00 mg/L, 6.00-6.50 mg/L, 6.50-7.0 mg/L, 7.00-7.50 mg/L, 7.50-8.0 mg/L, 8.00-8.50 mg/L, 8.50-9.0 mg/L, 9.00-9.50 mg/L, 9.50-10.00 mg/L, 10.00-10.50 mg/L, 10.50-11.00 mg/L, 11.00-11.50 mg/L, 11.50-12.00 mg/L, 12.00-13.00 mg/L, 13.00-14.00 mg/L, 14.00-15.00 mg/L, 15.00-16.00 mg/L, 16.00-17.00 mg/L, 17.00-18.00 mg/L, 18.00-19.00 mg/L, 19.00-20.00 mg/L, 20.00-21.00 mg/L, 21.00-22.00 mg/L, 22.00-23.00 mg/L, 23.00-24.00 mg/L, 24.00-25.00 mg/L, 25.00-26.00 mg/L, 26.00-27.00 mg/L, 27.00-28.00 mg/L, 28.00-29.00 mg/L, 29.00-30.00 mg/L, 30.00-31.00 mg/L, 31.00-32.00 mg/L, 32.00-33.00 mg/L, 33.00-34.00 mg/L, 34.00-35.00 mg/L, 35.00-36.00 mg/L, 36.00-37.00 mg/L, 37.00-38.00 mg/L, 38.00-39.00 mg/L, 39.00-40.00 mg/L, 40.00-41.00 mg/L, 41.00-42.00 mg/L, 42.00-43.00 mg/L, 43.00-44.00 mg/L, 44.00-45.00 mg/L, 45.00-46.00 mg/L, 46.00-47.00 mg/L, 47.00-48.00 mg/L, 48.00-49.00 mg/L, and 49.00-50.00 mg/L of soil.

In one embodiment, 5 mg boron/L concentration is achieved by dissolving 29.4 mg boric acid in 1000 milliliters of water. In another embodiment, the 20 mg boron/L concentration is achieved by dissolving 117.6 mg boric acid in 1000 milliliters of water.

In some embodiments, the phytotoxic micronutrients comprising boron or a boron source has a boron concentration of about 0.5-1 g/L to about 1.00-1.50 g/L, about 1.50-2.00 g/L, about 2.00-2.50 g/L, about 2.50-3.00 g/L, about 3.00-3.50 g/L, about 3.50-4.00 g/L, about 4.00-4.50 g/L, about 4.50-5.00 g/L, about 5.00-5.50 g/L, about 5.50-6.00 g/L, about 6.00-6.50 g/L, about 6.50-7.0 g/L, about 7.00-7.50 g/L, about 7.50-8.0 g/L, about 8.00-8.50 g/L, about 8.50-9.0 g/L, about 9.00-9.50 g/L, about 9.50-10.00 g/L, about 10.00-11.00 g/L, about 11.00-12.00 g/L, about 12.00-13.00 g/L, about 13.00-14.00 g/L, about 14.00-15.00 g/L, about 15.00-16.00 g/L, about 16.00-17.00 g/L, about 17.00-18.00 g/L, about 18.00-19.00 g/L, about 19.00-20.00 g/L, about 20.00-21.00 g/L, about 21.00-22.00 g/L, about 22.00-23.00 g/L, about 23.00-24.00 g/L, about 24.00-25.00 g/L, about 25.00-26.00 g/L, about 26.00-27.00 g/L, about 27.00-28.00 g/L, about 28.00-29.00 g/L, about 29.00-30.00 g/L, about 30.00-31.00 g/L, about 31.00-32.00 g/L, about 32.00-33.00 g/L, about 33.00-34.00 g/L, about 34.00-35.00 g/L, about 35.00-36.00 g/L, about 36.00-37.00 g/L, about 37.00-38.00 g/L, about 38.00-39.00 g/L, about 39.00-40.00 g/L, about 40.00-41.00 g/L, about 41.00-42.00 g/L, about 42.00-43.00 g/L, about 43.00-44.00 g/L, about 44.00-45.00 g/L, about 45.00-46.00 g/L, about 46.00-47.00 g/L, about 47.00-48.00 g/L, about 48.00-49.00 g/L, about 49.00-50.00 g/L, about 50.00-55.00 g/L, about 55.00-60.00 g/L, about 60.00-65.00 g/L, about 65.00-70.00 g/L, about 70.00-75.00 g/L, about 75.00-80.00 g/L, about 85.00-90.00 g/L, about 90.00-95.00 g/L, or about 95.00-100.00 g/L in a liquid formulation of interest.

In one embodiment, a 10% B liquid that can be publicly obtained and/or purchased is diluted to 10:1 mix (Water: 10% B liquid), which is 1% B solution. This 1% B solution has a boron concentration of about 100 g/L.

In one embodiment, 14.1 g boron/L concentration (B1044) is achieved by dissolving 1044 grams of 20.5% boron into 4 gallons of water. In one embodiment, 17.6 g boron/L concentration (B1300) is achieved by dissolving 1300 grams of 20.5% boron into 4 gallons of water. In one embodiment, 19.4 g boron/L concentration (B1440) is achieved by dissolving 1440 grams of 20.5% boron into 4 gallons of water. In one embodiment, 35.2 g boron/L concentration (B2600) is achieved by dissolving 2600 grams of 20.5% boron into 4 gallons of water.

In one embodiment, the phytotoxic micronutrient comprising boron or a boron source can be prepared by dissolving boron or a boron source in cold water, room-temperature water, lukewarm water, warm water, hot water or boiling water.

In some embodiments, the phytotoxic micronutrients comprising boron or a boron source is in a liquid formulation.

In one embodiment, the phytotoxic micronutrients comprising boron or a boron source is in a dry formulation. In some embodiments, the dry formulation is a coarse granular form, fine granular form, or a powder form. In some embodiments, the phytotoxic micronutrients in powder form is more soluble than the phytotoxic micronutrients in a fine granular form. In some embodiments, the phytotoxic micronutrients in fine granular form is more soluble than the phytotoxic micronutrients in a coarse granular form.

In some embodiments, the phytotoxic micronutrients comprising boron or a boron source is in a dry formulation comprises about 5% to about 40% elemental boron by weight of the phytotoxic micronutrients, or any value and subranges there between. In some embodiments, the phytotoxic micronutrients comprising boron or a boron source is in a dry formulation comprises about 5% to about 30% elemental boron by weight of the phytotoxic micronutrients, and any value and subranges there between. In some embodiments, the phytotoxic micronutrients comprising boron or a boron source is in a dry formulation comprises about 10% to about 30% elemental boron by weight of the phytotoxic micronutrients, and any value and subranges there between. In some embodiments, the phytotoxic micronutrients comprising boron or a boron source is in a dry formulation comprises about 10% to about 25% elemental boron by weight of the phytotoxic micronutrients, and any value and subranges there between.

In some embodiments, the phytotoxic micronutrients comprising boron or a boron source is in a dry formulation comprises 5%, about 6%, about 7%, about 8%, about 9%, about 10%, about 11%, about 12%, about 13%, about 14%, about 15%, about 16%, about 17%, about 18%, about 19%, about 20%, about 21%, about 22%, about 23%, about 24%, about 25%, about 26%, about 27%, about 28%, about 29%, about 30%, about 31%, about 32%, about 33%, about 34%, about 35%, about 36%, about 37%, about 38%, about 39%, and about 40%,elemental boron by weight of the phytotoxic micronutrients.

In one embodiment, the rates of application of the phytotoxic micronutrients comprising boron or a boron source is at about 1 lbs. to about 200 lbs. of elemental boron per acre, and any value and subranges there between. In some embodiments, the rates of application of the phytotoxic micronutrients comprising boron or a boron source is at about 5 lbs. to about 160 lbs. of elemental boron per acre, and any value and subranges there between. In some embodiments, the rates of application of the phytotoxic micronutrients comprising boron or a boron source is at about 5 lb s., about 10 lb s., about 15 lb s., about 20 lb s., about 25 lbs., about 30 lb s., about 35 lbs., about 40 lbs., about 45 lbs., about 50 lbs., about 55 lbs., about 60 lbs., about 65 lbs., about 70 lbs., about 75 lbs., about 80 lbs., about 85 lbs., about 90 lbs., about 95 lbs., about 100 lbs., about 105 lbs., about 110 lbs., about 115 lbs., about 120 lbs., about 125 lbs., about 130 lbs., about 135 lbs., about 140 lbs., about 145 lbs., about 150 lbs. about 155 lbs., or about 160 lbs. of elemental boron per acre.

In some embodiments, the rates of application of the phytotoxic micronutrients comprising boron or a boron source for turf and range treatment of weeds is at about 5 lbs. to about 160 lbs. of elemental boron per acre, and any value and subranges there between. In some embodiments, the rates of application of the phytotoxic micronutrients comprising boron or a boron source for turf and range treatment of weeds is at about 8-100 lbs. of elemental boron per acre. In other embodiments, the rates of application of the phytotoxic micronutrients comprising boron or a boron source for turf and range treatment of weeds is at about 9 lbs. of elemental boron per acre, about 25 lbs. of elemental boron per acre, about 50 lbs. of elemental boron per acre, about 75 lbs. of elemental boron per acre and about 100 lbs. of elemental boron per acre.

In some embodiments, the rates of application of the phytotoxic micronutrients comprising boron or a boron source for rangeland treatment of invasive species is at about 5 lbs. to about 160 lbs. of elemental boron per acre, and any value and subranges there between. In some embodiments, the rates of application of the phytotoxic micronutrients comprising boron or a boron source for rangeland treatment of invasive species is at about 5 lbs., about 10 lbs., about 15 lbs., about 20 lbs., about 25 lbs., about 30 lbs., about 35 lbs., about 40 lbs., about 45 lbs., about 50 lbs., about 55 lbs., about 60 lbs., about 65 lbs., about 70 lbs., about 75 lbs., about 80 lbs., about 85 lbs., about 90 lbs., about 95 lbs., about 100 lbs., about 105 lbs., about 110 lbs., about 115 lbs., about 120 lbs., about 125 lbs., about 130 lbs., about 135 lbs., about 140 lbs., about 145 lbs., about 150 lbs. about 155 lbs., or about 160 lbs. of elemental boron per acre. In some embodiments, the rates of application of the phytotoxic micronutrients comprising boron or a boron source for rangeland treatment of cheatgrass is at about 5 lbs., about 10 lbs., about 15 lbs., about 20 lbs., about 25 lbs., about 30 lbs., about 35 lbs., about 40 lbs., about 45 lbs., about 50 lbs., about 55 lbs., about 60 lbs., about 65 lbs., about 70 lbs., about 75 lbs., about 80 lbs., about 85 lbs., about 90 lbs., about 95 lbs., about 100 lbs., about 105 lbs., about 110 lbs., about 115 lbs., about 120 lbs., about 125 lbs., about 130 lbs., about 135 lbs., about 140 lbs., about 145 lbs., about 150 lbs. about 155 lbs., or about 160 lbs. of elemental boron per acre. In one embodiment, the phytotoxic micronutrients comprising boron or a boron source for rangeland treatment of cheatgrass is in a dry formulation. In some embodiments, the dry formulation can be applied to the soil.

In one embodiment, the phytotoxic micronutrients comprising boron or a boron source for rangeland treatment of cheatgrass is in a liquid formulation, which can be applied at a rate of about 5 lbs. to about 30 lbs. of elemental boron per acre, and any value and subranges there between. In some embodiments, the phytotoxic micronutrients comprising boron or a boron source for rangeland treatment of cheatgrass is in a liquid formulation, which can be applied at a rate of about 15 lbs. of elemental boron per acre. In some embodiments, the liquid formulation can be applied to the plant tissue.

In some embodiments, the rates of application of the phytotoxic micronutrients comprising boron or a boron source for turf treatment of invasive species is at about 5 lbs. to about 125 lbs. of elemental boron per acre, and any value and subranges there between. In some embodiments, the rates of application of the phytotoxic micronutrients comprising boron or a boron source for turf treatment of invasive species is about 5 lbs., about 10 lbs., about 15 lbs., about 20 lbs., about 25 lbs., about 30 lbs., about 35 lbs., about 40 lbs., about 45 lbs., about 50 lbs., about 55 lbs., about 60 lbs., about 65 lbs., about 70 lbs., about 75 lbs., about 80 lbs., about 85 lbs., about 90 lbs., about 95 lbs., about 100 lbs., about 105 lbs., about 110 lbs., about 115 lbs., about 120 lbs., about 125 lbs., about 130 lbs., about 135 lbs., about 140 lbs., about 145 lbs., about 150 lbs. about 155 lbs., or about 160 lbs. of elemental boron per acre. In some embodiments, the rates of application of the phytotoxic micronutrients comprising boron or a boron source for turf treatment of dandelions is about 5 lbs., about 10 lbs., about 15 lbs., about 20 lbs., about 25 lbs., about 30 lbs., about 35 lbs., about 40 lbs., about 45 lbs., about 50 lbs., about 55 lbs., about 60 lbs., about 65 lbs., about 70 lbs., about 75 lbs., about 80 lbs., about 85 lbs., about 90 lbs., about 95 lbs., about 100 lbs., about 105 lbs., about 110 lbs., about 115 lbs., about 120 lbs., about 125 lbs., about 130 lbs., about 135 lbs., about 140 lbs., about 145 lbs., about 150 lbs. about 155 lbs., or about 160 lbs. of elemental boron per acre. In some embodiments, the rates of application of the phytotoxic micronutrients comprising boron or a boron source for turf treatment of clovers is at about 5 lbs., about 10 lbs., about 15 lbs., about 20 lbs., about 25 lbs., about 30 lbs., about 35 lbs., about 40 lbs., about 45 lbs., about 50 lbs., about 55 lbs., about 60 lbs., about 65 lbs., about 70 lbs., about 75 lbs., about 80 lbs., about 85 lbs., about 90 lbs., about 95 lbs., about 100 lbs., about 105 lbs., about 110 lbs., about 115 lbs., about 120 lbs., about 125 lbs., about 130 lbs., about 135 lbs., about 140 lbs., about 145 lbs., about 150 lbs. about 155 lbs., or about 160 lbs. of elemental boron per acre. In some embodiments, the rates of application of the phytotoxic micronutrients comprising boron or a boron source for turf treatment of dandelions and/or clovers is at about 5 lbs., about 10 lbs., about 15 lbs., about 20 lbs., about 25 lbs., about 30 lbs., about 35 lbs., about 40 lbs., about 45 lbs., about 50 lbs., about 55 lbs., about 60 lbs., about 65 lbs., about 70 lbs., about 75 lbs., about 80 lbs., about 85 lbs., about 90 lbs., about 95 lbs., about 100 lbs., about 105 lbs., about 110 lbs., about 115 lbs., about 120 lbs., about 125 lbs., about 130 lbs., about 135 lbs., about 140 lbs., about 145 lbs., about 150 lbs. about 155 lbs., or about 160 lbs. of elemental boron per acre.

In one embodiment, the phytotoxic micronutrients comprising boron or a boron source for turf treatment of dandelions and/or clovers is in a dry formulation which can be applied at a rate of about 25 lbs. to about 100 lbs. of elemental boron per acre. In some embodiments, the dry formulation can be applied to the soil.

In one embodiment, the phytotoxic micronutrients comprising boron or a boron source for turf treatment of dandelions and/or clovers is in a liquid formulation, which can be applied at a rate of about 5 lbs. to about 150 lbs. of elemental boron per acre, and any value and subranges there between. In some embodiments, the phytotoxic micronutrients comprising boron or a boron source for turf treatment of dandelions and/or clovers is in a liquid formulation, which can be applied at a rate of about 15 lbs. to 100 lbs. of elemental boron per acre. In some embodiments, the liquid formulation can be applied to the plant tissue. In some embodiments, the liquid formulation can be used in a foliar spray on plant tissue with unknown amounts of the phytotoxic micronutrients drizzling down into the soil.

When the phytotoxic micronutrients comprising boron or a boron source is applied as a dry, spreadable powder, some source of boron is crystalline, powdered boric acid, or in other boron-containing compounds. In an embodiment, the application of a dry formulation of boron containing phytotoxic micronutrients can be in a flowable form, e.g., 1.98 g boric acid per square meter is applied to the target area.

Applying a boron-containing formulation to weed seeds, weed seedlings, and/or weed plants functions by disrupting the target species cell physiology when moisture-containing boron is imbibed by the seed or seedling from the soil. While control of invasive plant species is the outcome of the disclosure, the applications of micronutrients are intended to change the soil chemistry. The soil is the host of the micronutrients delivered to the invasive plant species. In each application embodiment, whether liquid or dry, the applied boron is made plant-available through either dissolution by rainfall, snowmelt or other environmental conditions, or plant uptake of the liquid application, and is therefore plant-available regardless of the form of application. The actual mechanism of boron involvement in plant physiology remains somewhat unclear. There is a very narrow window between the levels of boron required by and toxic to plants. The subject disclosure discloses the specific, narrow window of concentrations of boron toxic to invasive plant species, thereby allowing control by application of boron concentrations in excess of invasive plant species toxic limits, yet below levels toxic to desirable species.

Another embodiment of the application of the phytotoxic micronutrients entails measuring the amount of plant-available boron in the soil in the target area and adding supplemental boron to achieve an effective level harmful to invasive plant species, but not harmful to desirable vegetation (also referred to as the Induced Phytotoxicity Threshold or IPT). Under this embodiment, the naturally occurring soil boron level is measured therein establishing a baseline boron concentration. This method is made possible by laboratory, greenhouse and field-testing of common plant species and development of unique characteristic dose-response curves identifying plant growth characteristics resulting from varying the water soluble boron concentrations across the range of about 0.5 to about 50 mg/L. The novel finding that facilitates the disclosure is the sensitivity of invasive plants species to low levels of water soluble soil boron compared to desirable plant species found on rangeland or other environments.

As well known to those skilled in the art, application rates can be calculated based on the purity of the micronutrient in the composition being applied. For example, if one wants to apply 50 lbs. of boron per acre and the coarse granular fertilizer has a boron purity of 14.3%, then 349.7 lbs. of the fertilizer must be applied per acre. For a fine granular fertilizer with a boron purity of 15%, the amount of fertilizer to be applied would be 333.3 lbs. per acre. If a powder fertilizer had a boron purity of 20.5%, then 243.9 lbs. must be applied per acre. The solubility of each type of these fertilizers in water is, in general, low, moderate and high, respectively.

Each of the embodiments of the present disclosure as described herein for preparation and application of boron are similarly applicable to formulations containing the other micronutrients useful for this disclosure. Such formulations containing the other micronutrients, or combinations thereof, may be similarly prepared and applied to a target area, depending on the invasive species that is to be controlled or eradicated and the IPT for that species, micronutrient and target area soil conditions or preexisting micronutrient levels.

Boron toxicity to invasive plant species appears to cause significant changes in the physiology and activity of numerous enzymes in seed and seedling development, and consequently plant metabolism during the life cycle of the plant. Three main candidates for boron toxicity involve the ability of boron to bind compounds with two hydroxyl groups in the cis-configuration: (a) alteration of cell wall structure; (C) metabolic disruption by binding to the ribose moieties of molecules such as adenosine triphosphate (ATP), nicotinamide adenine dinucleotide; and (c) disruption of cell division and development by binding to ribose, either as a free sugar or within RNA. However, the only defined physiological role of boron in plants is as a cross-linking molecule involving reversible covalent bonds with cis-diols on either side of borate. Because boronic acids cannot cross-link two molecules, the addition of boronic acids causes the disruption of cytoplasmic strands and cell-to-cell wall detachment. Boronic acids appear to specifically disrupt or prevent borate-dependent cross-links important for the structural integrity of the cell, including the organization of transvacuolar cytoplasmic strands. Boron likely plays a structural role in the plant cytoskeleton.

Phytotoxic Micronutrients Comprising Copper or a Copper Source

In one embodiment, the phytotoxic micronutrients comprises copper or a copper source. In some embodiments, a copper source can be selected from Table 1. In one embodiment, the phytotoxic micronutrients comprising copper or a copper source is highly soluble compared to geological mineral sources in the natural soil.

TABLE 1

Fertilizer sources of copper.

| Source | Formula | % Copper by weight |
|---|---|---|
| Copper chelate | $Na_2CuEDTA$ | 13 |
| Copper sulfate | $CuSO_4 \cdot 5H_2O$ | 25 |
| Cupric oxide | $CuO$ | 75 |
| Cuprous oxide | $Cu_2O$ | 89 |

Table 1 shows the percentage of elemental copper by weight in each of the listed copper source. Thus, in order to apply the phytotoxic micronutrients at a rate of 10 pounds/acre of copper using the $Na_2CuEDTA$, 76.9 pounds of $Na_2CuEDTA$ will be required as the copper content in the $Na_2CuEDTA$ is 13% by weight. Similarly, for the same rate of copper application, 40 pounds copper sulfate will be required per acre, or 13 pounds of cupric oxide per acre, or 11.2 pounds of cuprous oxide per acre.

Whether the phytotoxic micronutrient is applied as a dry formulation or as a liquid formulation is irrelevant as the objective is to achieve the desired amount of the micronutrients in the soil to favor the species desired and reduce or eliminate the invasive weedy species.

In some embodiments of the present disclosure, the phytotoxic micronutrients comprising copper or a copper source is applied to a locus to achieve copper soil concentration ranges as follows (including any and all concentrations between these ranges): 1-25 mg/Kg, 25-50 mg/Kg, 50-75 mg/Kg, 75-100 mg/Kg, 100-125 mg/Kg, 125-150 mg/Kg, 150-175 mg/Kg, 175-200 mg/Kg, 200-225 mg/Kg, 225-250 mg/Kg, 250-275 mg/Kg, 275-300 mg/Kg, 300-325 mg/Kg, 325-350 mg/Kg, 350-375 mg/Kg, 375-400 mg/Kg, 400-425 mg/Kg, 425-450 mg/Kg, 450-475 mg/Kg, 475-500 mg/Kg, 500-525 mg/Kg, 525-550 mg/Kg, 550-575 mg/Kg, 575-600 mg/Kg, 600-625 mg/Kg, 625-650 mg/Kg, 650-675 mg/Kg, 675-700 mg/Kg, 700-725 mg/Kg, 725-750 mg/Kg, 750-775 mg/Kg, 775-800 mg/Kg, 800-825 mg/Kg, 825-850 mg/Kg, 850-875 mg/Kg, 875-900 mg/Kg, 900-925 mg/Kg, 925-950 mg/Kg, 950-975 mg/Kg, 975-1000 mg/Kg, 1000-1025 mg/Kg, 1025-1050 mg/Kg, 1050-1075 mg/Kg, 1075-1100 mg/Kg, 1100-1125 mg/Kg, 1125-1150 mg/Kg, 1150-1175 mg/Kg, 1175-1200 mg/Kg, 1200-1225 mg/Kg, 1225-1250 mg/Kg, 1250-1275 mg/Kg, 1275-1300 mg/Kg, 1300-1325 mg/Kg, 1325-1350 mg/Kg, 1350-1375 mg/Kg, 1375-1400 mg/Kg, 1400-1425 mg/Kg, 1425-1450 mg/Kg, 1450-1475 mg/Kg, 1475-1500 mg/Kg, 1500-1525 mg/Kg, 1525-1550 mg/Kg, 1550-1575 mg/Kg, 1575-1600 mg/Kg, 1600-1625 mg/Kg, 1625-1650 mg/Kg, 1650-1675 mg/Kg, 1675-1700 mg/Kg, 1700-1725 mg/Kg, 1725-1750 mg/Kg, 1750-1775 mg/Kg, 1775-1800 mg/Kg, 1800-1825 mg/Kg, 1825-1850 mg/Kg, 1850-1875 mg/Kg, 1875-1900 mg/Kg, 1900-1925 mg/Kg, 1925-1950 mg/Kg, 1950-1975 mg/Kg, 1975-2000 mg/Kg, 2000-2025 mg/Kg, 2025-2050 mg/Kg, 2050-2075 mg/Kg, 2075-2100 mg/Kg, 2100-2125 mg/Kg, 2125-2150 mg/Kg, 2150-2175 mg/Kg, 2175-2200 mg/Kg, 2200-2225 mg/Kg, 2225-2250 mg/Kg, 2250-2275 mg/Kg, 2275-2300 mg/Kg, 2300-2325 mg/Kg, 2325-2350 mg/Kg, 2350-2375 mg/Kg, 2375-2400 mg/Kg, 2400-2425 mg/Kg, 2425-2450 mg/Kg, 2450-2475 mg/Kg, 2475-2500 mg/Kg, 2500-2525 mg/Kg, 2525-2550 mg/Kg, 2550-2575 mg/Kg, 2575-2600 mg/Kg, 2600-2625 mg/Kg, 2625-2650 mg/Kg, 2650-2675 mg/Kg, 2675-2700 mg/Kg, 2700-2725 mg/Kg, 2725-2750 mg/Kg, 2750-2775 mg/Kg, 2775-2800 mg/Kg, 2800-2825 mg/Kg, 2825-2850 mg/Kg, 2850-2875 mg/Kg, 2875-2900 mg/Kg, 2900-2925 mg/Kg, 2925-2950 mg/Kg, 2950-2975, and 2975-3000 milligrams of copper per kilogram of soil. In other embodiments of the present disclosure, copper micronutrient is applied to a locus to achieve a soil copper concentration of about: 25 mg/Kg, 50 mg/Kg, 75 mg/Kg, 100 mg/Kg, 125 mg/Kg, 150 mg/Kg, 175 mg/Kg, 200 mg/Kg, 225 mg/Kg, 250 mg/Kg, 275 mg/Kg, 300 mg/Kg, 325 mg/Kg, 350 mg/Kg, 375 mg/Kg, 400 mg/Kg, 425 mg/Kg, 450 mg/Kg, 475 mg/Kg, 500 mg/Kg, 525 mg/Kg, 550 mg/Kg, 575 mg/Kg, 600 mg/Kg, 625 mg/Kg, 650 mg/Kg, 675 mg/Kg, 700 mg/Kg, 725 mg/Kg, 750 mg/Kg, 775 mg/Kg, 800 mg/Kg, 825 mg/Kg, 850 mg/Kg, 875 mg/Kg, 900 mg/Kg, 925 mg/Kg, 950 mg/Kg, 975 mg/Kg, 1000 mg/Kg, 1025 mg/Kg, 1050 mg/Kg, 1075 mg/Kg, 1100 mg/Kg, 1125 mg/Kg, 1150 mg/Kg, 1175 mg/Kg, 1200 mg/Kg, 1225 mg/Kg, 1250 mg/Kg, 1275 mg/Kg, 1300 mg/Kg, 1325 mg/Kg, 1350 mg/Kg, 1375 mg/Kg, 1400 mg/Kg, 1425 mg/Kg, 1450 mg/Kg, 1475 mg/Kg, 1500 mg/Kg, 1525 mg/Kg, 1550 mg/Kg, 1575 mg/Kg, 1600 mg/Kg, 1625 mg/Kg, 1650 mg/Kg, 1675 mg/Kg, 1700 mg/Kg, 1725 mg/Kg, 1750 mg/Kg, 1775 mg/Kg, 1800 mg/Kg, 1825 mg/Kg, 1850 mg/Kg, 1875 mg/Kg, 1900 mg/Kg, 1925 mg/Kg, 1950 mg/Kg, 1975 mg/Kg, 2000 mg/Kg, 2025 mg/Kg, 2050 mg/Kg, 2075 mg/Kg, 2100 mg/Kg, 2125 mg/Kg, 2150 mg/Kg, 2175 mg/Kg, 2200 mg/Kg, 2225 mg/Kg, 2250 mg/Kg, 2275 mg/Kg, 2300 mg/Kg, 2325 mg/Kg, 2350 mg/Kg, 2375 mg/Kg, 2400 mg/Kg, 2425 mg/Kg, 2450 mg/Kg, 2475 mg/Kg, 2500 mg/Kg, 2525 mg/Kg, 2550 mg/Kg, 2575 mg/Kg, 2600 mg/Kg, 2625 mg/Kg, 2650 mg/Kg, 2675 mg/Kg, 2700 mg/Kg, 2725 mg/Kg, 2750 mg/Kg, 2775 mg/Kg, 2800 mg/Kg, 2825 mg/Kg, 2850 mg/Kg, 2875 mg/Kg, 2900 mg/Kg, 2925 mg/Kg, 2950 mg/Kg, 2975 mg/Kg, and 3000 milligrams of copper per kilogram of soil.

Copper compounds vary in solubility. Therefore, the plant-available amounts of copper will vary in the soil in accordance to the mineral form of copper and their respective solubility. For example, copper fertilizers might be as much as 50% soluble while copper fallout from a smelter might be less than 1% soluble. Likewise, soil acidity is an important control on copper solubility. For a given total elemental amount of copper, the plant availability (solubility) may vary by orders of magnitude in accordance with the soil pH.

In some embodiments of the present disclosure, the phytotoxic micronutrients comprising copper or a copper source is applied to a locus to achieve a soluble copper soil concentration of about: 0.01 mg/L, 0.02 mg/L, 0.03 mg/L, 0.04 mg/L, 0.05 mg/L, 0.06 mg/L, 0.07 mg/L, 0.08 mg/L, 0.09 mg/L, 0.10 mg/L, 0.15 mg/L, 0.20 mg/L, 0.25 mg/L, 0.30 mg/L, 0.35 mg/L, 0.40 mg/L, 0.45 mg/L, 0.50 mg/L, 0.55 mg/L, 0.60 mg/L, 0.65 mg/L, 0.70 mg/L, 0.75 mg/L, 0.80 mg/L, 0.85 mg/L, 0.90 mg/L, 0.95 mg/L, 1.00 mg/L, 1.50 mg/L, 2.00 mg/L, 2.50 mg/L, 3.00 mg/L, 3.50 mg/L, 4.00 mg/L, 4.50 mg/L, 5.00 mg/L, 5.50 mg/L, 6.00 mg/L, 6.50 mg/L, 7.00 mg/L, 7.50 mg/L, 8.00 mg/L, 8.50 mg/L, 9.00 mg/L, 9.50 mg/L, 10.00 mg/L, 11.00 mg/L, 12.00 mg/L, 13.00 mg/L, 14.00 mg/L, 15.00 mg/L, 16.00 mg/L, 17.00 mg/L, 18.00 mg/L, 19.00 mg/L, 20.00 mg/L, 21.00 mg/L, 22.00 mg/L, 23.00 mg/L, 24.00 mg/L, 25.00 mg/L, 26.00 mg/L, 27.00 mg/L, 28.00 mg/L, 29.00 mg/L, 30.00 mg/L, 31.00 mg/L, 32.00 mg/L, 33.00 mg/L, 34.00 mg/L, 35.00 mg/L, 36.00 mg/L, 37.00 mg/L, 38.00 mg/L, 39.00 mg/L, 40.00 mg/L, 41.00 mg/L, 42.00 mg/L, 43.00 mg/L, 44.00 mg/L, 45.00 mg/L, 46.00 mg/L, 47.00 mg/L, 48.00 mg/L, 49.00 mg/L, and 50.00 mg/L of soil.

In other embodiments of the present disclosure, the phytotoxic micronutrients comprising copper or a copper source is applied to a locus to achieve soluble copper soil concentration ranges as follows (including any/all concentrations between these ranges): 0.01-0.02 mg/L, 0.02-0.03 mg/L, 0.03-0.04 mg/L, 0.04-0.05 mg/L, 0.05-0.06 mg/L, 0.06-0.07 mg/L, 0.07-0.08 mg/L, 0.08-0.09 mg/L, 0.09-0.10 mg/L, 0.10-0.15 mg/L, 0.15-0.20 mg/L, 0.20-0.25 mg/L, 0.25-0.30 mg/L, 0.30-0.35 mg/L, 0.35-0.40 mg/L, 0.40-0.45 mg/L, 0.45-0.50 mg/L, 0.50-0.55 mg/L, 0.55-0.60 mg/L, 0.60-0.65 mg/L, 0.65-0.70 mg/L, 0.70-0.75 mg/L, 0.75-0.80 mg/L, 0.80-0.85 mg/L, 0.85-0.90 mg/L, 0.90-0.95 mg/L, 0.95-1.00 mg/L, 1.00-1.50 mg/L, 1.50-2.00 mg/L, 2.00-2.50 mg/L, 2.50-3.00 mg/L, 3.00-3.50 mg/L, 3.50-4.00 mg/L, 4.00-4.50 mg/L, 4.50-5.00 mg/L, 5.00-5.50 mg/L, 5.50-6.00 mg/L, 6.00-6.50 mg/L, 6.50-7.0 mg/L, 7.00-7.50 mg/L, 7.50-8.0 mg/L, 8.00-8.50 mg/L, 8.50-9.0 mg/L, 9.00-9.50 mg/L, 9.50-10.00 mg/L, 10.00-10.50 mg/L, 10.50-11.00 mg/L, 11.00-11.50 mg/L, 11.50-12.00 mg/L, 12.00-13.00 mg/L, 13.00-14.00 mg/L, 14.00-15.00 mg/L, 15.00-16.00 mg/L, 16.00-17.00 mg/L, 17.00-18.00 mg/L, 18.00-19.00 mg/L, 19.00-20.00 mg/L, 20.00-21.00 mg/L, 21.00-22.00 mg/L, 22.00-23.00 mg/L, 23.00-24.00 mg/L, 24.00-25.00 mg/L, 25.00-26.00 mg/L, 26.00-27.00 mg/L, 27.00-28.00 mg/L, 28.00-29.00 mg/L, 29.00-30.00 mg/L, 30.00-31.00 mg/L, 31.00-32.00 mg/L, 32.00-33.00 mg/L, 33.00-34.00 mg/L, 34.00-35.00 mg/L, 35.00-36.00 mg/L, 36.00-37.00 mg/L, 37.00-38.00 mg/L, 38.00-39.00 mg/L, 39.00-40.00 mg/L, 40.00-41.00 mg/L, 41.00-42.00 mg/L, 42.00-43.00 mg/L, 43.00-44.00 mg/L, 44.00-45.00 mg/L, 45.00-46.00 mg/L, 46.00-47.00 mg/L, 47.00-48.00 mg/L, 48.00-49.00 mg/L, and 49.00-50.00 mg/L of soil. In one embodiment, the phytotoxic micronutrients comprising copper or a copper source is applied to a locus to achieve soluble copper soil concentration of about 0.1 mg/L to about 50 mg/L. In one embodiment, the phytotoxic micronutrients comprising copper or a copper source is applied to a locus to achieve soluble copper soil concentration of about 0.1 mg/L to about 5 mg/L.

Many variations of the phytotoxic micronutrients will occur to those skilled in the art. Some variations include plant micronutrients in addition to or in place of boron. Known plant micronutrients include boron, copper, zinc, manganese, iron, chlorine and molybdenum. Other variations call for variations and ranges of the concentrations of each element being applied, and the compound source for the micronutrient. See, e.g., Table 1 supra. Other variations include application of combinations of more than one plant micronutrient. Other variations include application of micronutrients with macronutrients nitrogen (N), phosphorous (P) or potassium (K). Additional variations include the targeted invasive plant species subject to control or eradication. Additional variations include the type of site or landscape the methods and compositions of this disclosure may be applied to. There are many different techniques, which may be used to apply or distribute a specific form of the compounds (whether liquid or dry). The application rate can be adjusted across a range from low to high concentration to reduce, control, and eliminate/eradicate a particular invasive plant species or species. The application rate can be adjusted and applied to protect against future invasion by invasive species. The application rate can also be applied at such levels to cause a phytotoxic condition for all plants resulting in bare ground. All such variations are intended to be within the scope and spirit of the disclosure.

Although some embodiments are shown to include certain features or steps, the applicant specifically contemplates that any feature or step disclosed herein may be used together or in combination with any other feature or step in any embodiment of the disclosure. It is also contemplated that any feature or step may be specifically excluded from any embodiment of the disclosure.

The utility of the phytotoxic micronutrients is multi-fold and includes but is not limited to:

a) usefulness for control or eradication of invasive plant species currently occupying more than 100 million acres in the U.S.;
b) can comprise non-synthetic, non-organic naturally occurring inorganic earth elements, which are known plant nutrients, non-carcinogenic and non-impairing to soil and water resources at the low concentrations involved in this disclosure;
c) can be relatively inexpensive, easily accessible materials, combined with relatively simplified methods of utilization;
d) boron sources such as boric acid, borate salts or boron (and the other micronutrients of the disclosure) are neither classified as endocrine disruptors nor are they currently on the list of compounds being screened by the U.S. EPA as part of the Endocrine Disruptor Screening Program (EDSP) for potential in humans;
e) boron sources such as boric acid and borate salts (and the other micronutrients of the disclosure) are classified by the U.S. EPA as "not likely to be carcinogenic to humans" under the 2005 carcinogen assessment guidelines;
f) no reported risk from occupational exposures studies indicating the carcinogenicity of boric acid, borate salts or boron (and the other micronutrients of the disclosure);
g) the effectiveness and use of the subject disclosure is facilitated by the application of relatively small/minute amounts of material required to treat large areas of land;
h) elective to weedy plant species, allowing the phytotoxic micronutrients to be used on land parcels of mixed plant communities without significant adverse impact on desired plant species;
i) application of low concentrations of micronutrient-containing compositions to plants, seeds, seedlings or soil which results in phytotoxic responses of weedy species while minimizing impact to existing desirable native plant species; and,
j) has potential applications to a wide variety of cropping systems including but not limited to rangelands, golf courses, pastures, meadows, flooded fields (e.g., rice), bogs or marshes (e.g., cranberries), orchards (e.g., oranges, avocadoes, apples, peaches), row cropping systems (e.g., corn/maize, oats, wheat, soybean, cotton), arbor or trealis systems (e.g., grapes, snap peas), and hill plantings (e.g., melons, squash, cucumbers, sweet corn, okra).

The low rates of the application for the phytotoxic micronutrients are also manifested in low unit cost per land area treated.

Extensive research has documented that plants are often sensitive to relatively minute concentrations or exposures to unique synthetic compounds or combinations of naturally occurring elements, including micronutrients. For example, glyphosate (aka ROUNDUP®, a synthetic Monsanto/Bayer product) is effective at causing photosynthetic disruption in chlorophyllitic plants at an application rate of as little as 0.75 pounds active ingredient per acre, which equates to only approximately 8 mg/square foot of application, equivalent to approximately 14 ppm application rate. The American Phytopathological Society (APS) reported that micronutrients are generally toxic when present in high amounts, although 'high concentrations' are not clearly defined, and little toxicity have been reported at exceptionally low micronutrient concentrations. This occurrence is known as micronutrient toxicity syndrome (MTS). As an example, Jong et al. (1996) reported micro-nutrient toxicity in French marigold induced from boron, copper, iron, manganese, molybdenum, and zinc at concentrations of 0.5, 4, 2, 1 and 5 mg/L, respectively. In addition, plants can vary considerably from species to species in their susceptibility to nutrient toxicities. For example, Lee and others (1996) reported inducing seed geranium (*Pelargonium×hortorum*) micronutrient toxicity symptoms by applying nutrient solutions containing 0.5 mg/L B, Cu, or Zn, or as little as 0.25 mg/L Mo, in combination with nitrogen, phosphorus, and potassium. Micronutrient toxicity has also been reported for Begonia, Chrysanthemum, Geraniums, Marigolds, Poinsettia, and *Lilium longiflorum* (Hammer et al. 1987; Jong-Myung et al. 1996; Lee et al. 1996; Marousky, 1981).

The toxic effects of excessive application of nutrients to agricultural and horticultural crops are well documented. Even the macronutrient nitrogen can be toxic to plants if applied in excess. Similarly, excessive application of micronutrients can cause phytotoxic effects. However, excessive micronutrient concentrations are rarely found in native soils, with the exception of mineralized areas. In mineral soils, release of micronutrients is usually quite slow. Much of the available soil micronutrients are held rather tightly by soil organic material and thus toxicity to plants is not a frequent occurrence under 'field' conditions. For the majority of landscape plants micronutrient concentrations in the saturated soil paste extract between 0.15-0.5 parts per million are desired. Depending on plant sensitivity, some of these elements can be toxic at soil test concentrations above one part per million. Nutrient toxicity does not often occur in most arable soils. Such toxicity exerts different effects on very diverse processes in vascular plants, such as altered metabolism, reduced root cell division, lower leaf chlorophyll contents and photosynthetic rates, and decreased lignin and suberin levels, among others (Nable et. al. 1997; Reid 2007b). Accordingly, reduced growth of shoots and roots is typical of plants exposed to high micronutrient levels (Nable et al. 1990). Referring to Keren and Bingham (1985), safe concentrations of micro-nutrients in irrigation water range from 0.3 mg/L for sensitive plants [i.e. avocado (*Persea americana*), apple (*Malus domestica*) and bean (*Phaseolus vulgaris*)], 1-2 mg/L for semi tolerant plants [oat (*Avena sativa*), maize (*Zea mays*), potato (*Solanum tuberosum*)], and 2-4 mg/L for tolerant plants [i.e. carrot (*Daucus carota*), alfalfa (*Medicago sativa*) and sugar beet (*Beta vulgaris*)].

(C) Agricultural Compositions

The present disclosure provides a composition comprising (A) any one of the phytotoxic micronutrients disclosed herein and (C) another agricultural composition. The present disclosure also provides a combination comprising (A) and (C) as described herein. The present disclosure also provides methods for using the composition or the combination of (A) and (C) as described herein. The present disclosure further provides methods for using the composition or the combination of (A) and (C) as described herein, for a selective treatment of invasive species.

Micronutrients and Macronutrients

In one embodiment, the agricultural composition (C) comprises micronutrients. In some embodiments, micronutrient is selected from copper, zinc, iron, boron, manganese, molybdenum, or chlorine.

In one embodiment, the agricultural composition (C) comprises boron or a boron source. In some embodiments, the agricultural composition (C) is applied at a rate to provide about 10 lbs. elemental boron to about 50 lbs. elemental boron per acre of land, or any value and subranges there between. In one embodiment, the agricultural composition (C) is applied at a rate to provide average of about 20 lbs. elemental boron. In some embodiments, the agricultural composition (C) is applied at a rate to provide fertility level of about 1 lb. elemental boron to about 10 lbs. elemental boron per acre of land. In some embodiments, the agricultural composition (C) is applied at a rate to provide an average fertility level of about 3 lbs. of elemental boron per an acre of land.

In one embodiment, the agricultural composition (C) comprises copper or a copper source. In some embodiments, the agricultural composition (C) is applied at a rate to provide about 5 lbs. elemental copper to about 20 lbs. elemental copper per acre of land, or any value and subranges therebetween. In one embodiment, the agricultural composition (C) is applied at a rate to provide average of about 10 lbs. elemental copper. In some embodiments, the agricultural composition (C) is applied at a rate to provide fertility level of about 0.75 lb. elemental copper to about 5 lbs. elemental copper per acre of land. In some embodiments, the agricultural composition (C) is applied at a rate to provide an average fertility level of about 2 lbs. of elemental copper per an acre of land.

In one embodiment, the agricultural composition (C) comprises an iron or an iron source. In some embodiments, the agricultural composition (C) is applied at a rate to provide about 5 lbs. elemental iron to about 20 lbs. elemental iron per acre of land, or any value and subranges therebetween. In one embodiment, the agricultural composition (C) is applied at a rate to provide average of about 10 lbs. elemental iron. In some embodiments, the agricultural composition (C) is applied at a rate to provide fertility level of about 0.25 lb. elemental iron to about 5 lbs. elemental iron per acre of land. In some embodiments, the agricultural composition (C) is applied at a rate to provide an average fertility level of about 1.5 lbs. of elemental iron per an acre of land.

In one embodiment, the agricultural composition (C) comprises a manganese or a manganese source. In some embodiments, the agricultural composition (C) is applied at a rate to provide about 5 lbs. elemental manganese to about 15 lbs. elemental manganese per acre of land, or any value and subranges therebetween. In one embodiment, the agricultural composition (C) is applied at a rate to provide average of about 10 lbs. elemental manganese. In some embodiments, the agricultural composition (C) is applied at a rate to provide fertility level of about 0.75 lb. elemental manganese to about 4.65 lbs. elemental manganese per acre of land. In some embodiments, the agricultural composition (C) is applied at a rate to provide an average fertility level of about 2.3 lbs. of elemental manganese per an acre of land.

In one embodiment, the agricultural composition (C) comprises a molybdenum or a molybdenum source. In some embodiments, the agricultural composition (C) is applied at a rate to provide about 2 lbs. elemental molybdenum to about 10 lbs. elemental molybdenum per acre of land, or any value and subranges therebetween. In one embodiment, the agricultural composition (C) is applied at a rate to provide average of about 5 lbs. elemental molybdenum. In some embodiments, the agricultural composition (C) is applied at a rate to provide fertility level of about 0.78 lb. elemental molybdenum to about 6.6 lbs. elemental molybdenum per acre of land. In some embodiments, the agricultural composition (C) is applied at a rate to provide an average fertility level of about 2.6 lbs. of elemental molybdenum per an acre of land.

In one embodiment, the agricultural composition (C) comprises a zinc or a zinc source. In some embodiments, the agricultural composition (C) is applied at a rate to provide about 5 lbs. elemental zinc to about 20 lbs. elemental zinc per acre of land, or any value and subranges therebetween. In one embodiment, the agricultural composition (C) is applied at a rate to provide average of about 10 lbs. elemental zinc. In some embodiments, the agricultural composition (C) is applied at a rate to provide fertility level of about 0.5 lb. elemental zinc to about 7 lbs. elemental zinc per acre of land. In some embodiments, the agricultural composition (C) is applied at a rate to provide an average fertility level of about 2.25 lbs. of elemental zinc per an acre of land.

In one embodiment, the agricultural composition (C) comprises macronutrients. In some embodiments, macronutrient is selected from nitrogen, phosphorous, or potassium. In some embodiments, the agricultural composition (C) comprises nitrogen, phosphorous, and potassium.

In one embodiment, the agricultural composition (C) comprises an inorganic nitrogen source. In some embodiments, the agricultural composition (C) is applied at a rate to provide about 100 lbs. inorganic nitrogen to about 300 lbs. inorganic nitrogen per acre of land, or any value and subranges therebetween. In one embodiment, the agricultural composition (C) is applied at a rate to provide average of about 200 lbs. inorganic nitrogen. In some embodiments, the agricultural composition (C) is applied at a rate to provide fertility level of about 10 lbs. inorganic nitrogen to about 138 lbs. inorganic nitrogen per acre of land. In some embodiments, the agricultural composition (C) is applied at a rate to provide an average fertility level of about 56 lbs. of inorganic nitrogen per an acre of land.

In one embodiment, the agricultural composition (C) comprises an organic nitrogen source. In some embodiments, the agricultural composition (C) is applied at a rate to provide about 200 lbs. organic nitrogen to about 2000 lbs. organic nitrogen per acre of land, or any value and subranges therebetween. In one embodiment, the agricultural composition (C) is applied at a rate to provide average of about 500 lbs. organic nitrogen. In some embodiments, the agricultural composition (C) is applied at a rate to provide fertility level of about 2 lbs. organic nitrogen to about 200 lbs. organic nitrogen per acre of land. In some embodiments, the agricultural composition (C) is applied at a rate to provide an average fertility level of about 27.5 lbs. of organic nitrogen per an acre of land.

In one embodiment, the agricultural composition (C) comprises a phosphorous source. In some embodiments, the agricultural composition (C) is applied at a rate to provide about 50 lbs. phosphorous to about 200 lbs. phosphorous per acre of land, or any value and subranges therebetween. In one embodiment, the agricultural composition (C) is applied at a rate to provide average of about 100 lbs. phosphorous. In some embodiments, the agricultural composition (C) is applied at a rate to provide fertility level of about 10 lbs. phosphorous to about 100 lbs. phosphorous per acre of land.

In some embodiments, the agricultural composition (C) is applied at a rate to provide an average fertility level of about 35 lbs. of phosphorous per an acre of land.

In one embodiment, the agricultural composition (C) comprises a potassium source. In some embodiments, the agricultural composition (C) is applied at a rate to provide about 125 lbs. potassium to about 500 lbs. potassium per acre of land, or any value and subranges therebetween. In one embodiment, the agricultural composition (C) is applied at a rate to provide average of about 250 lbs. potassium. In some embodiments, the agricultural composition (C) is applied at a rate to provide fertility level of about 25 lbs. potassium to about 200 lbs. potassium per acre of land. In some embodiments, the agricultural composition (C) is applied at a rate to provide an average fertility level of about 75 lbs. of potassium per an acre of land.

In one embodiment, the agricultural composition (C) comprises boron or a boron source In one embodiment, the agricultural composition (C) comprises micronutrients and macronutrients.

In one embodiment, the agricultural composition (C) is a multi-element fertilizer. In one embodiment, the multi-element fertilizer comprises micronutrients and macronutrients. In some embodiments, the multi-element fertilizer comprises nitrogen, phosphorous, and potassium and at least two micronutrients selected from copper, zinc, iron, boron, manganese, molybdenum, or chlorine. In some embodiments, the multi-element fertilizer comprises nitrogen, phosphorous, potassium, copper, zinc, iron, boron, manganese, and molybdenum. In one embodiment, the multi-element fertilizer is Mora-Leaf 20-20-20.

In one embodiment, the agricultural composition (C) comprising micronutrient and/or macronutrient is an organic fertilizer or an inorganic fertilizer. In some embodiments, the organic fertilizer or the inorganic fertilizer comprises calcium, magnesium, sulfur, carbon, hydrogen or oxygen elements.

In some embodiments, the agricultural composition (C) comprising micronutrients and/or macronutrients is in an amount less than 10% of weight of the phytotoxic micronutrients (A) in the combination. In some embodiments, the agricultural composition (C) comprising micronutrients and/or macronutrients is in an amount less than 5% of weight of the phytotoxic micronutrients (A) in the combination. In some embodiments, the agricultural composition (C) comprising micronutrients and/or macronutrients is in an amount less than 5%, less than 4%, less than 3%, less than 2%, or less than 1% of weight of the phytotoxic micronutrients (A) in the combination.

Adjuvant

In one embodiment, the agricultural composition (C) comprises an adjuvant. In one embodiment, the agricultural composition (C) comprising an adjuvant is provided in a liquid formulation. In one embodiment, the adjuvant is selected from a wetting agent, an activator, a crop oil concentrate, a buffer, a marker dye or a surfactant.

In one embodiment, the wetting agent is selected from polyoxyethylene alkylphenol ether sulfates formaldehyde condensate, polyoxyethylene alkyl phenol ether phosphate, polyoxyethylene phenethyl phenol ether phosphates, alkyl sulfates salts, alkyl sulfonates, naphthalene sulfonate, or TERSPERSE2500 (Huntsman Corp). In some embodiments, the wetting agent is wetting agent is selected from organosilicones (e.g., Sylgard 309 from Dow Corning Corporation or Silwet L77 from Union Carbide Corporation) including polyalkylene oxide modified polydimethylsiloxane. (Silwet L7607 from Union Carbide Corporation), methylated seed oil, and ethylated seed oil (e.g., Scoil from Agsco or Hasten from Wilfarm), alkylpolyoxyethylene ethers (e.g., Activator 90), alkylarylalolates (e.g., APSA 20), alkylphenol ethoxylate and alcohol alkoxylate surfactants (e.g., products sold by Huntsman), fatty acid, fatty ester and fatty amine ethoxylates (e.g., products sold by Huntsman), products sold by Cognis such as sorbitan and ethoxylated sorbitan esters, ethoxylated vegetable oils, alkyl, glycol and glycerol esters and glycol ethers, tristyrylphenol ethoxylates, anionic surfactants such as sulphonates, such as sulphosuccinates, alkylaryl sulphonates, alkyl naphthalene sulphonates (e.g., products sold by Adjuvants Unlimited), calcium alkyl benzene sulphonates, and phosphate esters (e.g., products sold by Huntsman Chemical or BASF), as salts of sodium, potassium, ammonium, magnesium, triethanolamine (TEA), etc. Other specific examples of the above sulfates include ammonium lauryl sulfate, magnesium lauryl sulfate, sodium 2-ethyl-hexyl sulfate, sodium actyl sulfate, sodium oleyl sulfate, sodium tridecyl sulfate, triethanolamine lauryl sulfate, ammonium linear alcohol, ether sulfate ammonium nonylphenol ether sulfate, and ammonium monoxynol-4-sulfate. Other examples of wetting agents or dispersing agents include, but are not limited to, sulfo succinamates, disodium N-octadecylsulfo-succinamate, tetrasodium N-(1,2-dicarboxyethyl)-N-octadecylsulfo-succinamate; diamyl ester of sodium sulfosuccinic acid; dihexyl ester of sodium sulfosuccinic acid; and dioctyl esters of sodium sulfosuccinic acid; dihexyl ester of sodium sulfosuccinic acid; and dioctyl esters of sodium sulfosuccinic acid; castor oil and fatty amine ethoxylates, including sodium, potassium, magnesium or ammonium salts thereof. Dispersants and wetting agents also include natural emulsifiers, such as lecithin, fatty acids (including sodium, potassium or ammonium salts thereof) and ethanolamides and glycerides of fatty acids, such as coconut diethanolamide and coconut mono- and diglycerides, sodium polycarboxylate; sodium salt of naphthalene sulfonate condensate; sodium lignosulfonates; aliphatic alcohol ethoxylates; tristyrylphenol ethoxylates and esters; ethylene oxide-propylene oxide block copolymers, sodium dodecylbenzene sulfonate; N-oleyl N-methyl taurate; 1,4-dioctoxy-1,4-dioxo-butane-2-sulfonic acid; sodium lauryl sulphate; sodium dioctyl sulphosuccinate; aliphatic alcohol ethoxylates; nonylphenol ethoxylates, sodium taurates; and sodium or ammonium salts of maleic anhydride copolymers, lignosulfonic acid formulations or condensed sulfonate sodium, potassium, magnesium or ammonium salts, polyvinylpyrrolidone (available commercially as Polyplasdone XL-10 from International Specialty Products or as Kollidon C1 M-10 from BASF Corporation), polyvinyl alcohols, modified or unmodified starches, methylcellulose, hydroxyethyl or hydroxypropyl methylcellulose, carboxymethyl methylcellulose, or combinations, such as a mixture of either lignosulfonic acid formulations or condensed sulfonate sodium, potassium, magnesium or ammonium salts with polyvinylpyrrolidone (PVP).

In one embodiment, the activator is a polyoxyalkylene polysiloxane surfactant, a linear alkylbenzene sulfonate, an ethoxylated sorbitan ester such as a polyoxyethylene sorbitans, an alcohol ethoxylate such as an alcohol C5-15 ethoxylate, or combinations thereof. In one embodiment, the activator is an ammonium salt selected from ammonium nitrate, ammonium chloride, ammonium carbonate, ammonium bicarbonate, mono ammonium phosphate, di ammonium phosphate, tri ammonium phosphate, ammonium sulfate, or combinations thereof.

In one embodiment, the crop oil concentrate (COC) comprises paraffinic petroleum-based oils (blend of crop oils) and non-ionic surfactants. In one embodiment, the COC comprises paraffinic oil and a surfactant or an emulsifier. In one embodiment, the COC is paraffinic oil formulated with one or more of: surfactant blend, polyol fatty acid esters and/or polyethoxylated derivatives, emulsifiers, nitrogen solution blend, ethoxylated alcohol, water conditioners, or ethoxylated alkyl phosphate esters.

In one embodiment, the buffer may be selected from ammonium salt/ammonia, deprotonated lysine/doubly deprotonated lysine, potassium phosphate monobasic/potassium phosphate dibasic, potassium bicarbonate/potassium carbonate, boric acid/borax, potassium phosphate dibasic/potassium phosphate tribasic, ammonium citrate tribasic, or potassium phosphate monobasic/potassium phosphate dibasic systems.

In one embodiment, the marker dye is an organic dye. In some embodiments, the marker dye is a naturally occurring dye. In one embodiment, a marker dye comprises beet juice. In some embodiments, the marker dye is Fluorescent Red Liquid Concentrate and Hi-Light™ Blue.

Synthetic Herbicides

In one embodiment, the agricultural composition (C) comprises a synthetic herbicide. In some embodiments, the synthetic herbicide is formulated from petrochemicals.

In one embodiment, the synthetic herbicide is an auxin. In one embodiment, the synthetic herbicide is an ACCase inhibitor. In one embodiment, the synthetic herbicide is an inhibitor of lipid synthesis. In one embodiment, the synthetic herbicide is a sulfonylurea. In one embodiment, the synthetic herbicide is a triazolopyrimidine. In one embodiment, the synthetic herbicide is a sulfonylaminocarbonyl-triazolinone. In one embodiment, the synthetic herbicide is a triazolopyrimidine. In one embodiment, the synthetic herbicide is an imadazolinone. In one embodiment, the synthetic herbicide is a pyrimidinylbenzoate. In one embodiment, the synthetic herbicide is an inhibitor of photosynthesis at photosystem II site A. In one embodiment, the synthetic herbicide is an inhibitor of photosynthesis at photosystem II site B. In one embodiment, the synthetic herbicide is a photoporphyrinogen IX oxidase inhibitor. In one embodiment, the synthetic herbicide is a microtubule assembly inhibitor. In one embodiment, the synthetic herbicide is a VLCFA inhibitor. In one embodiment, the synthetic herbicide is a bleacher herbicide. In one embodiment, the synthetic herbicide is a 4-hydroxy-phenyl-pyruvate dioxygenase (HPPD) inhibitor. In one embodiment, the synthetic herbicide is a cellulose biosynthesis inhibitor. In one embodiment, the synthetic herbicide is an EPSP synthase inhibitor. In one embodiment, the synthetic herbicide is a glutamine synthetase inhibitor. In one embodiment, the synthetic herbicide is a carotenoid biosynthesis inhibitor. In one embodiment, the synthetic herbicide is a phytoene desaturase inhibitor. In one embodiment, the synthetic herbicide is a 1-deoxy-D-xyluose 5-phosphate synthetase (DOXP) inhibitor. In one embodiment, the synthetic herbicide is a protoporphyrinogen oxidase (Protox) inhibitor. In one embodiment, the synthetic herbicide is an inhibitor of synthesis of very long-chain fatty acids. In one embodiment, the synthetic herbicide is 7,8-dihydro-pteroate (DHP) synthetase inhibitor. In one embodiment, the synthetic herbicide is an inhibitor of indoleacetic acid transport. In one embodiment, the synthetic herbicide is an inhibitor of cell wall synthesis site A. In one embodiment, the synthetic herbicide is an inhibitor of cell wall synthesis site B. In one embodiment, the synthetic herbicide is a photosystem I electron diverter. In one embodiment, the synthetic herbicide is a mitosis inhibitor. In one embodiment, the synthetic herbicide is a membrane disruptor (uncouplers).

In one embodiment, the agricultural composition (C) comprises a synthetic herbicide selected from Table 2 or agriculturally acceptable salts, esters or amides thereof.

TABLE 2 glyphosate, glufosinate, glufosinate ammonium, 2,4-D, 3,4-DA, MCPA (2-methyl-4-chlorophenoxyacetic acid), 2,4, 5-T, 2,4-DP (dichlorprop), 2,4-DP-P, 4-CPP, 3,4-DP, fenoprop, CMPP (mecoprop), CMPP-P, 4-CPB, 2,4-DB, 3,4-DB, 2,4,5-TB, MCPB, dicamba, tricamba, chloramben, 2,3,6-TBA (2,3,6-trichlorobenzoic acid), aminopyralid, clopyralid, fluroxypyr, picloram, triclopyr, halauxifen, 4-amino-3-chloro-6-(4-chloro-2-fluoro-3-methoxyphenyl)-5-fluoropyridine-2-carboxylic acid, benzyl 4-amino-3-chloro-6-(4-chloro-2-fluoro-3-methoxyphenyl)-5-fluoropyridine-2-carboxylate, benazolin-ethyl, (±)-2-exo-(2-Methylbenzyloxy)-1-methyl-4-isopropyl-7-oxabicyclo[2.2.1]heptane, clodinafop, clodinafop-propargyl, cyhalofop, cyhalofop-butyl, diclofop, diclofop-methyl, fenoxaprop, fenoxaprop-ethyl, fenoxaprop-P, fenoxaprop-P-ethyl, fluazifop, fluazifop-butyl, fluazifop-p, fluazifop-p-butyl, haloxyfop, haloxyfop-methyl, haloxyfop-P, haloxyfop-p-methyl, metamifop, propaquizafop, quizalofop, quizalofop-ethyl, quizalofop-tefuryl, quizalofop-p, quizalofop-p-ethyl, quizalofop-p-tefuryl, alloxydim, alloxydim-sodium, butroxydim, clethodim, cycloxydim, profoxydim, sethoxydim, tepraloxydim, tralkoxydim, pinoxaden, amidosulfuron, azimsulfuron, bensulfuron, bensulfuron-methyl, chlorimuron, chlorimuron-ethyl, chlorsulfuron, cinosulfuron, cyclosulfamuron, ethametsulfuron, ethametsulfuron-methyl, ethoxysulfuron, flazasulfuron, flucetosulfuron, flupyrsulfuron, flupyrsulfuron-methyl-sodium, foramsulfuron, halosulfuron, halosulfuron-methyl, imazosulfuron, iodosulfuron, iodosulfuron-methyl-sodium, iofensulfuron, iofensulfuron-sodium, mesosulfuron, mesosulfuron-methyl, metazosulfuron, metsulfuron, metsulfuron-methyl, nicosulfuron, orthosulfamuron, oxasulfuron, primisulfuron, primisulfuron-methyl, propyrisulfuron, prosulfuron, pyrazosulfuron, pyrazosulfuron-ethyl, rimsulfuron, sulfometuron, sulfometuron-methyl, sulfosulfuron, thifensulfuron, thifensulfuron-methyl, triasulfuron, tribenuron, tribenuron-methyl, trifloxysulfuron, triflusulfuron, triflusulfuron-methyl, tritosulfuron, cloransulam, diclosulam, florasulam, flumetsulam, metosulam, penoxsulam, pyrimisulfan, pyroxsulam, flucarbazone, propoxycarbazone, thiencarbazone, bispyribac, pyribenzoxim, pyriftalid, pyriminobac, pyrithiobac, 4-[[[2-[(4,6-dimethoxy-2-pyrimidinyl)oxy]phenyl]methyl]amino]-benzoic acid-1-methylethyl ester, 4-[[[2-[(4,6-dimethoxy-2-pyrimidinyl)oxy]phenyl]methyl]amino]-benzoic acid propyl ester, N-(4-bromophenyl)-2-[(4,6-dimethoxy-2-pyrimidinyl)oxy]benzenemethanamine, bentazone, propanil, bifenox, oxadiazon, butralin, dithiopyr, fentrazamide, ipfencarbazone, cafenstrole, fenoxasulfone, aclonifen, benzobicyclon, benzofenap, bicyclopyrone, fenquintrione, isoxaflutole, isoxachlortole, mesotrione, pyrasulfotole, pyrazolynate, pyrazoxyfen, sulcotrione, tefuryltrione, tembotrione, TABLE 2-continued

| |
|---|
| tolpyralate, topramezone, indaziflam, indanofan, methiozolin, oxaziclomefone, iron hydroxyethylethylenediaminetriacetic acid (FeHEDTA), pelargonic acid, atrazine, metolachlor, paraquat, imazapic, imazapyr, imazamox, linuron, bentazon, sulfentrazone |

For additional examples of herbicides useful in the present disclosure see, e.g., A. H. Cobb and R. C. Kirkwood, Herbicides and their Mechanisms of Action, 2000, Sheffield Biological Sciences (Book 6), 320 pages; R. P. Pohanish, Sittig's Handbook of Pesticides and Agricultural Chemicals, $2^{nd}$ edition, 2014, 995 pages; and, G. W. Ware, Pesticide Book, $6^{th}$ edition, 2004, Meister Publishing Co.

In one embodiment, the agricultural composition (C) comprises a synthetic herbicide selected from: glyphosate, 2-4D, imazapic, rimsulfuron, indaziflam, FeHEDTA, or aminopyralid.

In one embodiment, the agricultural composition (C) comprises imazapic, rimsulfuron, and/or indaziflam. In one embodiment, the agricultural composition (C) comprising imazapic is applied at a rate to provide from about 1 ounce of imazapic per one acre of land to about 15 ounces of imazapic per one acre of land, or at any value and subranges therebetween. In one embodiment, the agricultural composition (C) comprising imazapic is applied at a rate to provide from about 2 ounces of imazapic per one acre of land to about 12 ounces of imazapic per one acre of land, or at any value and subranges therebetween.

In one embodiment, the agricultural composition (C) comprising rimsulfuron is applied at a rate to provide from about 1 ounce of rimsulfuron per one acre of land to about 5 ounces of rimsulfuron per one acre of land, or at any value and subranges therebetween. In one embodiment, the agricultural composition (C) comprising rimsulfuron is applied at a rate to provide from about 2 ounces of rimsulfuron per one acre of land to about 3 ounces of rimsulfuron per one acre of land, or at any value and subranges therebetween.

In one embodiment, the agricultural composition (C) comprising indaziflam is applied at a rate to provide from about 1 ounce of indaziflam per one acre of land to about 10 ounces of indaziflam per one acre of land, or at any value and subranges therebetween. In one embodiment, the agricultural composition (C) comprising indaziflam is applied at a rate to provide from about 2 ounces of indaziflam per one acre of land to about 7 ounces of indaziflam per one acre of land, or at any value and subranges therebetween.

In one embodiment, the agricultural composition (C) for treatment of annual grasses comprises imazapic, rimsulfuron, and/or indaziflam. In one embodiment, the agricultural composition (C) for treatment of cheatgrass comprises imazapic, rimsulfuron, and/or indaziflam. In one embodiment, the agricultural composition (C) for treatment of cheatgrass comprises imazapic, rimsulfuron, and/or indaziflam at any rates as described herein.

In one embodiment, the agricultural composition (C) comprises 2-4D and/or FeHEDTA. In one embodiment, the agricultural composition (C) comprising 2-4D is applied at a rate to provide from about 10 ounces of 2-4D per one acre of land to about 75 ounces of 2-4D per one acre of land, or at any value and subranges therebetween. In one embodiment, the agricultural composition (C) comprising 2-4D is applied at a rate to provide from about 16 ounces of 2-4D per one acre of land to about 64 ounces of 2-4D per one acre of land, or at any value and subranges therebetween.

In one embodiment, the agricultural composition (C) comprising FeHEDTA is applied at a rate to provide from about 750 ounces of FeHEDTA per one acre of land to about 2500 ounces of FeHEDTA per one acre of land, or at any value and subranges therebetween. In one embodiment, the agricultural composition (C) comprising FeHEDTA is applied at a rate to provide from about 1090 ounces of FeHEDTA per one acre of land to about 2180 ounces of FeHEDTA per one acre of land, or at any value and subranges therebetween.

In one embodiment, the agricultural composition (C) for treatment of turf comprises 2-4D and/or FeHEDTA. In one embodiment, the agricultural composition (C) for treatment of turf weeds comprises FeHEDTA. In one embodiment, the agricultural composition (C) for treatment of broadleaf weeds comprises 2-4D. In one embodiment, the agricultural composition (C) for treatment of cheatgrass comprises 2-4D and/or FeHEDTA at any rates as described herein.

In one embodiment, the agricultural composition (C) comprises glyphosate. In one embodiment, the agricultural composition (C) comprising glyphosate is applied at a rate to provide from about 1 ounce of glyphosate per one acre of land to about 40 ounces of glyphosate per one acre of land, or at any value and subranges therebetween. In one embodiment, the agricultural composition (C) comprising glyphosate is applied at a rate to provide from about 4 ounces of glyphosate per one acre of land to about 24 ounces of glyphosate per one acre of land, or at any value and subranges therebetween.

Commercially available glyphosate products comes in varieties of purity and concentration. In one embodiment, glyphosate is a glyphosate concentrate.

In one embodiment, the agricultural composition (C) comprises aminopyralid. In one embodiment, the agricultural composition (C) comprising aminopyralid is applied at a rate to provide from about 1 ounce of aminopyralid per one acre of land to about 30 ounces of aminopyralid per one acre of land, or at any value and subranges therebetween. In one embodiment, the agricultural composition (C) comprising aminopyralid is applied at a rate to provide from about 7 ounces of aminopyralid per one acre of land to about 14 ounces of aminopyralid per one acre of land, or at any value and subranges therebetween.

In one embodiment, the agricultural composition (C) for treatment of broadleaf weeds comprises aminopyralid.

In one embodiment, the agricultural composition (C) comprising a commercially available synthetic herbicide is applied at a rate as disclosed in the product label and/or the product user guide.

Biological Compounds or Related Carbon-Based Organic Compounds

In one embodiment, the agricultural composition (C) comprises a biological compound or a related carbon-based organic compound. In one embodiment, the biological compound or the related carbon-based organic compound is selected from fungus, spores, bacteria, soluble carbon-based solids or liquids (including sugar), organic matter, mycorrhizae, biochar, hydromulch, hydraulic mulch, waste products such as sawdust, manure, straw, corn stover, shells, hulls, or meal.

In one embodiment, the agricultural composition (C) comprises fungi, spores and/or bacterial inoculant. In one embodiment, the agricultural composition (C) comprises spores and/or bacterial inoculant. In one embodiment, the agricultural composition (C) comprises a *Pseudomonas fluorescens* bacterial strain. In one embodiment, the *Pseudomonas fluorescens* bacterial strain is *Pseudomonas fluorescens* strain ACK55, *Pseudomonas fluorescens* strain NKK78 or *Pseudomonas fluorescens* strain SMK69. See U.S. Pat. No. 9,578,884.

In one embodiment, the agricultural composition (C) comprising spores and/or bacterial inoculant is applied at a rate to provide from about 1 gram of spores or bacterial inoculant per one acre of land to about 5000 grams of spores or bacterial inoculant per one acre of land, or at any value and subranges therebetween.

In one embodiment, the agricultural composition (C) comprises soluble carbon or soluble carbon source. In one embodiment, the agricultural composition (C) comprises soluble sugar. In one embodiment, the soluble sugar is sucrose. See McLendon et al. Oecologia (1992) 91: 312-317. In one embodiment, the agricultural composition (C) comprising sucrose is applied at a rate from about 1000 kg C/ha/yr to about 2000 kg C/ha/yr, or at any value and subranges therebetween. In one embodiment, the agricultural composition (C) comprising sucrose is applied at a rate from about 1600 kg C/ha/yr. In one embodiment, the agricultural composition (C) comprising sucrose is applied at a rate from about 10 kg C/ha/yr to about 1000 kg C/ha/yr, or at any value and subranges therebetween. In one embodiment, the agricultural composition (C) comprising sucrose is applied at a rate from about 10 kg C/ha/yr to about 500 kg C/ha/yr, or at any value and subranges therebetween.

In one embodiment, the agricultural composition (C) comprising soluble carbon or soluble carbon source is applied at a rate from about 1 lb. of soluble carbon per one acre of land to about 1000 lbs. of soluble carbon per one acre of land, or at any value and subranges therebetween. In one embodiment, the agricultural composition (C) comprising soluble carbon or soluble carbon source is applied at a rate from about 10 lb. of soluble carbon per one acre of land to about 1000 lbs. of soluble carbon per one acre of land, or at any value and subranges therebetween.

In one embodiment, the agricultural composition (C) comprises organic matter. In one embodiment, the organic matter is compost or related decomposed organics used for vegetation enhancement. In one embodiment, the agricultural composition (C) comprising organic matter is applied at a rate from about 0.01 ton of organic matter per one acre of land to about 1000 tons of organic matter per one acre of land, or at any value and subranges therebetween. In one embodiment, the agricultural composition (C) comprising organic matter is applied at a rate from about 1 ton of organic matter per one acre of land to about 100 tons of organic matter per one acre of land, or at any value and subranges therebetween.

In one embodiment, the agricultural composition (C) comprises micorrhizae. In one embodiment, mycorrhizae is a commercial inoculum developed for plant growth augmentation. In one embodiment, the agricultural composition (C) comprising mycorrhizae is applied at a rate from about 1 lb. of mycorrhizae per one acre of land to about 1000 lbs. of mycorrhizae per one acre of land, or at any value and subranges therebetween. In one embodiment, the agricultural composition (C) comprising mycorrhizae is applied at a rate from about 10 lb. of mycorrhizae per one acre of land to about 1000 lbs. of mycorrhizae per one acre of land, or at any value and subranges therebetween.

In one embodiment, the agricultural composition (C) comprises biochar. In one embodiment, biochar is a thermally degraded cellulosic material, such as wood, developed as a soil amendment. Biochar is created by the pyrolysis of biomass, which generally involves heating and/or burning of organic matter, in a reduced oxygen environment, at a predetermined rate. Such heating and/or burning is stopped when the matter reaches a charcoal like stage. Typically, biochars include porous carbonaceous materials, such as charcoal. Biochar is highly porous material. In one embodiment, the agricultural composition (C) comprising biochar is applied at a rate from about 100 lb. of biochar per one acre of land to about 1000 tons of biochar per one acre of land, or at any value and subranges therebetween. In one embodiment, the agricultural composition (C) comprising biochar is applied at a rate from about 500 lb. of biochar per one acre of land to about 100 tons of biochar per one acre of land, or at any value and subranges therebetween.

In one embodiment, the agricultural composition (C) comprises hydromulch or hydraulic mulch. In one embodiment, the application of hydromulch or hydraulic mulch comprises applying slurry of water, wood fiber mulch, and often a tackifier to prevent soil erosion. In one embodiment, the wood fiber mulch is a thermally refined wood fiber, In one embodiment, the agricultural composition (C) comprising hydromulch or hydraulic mulch is applied at a rate from about 100 lb. of hydromulch or hydraulic mulch per one acre of land to about 1000 tons of hydromulch or hydraulic mulch per one acre of land, or at any value and subranges therebetween. In one embodiment, the agricultural composition (C) comprising hydromulch or hydraulic mulch is applied at a rate from about 500 lb. of hydromulch or hydraulic mulch per one acre of land to about 100 tons of hydromulch or hydraulic mulch per one acre of land, or at any value and subranges therebetween. In one embodiment, hydraulic mulch is selected from Conwed Fibers®, Terra-Mulch®, HydroCover™, SoilCover®, EcoSolutions, Second Nature®, or Enviro-Fibers® (ProfileProducts).

In one embodiment, the agricultural composition (C) comprises sawdust. In one embodiment, sawdust is a waste material high in cellulosic carbon. In one embodiment, sawdust is generally a residue from sawmills. In one embodiment, the agricultural composition (C) comprising sawdust is applied at a rate from about 100 lb. of sawdust per one acre of land to about 1000 tons of sawdust per one acre of land, or at any value and subranges therebetween. In one embodiment, the agricultural composition (C) comprising sawdust is applied at a rate from about 500 lb. of sawdust per one acre of land to about 100 tons of sawdust per one acre of land, or at any value and subranges therebetween.

In one embodiment, the agricultural composition (C) comprises manure. In one embodiment, manure is an agricultural waste, typically from confined livestock feeding areas. In one embodiment, the agricultural composition (C) comprising manure is applied at a rate from about 100 lb. of manure per one acre of land to about 1000 tons of manure per one acre of land, or at any value and subranges therebetween. In one embodiment, the agricultural composition (C) comprising manure is applied at a rate from about 500 lb. of manure per one acre of land to about 100 tons of manure per one acre of land, or at any value and subranges therebetween.

In one embodiment, the agricultural composition (C) comprises straw. In one embodiment, straw is an agricultural waste, typically from cereal grain production. In one embodiment, the agricultural composition (C) comprising straw is applied at a rate from about 100 lb. of straw per one acre of land to about 1000 tons of straw per one acre of land, or at any value and subranges therebetween. In one embodiment, the agricultural composition (C) comprising straw is applied at a rate from about 500 lb. of straw per one acre of land to about 100 tons of straw per one acre of land, or at any value and subranges therebetween.

In one embodiment, the agricultural composition (C) comprises corn stover. In one embodiment, corn stover is waste leaves, stalks, and/or cobs of corn remaining after corn harvest. In one embodiment, the agricultural composition (C) comprising corn stover is applied at a rate from about 100 lb. of corn stover per one acre of land to about 1000 tons of corn stover per one acre of land, or at any value and subranges therebetween. In one embodiment, the agricultural composition (C) comprising corn stover is applied at a rate from corn stover 500 lb. of corn stover per one acre of land to about 100 tons of corn stover per one acre of land, or at any value and subranges therebetween.

In one embodiment, the agricultural composition (C) comprises shell, meal, and/or hulls. In one embodiment, shell, meal, and/or hulls is an agricultural waste material remaining after harvest. In one embodiment, shell, meal, and/or hulls includes, but are not limited to, seed shells, ground meal, pressed oil seed hulls, rice hulls, and related materials. In one embodiment, the agricultural composition (C) comprising hell, meal, and/or hulls is applied at a rate from about 100 lb. of hell, meal, and/or hulls per one acre of land to about 1000 tons of hell, meal, and/or hulls per one acre of land, or at any value and subranges therebetween. In one embodiment, the agricultural composition (C) comprising hell, meal, and/or hulls is applied at a rate from about 500 lb. of hell, meal, and/or hulls per one acre of land to about 100 tons of hell, meal, and/or hulls per one acre of land, or at any value and subranges therebetween.

Inorganic Compounds

In one embodiment, the agricultural composition (C) comprises an inorganic compound. In one embodiment, the inorganic compound is selected from lime, silica, aluminosilicate, gypsum, or sulfur compound.

In one embodiment, the agricultural composition (C) comprises lime. In some embodiments, lime comprises calcium oxide, calcium hydroxide, calcium carbonate. In one embodiment, lime is selected from limestone, dolomite, calcite, cement kiln dust, limekiln dust, calcium oxide, or calcium hydroxide.

In one embodiment, the agricultural composition (C) comprising lime is applied at a rate from about 0.1 ton of lime per one acre of land to about 100 tons of lime per one acre of land, or at any value and subranges therebetween. In one embodiment, the agricultural composition (C) comprising lime is applied at a rate from about 1 ton of lime per one acre of land to about 10 tons of lime per one acre of land, or at any value and subranges therebetween.

In one embodiment, the inorganic compound is selected from calcium carbonate, calcium magnesium carbonate, calcium oxide, calcium hydroxide, cementitious waste product, or calcium sulfate.

In one embodiment, the agricultural composition (C) comprises gypsum (calcium sulfate). In one embodiment, the agricultural composition (C) comprising gypsum is applied at a rate from about 0.1 ton of gypsum per one acre of land to about 100 tons of gypsum per one acre of land, or at any value and subranges therebetween. In one embodiment, the agricultural composition (C) comprising gypsum is applied at a rate from about 1 ton of gypsum per one acre of land to about 10 tons of gypsum per one acre of land, or at any value and subranges therebetween.

In one embodiment, the agricultural composition (C) comprises a sulfur compound. In one embodiment, the sulfur compound decreases soil alkalinity. In one embodiment, the agricultural composition (C) comprising sulfur compound is applied at a rate from about 0.1 ton of sulfur compound per one acre of land to about 100 tons of sulfur compound per one acre of land, or at any value and subranges therebetween. In one embodiment, the agricultural composition (C) comprising sulfur compound is applied at a rate from about 1 ton of sulfur compound per one acre of land to about 10 tons of sulfur compound per one acre of land, or at any value and subranges therebetween.

In one embodiment, the agricultural composition (C) comprises a silica compound. In one embodiment, the agricultural composition (C) comprising silica compound is applied at a rate from about 100 lb. of silica compound per one acre of land to about 1000 tons of silica compound per one acre of land, or at any value and subranges therebetween. In one embodiment, the agricultural composition (C) comprising silica compound is applied at a rate from silica compound 500 lb. of silica compound per one acre of land to about 100 tons of silica compound per one acre of land, or at any value and subranges therebetween.

Seeds, Seed Coating, and Seed Inoculants

In one embodiment, the agricultural composition (C) comprises a seed, seed coating, and/or a seed inoculant.

In one embodiment, the agricultural composition (C) comprising a seed, seed coating, and/or a seed inoculant is applied at a rate from about 1 lb. of a seed, a seed coating, or a seed inoculant per one acre of land to about 1000 lbs. of a seed, a seed coating, or a seed inoculant per one acre of land, or at any value and subranges therebetween. In one embodiment, the agricultural composition (C) comprising a seed, a seed coating, or a seed inoculant is applied at a rate from about 10 lb. of a seed, a seed coating, or a seed inoculant per one acre of land to about 1000 lbs. of a seed, a seed coating, or a seed inoculant per one acre of land, or at any value and subranges therebetween. In one embodiment, the rate of the application of the agricultural composition (C) comprising a seed, a seed coating, and/or a seed inoculant may depend on size of the seed and desired seed density.

Seed coating is the process of applying a biological, organic or inorganic coating to the exterior of a seed to protect the seed from harm, to aid in germination or to promote its growth. Conventional agriculture has long used microbiological seed coatings on legumes to inoculate seed and adjacent soil environment with beneficial organisms implicated in nitrogen fixation such as *rhizobium*. In agricultural applications, various fungicides, insecticides, symbionts, nutrients, adjuvants, phytoactive promoters, binders and polymers may be used to coat seed. Conversely, establishment of plants in harsh sites such as sagebrush restoration in arid rangeland may employ the use of coatings that include fertility augmentation such as compost. Other additives to seed coating may include calcium carbonate (primarily as a binder), activated carbon (to minimize herbicide injury to seed), and other plant extracts, polymers and adhesive products intended to aid in adherence of the desired coatings to the seed. The primary categories comprising seed coats are typically a liquid binder combined with powdered fillers and active ingredients.

Phytotoxic micronutrient compounds may also be used to coat seeds alone or in combination with other active ingredients (including, but not limited to, the agricultural composition (C) of the present disclosure) with the primary intent of promoting the growth of desirable (seeded) vegetation and improving the soil environment to facilitate nutrient uptake, geomicrobiological nutrient cycling, and abiotic soil conditions such as water holding and infiltration.

In some embodiments, all or most of the desired micronutrient fertilizer could be applied as a seed coating. The present disclosure teaches that about 5 to about 70 pounds of elemental boron per acre can be applied using a seed coating. For example, in order to add 40 pounds of elemental boron per acre by a seed coating, a seeding rate and species mix (i.e. micronutrient compounds and/or other active ingredients) can be consistent with normal practices for rangeland seeding. The application rate of 40 pounds of elemental boron per acre can be split with half of the phytotoxic micronutrient applied as a seed coating as 20.5% boron (B) and half of the boron product applied as granular fertilizer such as 15% boron (B). The 20.5% B fertilizer is powdered and highly soluble lending itself to seed coating, while the 15.0% B is larger granules amendable to application with an agricultural spreader but not as a seed coating. In one embodiment, (i) 1.02 gram of B fertilizer per square foot using 20.5% B fertilizer (corresponding to 20 pounds of B per acre) and applied by a seed coating and (ii) 1.39 gram of B fertilizer per square feet using 15.0% B fertilizer (corresponding to 20 pounds of B per acre) applied as a dry granular fertilizer can be used for the combined application rate of 40 pounds of B per acre. Thus, total 2.41 grams of B fertilizer per square foot (corresponding to 40 pounds B per acre) can be applied with 1.02 grams of 20.5% B used to seed coat 128 seeds (i.e. bluebunch wheatgrass) per square foot supplemented by 1.39 grams grams of 15% granular fertilizer applied to the soil surface. For example, the bluebunch wheatgrass seed is a common native perennial grass used in rangeland seeding. There are 140,000 seeds per pound and a typical seeding rate would be 40 pounds of seed per acre (that is, 128 seeds per square foot). The seeding rate might vary from 20 to 80 pounds seed per acre depending on other plant species included. In some embodiments, for seed coating about 0.01-15 grams of 20.5% B fertilizer is applied to an acceptable number of grass seeds per square foot. In some embodiments, for seed coating about 0.1-10 grams of B fertilizer is applied to an acceptable number of grass seeds per square foot. In some embodiments, for seed coating about 0.5-8 grams of B fertilizer is applied to an acceptable number of grass seeds per square foot. In some embodiments, for seed coating about 1-5 grams of B fertilizer is applied to an acceptable number of grass seeds per square foot. Higher fertilizer rates would result in thicker seed coatings. Seeds vary appreciably in size so the amount of fertilizer applied as a coating likewise may vary.

Seed coating is the practice of covering seeds with external materials to improve handling, protection, and, to a lesser extent, germination enhancement and plant establishment. Studies of seed coating have been published in the scientific literature such as Pedrini et al. (Seed Coating: Science or Marketing Spin?, Trends in Plant Science; Volume 22, Issue 2, February 2017, Pages 106-116) describing seed-coating ingredients, equipment, and various types of coating, which is hereby incorporated by reference. As one example, AgriCOTE is a seed application technology that can be used to apply various beneficial agricultural products to seed as described wildweb.co.za/CLIENTS/Advance-Seed/seed_coating.php, the entire contents of which is hereby incorporated by reference.

Excipients

In some embodiments, the phytotoxic micronutrients (A) or the agricultural composition (C) can further comprise an agriculturally acceptable excipient.

In some embodiments, an excipient is a multifunctional surfactant/dispersing agent/thickener/stabilizer which can reduce surface tension, improve plant surface adhesion, soil penetration and rewetting and/or to keep all components in a suspension. Alternatively, a separate surfactant/wetting agent and a thickener/stabilizer may be used to accomplish any or all of the above functions. In addition, an excipient can be a multifunctional chelator/dispersant/stabilizer, which may be included to chelate any of the metal ions present such as the calcium and to trap the excess calcium for later release.

In some embodiments, an excipient is a chelating agent. A chelate agent can increases the solubility of the metallic ions and favor the transportation of metallic ions inside the plant. Furthermore, after binding to the metallic ion and later on depositing the metallic ion in the place where the plant requires it, the organic part of the chelate returns to dissolve more ions, which can make the use of the micronutrients in the soil more prolonged.

In some embodiments, an excipient is a surfactant. Use of a surfactant can results in a high moisturizing ability and a capacity to decrease the superficial surface tension of the water, which facilitates assimilation of nutrients and other ingredients. On the other hand, due to the ability of the surfactant to form emulsions, the surfactant gives stability to the fertilizer.

In some embodiments, an excipient maintains a dry composition to remain flowable to the desired consistency. The dry flowable form of the phytotoxic micronutrient can be applied to the surface of soil containing weed seed, directly to weed seed, or to senesced or live, seed-bearing weed plants.

In some embodiments, the surfactant is selected from tertiary alkylamines and alkyletheramines, polyoxyethylene tertiary alkylamines and alkylemeramines, quaternary ammonium surfactants, pyridine and imidazoline surfactants, polyoxyethylene alkylamine and alkyletheramine oxides, alkylbetaines, alkyl diamines and polyoxyethylene alkyl diamines. In other embodiments, the surfactant is selected from ethoxylated alcohols, ethoxylated alcohols, ethoxylated fatty esters, ethoxylated castor oil, alkoxylated glycols, ethoxylated fatty acids, carboxylated alcohols, carboxylic acids, fatty acids, ethoxlylated alkylphenols, fatty esters, lignins, blocked copolymers, EO/PO copolymers, octadecanoic acid, ammonium salt, 9-Octadecenoic acid (9Z) or potassium salt. In one embodiment, the surfactant is selected from sulfated polyoxyethylenated straight chain alcohol, polyoxyethylenated straight chain alcohol, or a sulfate of a linear primary alcohol.

Combinations and Method of Use

Current techniques used for invasive plant species control are largely limited in their effectiveness as they are indiscriminately harmful to all existing vegetation to which they are applied (i.e. glyphosate), or are harmful to non-target species to which they are applied of the same life form as the invasive species (i.e. collateral damage to forbs with 2,4-D application). The fertilizer and weed control industries are multi-billion dollar entities. Invasive plant management is a pervasive problem on as much as 100 million acres in the U.S., with only marginally effective control methods. The methods of the subject disclosure offer a new means to address invasive plant invasion and the associated economic losses due to diminished land productivity, yet without collateral damage to the environment.

The disclosure of combining application of a phytotoxic micronutrients and another agricultural composition provides a significant new tool and method for land managers to effectively control or eradicate invasive species over a wide variety of acreages and may be modified to suit site conditions, including specific plant communities.

In one embodiment, the application of a combination of a phytotoxic micronutrients and another agricultural composition provides synergistic control or synergistic eradication of invasive species over a wide variety of acreages and may be modified to suit site conditions, including specific plant communities. In one embodiment, synergistic control or synergistic eradication of invasive species means that the control or the eradication of invasive species with the combination is superior over methods involving the application of the phytotoxic micronutrients alone (as used in the combination) or the other agricultural composition alone (as used in the combination).

According to the present disclosure, any micronutrient fertilizer may be used, applied alone or in combination with other micronutrients, or even in combination with macronutrients such as nitrogen, phosphorous, and potassium.

The methods of the present disclosure use a combination of (A) a phytotoxic micronutrients and (C) another agricultural composition to selectively control invasive plant species. The micronutrients required in small amounts by most vascular plants can be an herbicide or chemical agent against invasive plant species when applied in a phytotoxic amount. The phytotoxic micronutrients effectively cause the death of live plant, seedlings, or seeds of invasive plant species, when the soluble trace element comes in contact with germinating seed or are taken up by the roots of live plants. Similarly, the phytotoxic micronutrients effectively cause the death of seedlings of invasive plant species, when the trace element comes in contact with the emerging seedlings. Relatively low concentrations of the micronutrients are required to be phytotoxic to invasive species but do not result in harm to desirable native species, or at least are less harmful over a spectrum of desirable native species.

The exact soil solution concentration that will result from any of the formulation disclosed herein is unknown because it depends on the soil and whether it is a sand, silt, or clay and how much water it holds. It is not unusual for an acre of dry soil to contain 2 million pounds of dry soil in the upper 6 inches plus 20% gravimetric water content. (400, 000 pounds or ~50,000 gallons). While the dry soil mass would not vary a great deal the amount of water in the soil might range from 10,000 to 100,000 gallons per acre. Therefore, with a 10× variation in soil water content addition of a given amount of fertilizer might result in a solution concentration that varied 10 times. Therefore, it is difficult to predict with certainty how the soil solution concentration (existing patent basis) will change in response to pragmatic applications of any one of compositions and combinations disclosed herein to control invasive plant species. Furthermore, as soon as the phytotoxic micronutrients (A) and or the agricultural composition (C) is added to the soil, the components of (A) and (C) are subject to crop uptake and leaching, plus the soil has preexisting amounts of soil nutrients.

In one embodiment, the present disclosure relates to a composition comprising a phytotoxic micronutrient (A) and a synthetic herbicide (C).

In one embodiment of any one of the composition disclosed herein, the composition further comprising one or more ingredients selected from: a) a micronutrient; b) a macronutrient; c) an adjuvant; d) a synthetic herbicide; e) a biological compound or a related carbon-based organic compound; f) an inorganic compound; or g) a seed, a seed coating, or a seed inoculant.

In one embodiment of any one of the composition disclosed herein, the phytotoxic micronutrient comprises boron or a copper. In one embodiment, the phytotoxic micronutrient comprises boron. In one embodiment, the phytotoxic micronutrient comprises boron in about 10% to about 30% by weight.

In one embodiment of any one of the composition disclosed herein, the micronutrient is selected from copper, zinc, iron, boron, manganese, molybdenum, or chlorine. In one embodiment of any one of the composition disclosed herein, the macronutrient is selected from nitrogen, phosphorous, or potassium.

In one embodiment of anyone of the composition disclosed herein, the composition further comprising an organic fertilizer or an inorganic fertilizer. In one embodiment, the organic fertilizer or the inorganic fertilizer comprises calcium, magnesium, sulfur, carbon, hydrogen or oxygen elements.

In one embodiment of any one of the composition disclosed herein, the adjuvant is selected from a wetting agent, an activator, a crop oil concentrate, a buffer, a marker dye or a surfactant.

In one embodiment of any one of the composition disclosed herein, the synthetic herbicide is formulated from petrochemicals. In one embodiment, the synthetic herbicide is selected from Table 2 or agriculturally acceptable salts, esters or amides thereof. In one embodiment, the synthetic herbicide is selected from glyphosate, 2-4D, imazapic, rimsulfuron, indaziflam, FeHEDTA, or aminopyralid.

In one embodiment of any one of the composition disclosed herein, the biological compound and related carbon-based organic compound is selected from fungus, spores, bacteria, soluble carbon-based solids or liquids (including sugar), organic matter, mycorrhizae, biochar, hydromulch, hydraulic mulch, waste products such as sawdust, manure, straw, corn stover, shells, hulls, or meal.

In one embodiment of any one of the composition disclosed herein, the inorganic compound is selected from lime, silica, aluminosilicate, gypsum, or sulfur compound. In one embodiment, the inorganic compound is selected from calcium carbonate, calcium magnesium carbonate, calcium oxide, calcium hydroxide, cementitious waste product, or calcium sulfate.

In one embodiment of any one of the composition disclosed herein, the composition is in a dry granular form. In one embodiment, the composition comprises the adjuvant and the composition is a liquid.

In one embodiment of any one of the composition disclosed herein, the composition comprises the micronutrient. In one embodiment, the composition comprises the macronutrient. In one embodiment, the composition comprises the synthetic herbicide. In one embodiment, the composition comprises the biological compound or related carbon-based organic compound. In one embodiment, the composition comprises the inorganic compound. In one embodiment, the composition comprises the seed, the seed coating, or the seed inoculant.

In one embodiment, the present disclosure relates to an agricultural kit comprising:

(i) a phytotoxic micronutrient; and (ii) an agricultural composition comprising one or more ingredients selected from a) a micronutrient; b) a macronutrient; c) a synthetic herbicide; d) a biological compound or a related carbon-based organic compound; e) an inorganic compound; or f) a seed, a seed coating, or a seed inoculant.

In one embodiment of any one of the agricultural kit disclosed herein, the agricultural composition is a liquid formulation further comprising an adjuvant.

In one embodiment of any one of the agricultural kit disclosed herein, the phytotoxic micronutrient comprises boron.

In one embodiment of any one of the agricultural kit disclosed herein, the agricultural composition comprises a synthetic herbicide.

In one embodiment, the present disclosure relates to an agricultural combination comprising:

(i) a phytotoxic micronutrient; and (ii) an agricultural composition comprising one or more ingredients selected from a) a micronutrient; b) a macronutrient; c) a synthetic herbicide; d) a biological compound or a related carbon-based organic compound; e) an inorganic compound; or f) a seed, a seed coating, or a seed inoculant.

In one embodiment of any one of the agricultural combination disclosed herein, the agricultural composition is a liquid formulation further comprising an adjuvant.

In one embodiment of any one of the agricultural combination disclosed herein, the phytotoxic micronutrient comprises boron.

In one embodiment of any one of the agricultural combination disclosed herein, the agricultural composition comprises a synthetic herbicide.

In one embodiment, the present disclosure relates to a composition or a combination of the phytotoxic micronutrients (A) and an agricultural composition (C). In one embodiment, the present disclosure relates to a composition or a combination of the phytotoxic micronutrients (A) and an agricultural composition comprising a synthetic herbicide (C). In one embodiment, the present disclosure relates to a composition or a combination of the phytotoxic micronutrients comprising a boron source (A) and an agricultural composition comprising a synthetic herbicide (C). In one embodiment, the present disclosure relates to a composition or a combination of the phytotoxic micronutrients comprising a boron source (A) and an agricultural composition comprising a synthetic herbicide (C), wherein the agricultural composition can further comprise one or more of micronutrients, macronutrients, biological compounds and/or related carbon-based organic compounds, inorganic compounds, or seed, seed coating, and/or seed inoculant. In one embodiment, the present disclosure relates to a composition or a combination of the phytotoxic micronutrients comprising a boron source (A) and an agricultural composition comprising a synthetic herbicide (C), wherein the agricultural composition can further comprise one or more of micronutrients, macronutrients, biological compounds and/or related carbon-based organic compounds, inorganic compounds, seed, seed coating, and/or seed inoculant, or an adjuvant.

In one embodiment of any one of the agricultural combination disclosed herein, the combination comprises a phytotoxic micronutrient and a macronutrient. In some embodiments, the macronutrient is nitrogen, phosphorous, and/or potassium.

In one embodiment of any one of the agricultural combination as disclosed herein, the combination can be in a form of granular form or a coated granular form. In one embodiment, the agricultural composition can be in a granular form and the phytotoxic micronutrient can be applied as a coating to the granular agricultural composition. In one embodiment, the agricultural composition comprising nitrogen, phosphorous, and potassium can be in a granular form and the phytotoxic micronutrient can be applied as a coating to the granular form to provide the combination.

In one embodiment of any one of the agricultural combination as disclosed herein, the combination can be in a form of granular form or a coated granular form such that the release of the composition in the granular form may be delayed or modified by the coating.

In one embodiment, the present disclosure relates to a kit comprising the phytotoxic micronutrients (A) and an agricultural composition (C) as a separate formulation. In one embodiment, the present disclosure relates to a kit comprising the phytotoxic micronutrients (A) and an agricultural composition comprising a synthetic herbicide (C). In one embodiment, the present disclosure relates to a kit comprising a phytotoxic micronutrient comprising a boron source (A) and an agricultural composition comprising a synthetic herbicide (C). In one embodiment, the present disclosure relates to a kit comprising a phytotoxic micronutrient comprising a boron source (A) and the agricultural composition comprising a synthetic herbicide (C), wherein the agricultural composition can further comprise one or more of micronutrients, macronutrients, biological compounds and/or related carbon-based organic compounds, inorganic compounds, or seed, seed coating and/or seed inoculant. In one embodiment, the present disclosure relates to a kit comprising the phytotoxic micronutrient comprising a boron source (A) and an agricultural composition comprising a synthetic herbicide (C), wherein the agricultural composition can further comprise one or more of micronutrients, macronutrients, biological compounds and/or related carbon-based organic compounds, inorganic compounds, seed, seed coating, and/or seed inoculant, or an adjuvant.

In one embodiment, the phytotoxic micronutrients (A) provide protection to the desirable plants and the desirable seeds from the negative effects a synthetic herbicide (C) can have. For example, Esplanade (Bayer) inhibits the growth of seedlings as its primary mode of weed control. However, it also inhibits the growth of desirable seeds of native perennial plants (desirable plants). It is unknown how long this effect will last, but without bound to any theory, the effect is expected to last many years depending on soil conditions, climate, and rate of herbicide application. In one embodiment, the micronutrients in (A) can lessen the negative or unwanted effect of synthetic herbicides, such as Esplanade to the desired plants and desired seeds. In one embodiment, the micronutrients in (A) can lessen the negative or unwanted effect of synthetic herbicides to the desired plants and desired seeds by maintaining soil health (nutrients).

In one embodiment, the phytotoxic micronutrient (A) and the agricultural composition (C) are both in a dry formulation, but provided separately. In one embodiment, the phytotoxic micronutrient (A) and the agricultural composition (C) are both in a dry formulation in a single composition.

In one embodiment, the phytotoxic micronutrient (A) and the agricultural composition (C) are both in a liquid formulation, but provided separately. In one embodiment, the phytotoxic micronutrient (A) and the agricultural composition (C) are both in a liquid formulation in a single composition.

In one embodiment, the phytotoxic micronutrient (A) and the agricultural composition (C) are applied together as a single composition to the soil or to the plant requiring treatment. In one embodiment, the phytotoxic micronutrient (A) and the agricultural composition (C) are tank-mixing partners.

In one embodiment, the phytotoxic micronutrient (A) and the agricultural composition (C) are applied simultaneously but as a separate formulation to the soil or to the plant requiring treatment. In one embodiment, the phytotoxic micronutrient (A) and the agricultural composition (C) are applied sequentially as a separate formulation to the soil or to the plant requiring treatment. In some embodiments, the sequential application can be separated by hours, days, or months, depending on the need for treatment.

In some embodiments, the phytotoxic micronutrient (A) and the agricultural composition comprising a synthetic herbicide (C) are applied sequentially, wherein the phytotoxic micronutrient is applied in the fall and the synthetic herbicide is applied as directed by the product label and/or user guides.

The rates of the phytotoxic micronutrients (A) and the agricultural composition can be applied at any one of the rates as disclosed herein as appropriate for the soil condition in the area requiring a treatment.

The phytotoxic micronutrient (A) alone can be used for selective control of invasive plant species. See WO 2014/113475, the disclosure of which is hereby incorporated by reference in its entirety.

The present disclosure, in one embodiment, relates to a method of controlling invasive plant species by applying the phytotoxic micronutrient (A) and the agricultural composition (C). In one embodiment, the present disclosure relates to a method of selectively controlling invasive plant species while maintaining desirable plant species by applying the phytotoxic micronutrient (A) and the agricultural composition (C). In one embodiment, the phytotoxic micronutrient (A) is phytotoxic to the invasive species but not phytotoxic to the desirable plant species.

The present disclosure, in one embodiment, relates to a method of controlling invasive plant species existing in a perennial grass plant community by applying the phytotoxic micronutrient (A) and the agricultural composition (C). In one embodiment, the perennial grass plant community comprises bluebunch wheatgrass, Western wheatgrass, slender wheatgrass, Idaho fescue, sheep fescue, orchard grass, smooth brome, timothy and/or Kentucky bluegrass. In one embodiment, the perennial grass plant community comprises bluebunch wheatgrass, Idaho fescue, western wheatgrass and/or Kentucky bluegrass.

The present disclosure, in one embodiment, relates to a method of controlling invasive plant species existing in a perennial grass plant community by applying the phytotoxic micronutrient (A) and the agricultural composition (C). The present disclosure, in one embodiment, relates to a method of controlling invasive plant species existing in a perennial grass community rangeland or pastureland by applying the phytotoxic micronutrient (A) and the agricultural composition (C). In one embodiment, the perennial grass community rangeland or pastureland comprises bluebunch wheatgrass, Western wheatgrass, slender wheatgrass, Idaho fescue, sheep fescue, orchard grass, smooth brome, timothy and/or Kentucky bluegrass. In one embodiment, the perennial grass plant community comprises bluebunch wheatgrass, Idaho fescue, western wheatgrass and/or Kentucky bluegrass.

The present disclosure, in one embodiment, relates to a method of controlling invasive plant species existing in a perennial grass plant community by applying the phytotoxic micronutrient (A) and the agricultural composition (C).

In one embodiment, the present disclosure relates to a method of selectively controlling cheatgrass, dandelion, Canadian thistle, kochia, knotweed, poison ivy and/or spotted knapweed while maintaining desirable plant species by applying the phytotoxic micronutrient (A) and the agricultural composition (C).

The present disclosure provides a method of selectively controlling the growth of at least one invasive plant species. In one embodiment, the method provides controlling the growth of at least one invasive plant species in a perennial grass plant community or a perennial grass community rangeland or pastureland. In one embodiment, the method disclosed herein uses compositions and combinations comprising a phytotoxic micronutrient and an agricultural composition comprising a micronutrient, a macronutrient, a synthetic herbicide, a biological compound or a related carbon-based organic compound, an inorganic compound, or a seed, a seed coating, or a seed inoculant.

In one embodiment, the present disclosure relates to methods for selectively controlling the growth of at least one invasive plant species existing in a perennial grass plant community, comprising applying:

(i) a phytotoxic micronutrient; and (ii) an agricultural composition comprising one or more ingredients selected from a) a micronutrient; b) a macronutrient; c) a synthetic herbicide; d) a biological compound or a related carbon-based organic compound; e) an inorganic compound; or f) a seed, a seed coating, or a seed inoculant.

In one embodiment, the present disclosure relates to methods for negatively impacting the growth of at least one invasive plant species, including the selective control of the invasive plant species, existing in a perennial grass plant community, while preserving the perennial grass plant community species, comprising applying:

(i) a phytotoxic micronutrient; and (ii) an agricultural composition comprising one or more ingredients selected from a) a micronutrient; b) a macronutrient; c) a synthetic herbicide; d) a biological compound or a related carbon-based organic compound; e) an inorganic compound; or f) a seed, a seed coating, or a seed inoculant.

In one embodiment of any one of the methods disclosed herein, the phytotoxic micronutrient comprises boron or a copper. In one embodiment, the phytotoxic micronutrient comprises boron. In one embodiment of any one of the methods disclosed herein, the phytotoxic micronutrient is applied to achieve a water soluble boron concentration in the soil of the perennial grass plant community from about 3 milligrams per liter to about 50 milligrams per liter. In one embodiment, the phytotoxic micronutrient is applied at a rate of about 1 pound of elemental boron per one acre to about 150 pounds of elemental boron per one acre. In other embodiments, the phytotoxic micronutrient is applied at a rate of about 5, about 10, about 15, about 25, about 50, about 75, or about 100 pounds of elemental boron per one acre.

In one embodiment of any one of the methods disclosed herein, the phytotoxic micronutrient comprises boron, wherein the boron in the phytotoxic micronutrient is phytotoxic to the at least one invasive plant species while maintaining or increasing the growth and vigor of the perennial grass. Maintaining the growth and vigor of the perennial grass can mean that the perennial grass is not harmed by the treatment but not necessary mean that resulted in increased growth and vigor.

In one embodiment of any one of the methods disclosed herein, the at least one invasive species is selected from the group consisting of cheatgrass, dandelion, Canadian thistle, kochia, knotweed, poison ivy and spotted knapweed. In one embodiment of any one of the methods disclosed herein, the perennial grass plant community comprises bluebunch wheatgrass, Western wheatgrass, slender wheatgrass, Idaho fescue, sheep fescue, orchard grass, smooth brome, timothy or Kentucky bluegrass.

In one embodiment of any one of the methods disclosed herein, the micronutrient in the agricultural composition is selected from copper, zinc, iron, boron, manganese, molybdenum, or chlorine.

In one embodiment of any one of the methods disclosed herein, the macronutrient in the agricultural composition is selected from nitrogen, phosphorous, or potassium.

In one embodiment of any one of the methods disclosed herein, the agricultural composition further comprises an organic fertilizer or an inorganic fertilizer.

In one embodiment of any one of the methods disclosed herein, the organic fertilizer or the inorganic fertilizer comprises calcium, magnesium, sulfur, carbon, hydrogen or oxygen elements.

In one embodiment of any one of the methods disclosed herein, the adjuvant in the agricultural composition is selected from a wetting agent, an activator, a crop oil concentrate, a buffer, a marker dye or a surfactant.

In one embodiment of any one of the methods disclosed herein, the synthetic herbicide in the agricultural composition is formulated from petrochemicals. In one embodiment, the synthetic herbicide in the agricultural composition is from Table 2 or agriculturally acceptable salts, esters or amides thereof. In one embodiment, the synthetic herbicide in the agricultural composition is selected from glyphosate, 2-4D, imazapic, rimsulfuron, indaziflam, FeHEDTA, or aminopyralid.

In one embodiment of any one of the methods disclosed herein, the biological compound and related carbon-based organic compound in the agricultural composition is selected from fungus, spores, bacteria, soluble carbon-based solids or liquids (including sugar), organic matter, mycorrhizae, biochar, hydromulch, hydraulic mulch, waste products such as sawdust, manure, straw, corn stover, shells, hulls, or meal.

In one embodiment of any one of the methods disclosed herein, the inorganic compound in the agricultural composition is selected from lime, silica, aluminosilicate, gypsum, or sulfur compound.

In one embodiment of any one of the methods disclosed herein, the inorganic compound in the agricultural composition is selected from calcium carbonate, calcium magnesium carbonate, calcium oxide, calcium hydroxide, cementitious waste product, or calcium sulfate.

In one embodiment of anyone of the methods disclosed herein, the phytotoxic micronutrient and the agricultural composition is in a dry granular formulation or in a liquid formulation.

In one embodiment of any one of the methods disclosed herein, the agricultural composition comprises an adjuvant and the agricultural composition is in a liquid formulation.

In one embodiment of any one of the methods disclosed herein, the agricultural composition comprises the micronutrient. In one embodiment, the agricultural composition comprises the macronutrient. In one embodiment, the agricultural composition comprises the synthetic herbicide. In one embodiment, the agricultural composition comprises the biological compound or related carbon-based organic compound. In one embodiment, the agricultural composition comprises the inorganic compound. In one embodiment, the agricultural composition comprises the seed, the seed coating, or the seed inoculant.

In one embodiment of any one of the methods disclosed herein, the agricultural composition comprises a synthetic herbicide, wherein the agricultural composition is applied at a rate of about 1 ounce of the synthetic herbicide per one acre to about 100 ounces of the synthetic herbicide per one acre. In one embodiment, the agricultural composition is applied at a rate of about 1 ounce of the synthetic herbicide per one acre to about 70 ounces of the synthetic herbicide per one acre. In one embodiment, the synthetic herbicide is FeHEDTA and the agricultural composition is applied at a rate of about 900 ounces per one acre to about 2250 ounces per acre.

In one embodiment of any one of the methods disclosed herein, the phytotoxic micronutrient and the agricultural composition are applied simultaneously or sequentially.

In one embodiment, the present disclosure relates to methods for selectively controlling the growth of at least one invasive plant species existing in a perennial grass plant community, comprising applying an composition comprising:

i) a phytotoxic micronutrient; and ii) a synthetic herbicide.

In one embodiment, the present disclosure relates to methods for negatively impacting the growth of at least one invasive plant species, including the selective control of the invasive plant species, existing in a perennial grass plant community, while preserving the perennial grass plant community species, comprising applying an composition comprising:

i) a phytotoxic micronutrient; and ii) a synthetic herbicide.

In one embodiment of any one of the methods disclosed herein, the composition further comprises one or more ingredients selected from: a) a micronutrient; b) a macronutrient; c) a biological compound or a related carbon-based organic compound; d) an inorganic compound; or e) a seed, a seed coating, or a seed inoculant.

In one embodiment of any one of the methods disclosed herein, the phytotoxic micronutrient comprises boron or a copper. In one embodiment, the phytotoxic micronutrient comprises boron. In one embodiment, the phytotoxic micronutrient comprises boron in about 10% to about 30% by weight. In one embodiment, the phytotoxic micronutrient is applied to achieve a water soluble boron concentration in the soil of the perennial grass plant community from about 3 milligrams per liter to about 50 milligrams per liter. In one embodiment, the phytotoxic micronutrient is applied at a rate of about 1 pound of elemental boron per one acre to about 150 pounds of elemental boron per one acre. In one embodiment, the phytotoxic micronutrient is applied at a rate of about 5, about 10, about 15, about 25, about 50, about 75, or about 100 pounds of elemental boron per one acre.

In one embodiment of any one of the methods disclosed herein, the boron in the phytotoxic micronutrient is phytotoxic to the at least one invasive plant species while maintaining or increasing the growth and vigor of the perennial grass.

In one embodiment of any one of the methods disclosed herein, the at least one invasive species is selected from the group consisting of cheatgrass, dandelion, Canadian thistle, kochia, knotweed, poison ivy and spotted knapweed. In one embodiment of any one of the methods disclosed herein, the perennial grass plant community comprises bluebunch wheatgrass, Western wheatgrass, slender wheatgrass, Idaho fescue, sheep fescue, orchard grass, smooth brome, timothy or Kentucky bluegrass.

In one embodiment of any one of the methods disclosed herein, the micronutrient is selected from copper, zinc, iron, boron, manganese, molybdenum, or chlorine.

In one embodiment of any one of the methods disclosed herein, the macronutrient is selected from nitrogen, phosphorous, or potassium.

In one embodiment of any one of the methods disclosed herein, the composition further comprises an organic fertilizer or an inorganic fertilizer. In one embodiment, the organic fertilizer or the inorganic fertilizer comprises calcium, magnesium, sulfur, carbon, hydrogen or oxygen elements.

In one embodiment of any one of the methods disclosed herein, the adjuvant is selected from a wetting agent, an activator, a crop oil concentrate, a buffer, a marker dye or a surfactant.

In one embodiment of any one of the methods disclosed herein, the synthetic herbicide is formulated from petrochemicals. In one embodiment, the synthetic herbicide is from Table 2 or agriculturally acceptable salts, esters or amides thereof. In one embodiment, the synthetic herbicide is selected from glyphosate, 2-4D, imazapic, rimsulfuron, indaziflam, FeHEDTA, or aminopyralid.

In one embodiment of any one of the methods disclosed herein, the biological compound and related carbon-based organic compound is selected from fungus, spores, bacteria, soluble carbon-based solids or liquids (including sugar), organic matter, mycorrhizae, biochar, hydromulch, hydraulic mulch, waste products such as sawdust, manure, straw, corn stover, shells, hulls, or meal.

In one embodiment of any one of the methods disclosed herein, the inorganic compound is selected from lime, silica, aluminosilicate, gypsum, or sulfur compound. In one embodiment, the inorganic compound is selected from calcium carbonate, calcium magnesium carbonate, calcium oxide, calcium hydroxide, cementitious waste product, or calcium sulfate.

In one embodiment of any one of the methods disclosed herein, the composition is in a dry granular formulation. In one embodiment, the composition comprises an adjuvant and the agricultural composition is in a liquid formulation.

In one embodiment of any one of the methods disclosed herein, the composition comprises the micronutrient. In one embodiment, the composition comprises the macronutrient. In one embodiment, the composition comprises the synthetic herbicide. In one embodiment, the composition comprises the biological compound or related carbon-based organic compound. In one embodiment, the composition comprises the inorganic compound. In one embodiment, the composition comprises the seed, the seed coating, or the seed inoculant.

In one embodiment of any one of the methods disclosed herein, the phytotoxic micronutrient is in a dry granular form or in a liquid form.

In one embodiment of any one of the methods disclosed herein, the composition is applied at a rate of about 1 ounce of the synthetic herbicide per one acre to about 100 ounces of the synthetic herbicide per one acre. In one embodiment, the composition is applied at a rate of about 1 ounce of the synthetic herbicide per one acre to about 70 ounces of the synthetic herbicide per one acre. In one embodiment, the composition comprises FeHEDTA and the composition is applied at a rate of about 900 ounces per one acre to about 2250 ounces per acre.

EXAMPLES

The disclosure will now be illustrated in greater detail by reference to the specific embodiments described in the following examples. The examples are intended to be purely illustrative of the disclosure and are not intended to limit its scope in any way.

Example 1

Combinations of (A) Phytotoxic Micronutrients and (C) Synthetic Herbicides

Combinations of (A) a phytotoxic micronutrient and (C) a synthetic herbicide for treatment of invasive species are provided in Table 2. This table provides combinations and different rates of application of phytotoxic micronutrients comprising boron or a boron source and various synthetic herbicides in liquid and granular forms. The field tests are being implemented with Edaphix B fertilizer and Indaziflam.

Example 2

Combinations of (A) Phytotoxic Micronutrients and (C) Biological Compounds and Related Carbon-Based Organic Compounds Combinations of (A) a phytotoxic micronutrient and (C) a biological compound or a related carbon-based organic compound for treatment of invasive species are provided in Table 3. This table provides the combinations and different rates of application of phytotoxic micronutrients comprising boron or a boron source and various biological compounds or related carbon-based organic compounds in liquid and granular forms.

Example 3

Combinations of (A) Phytotoxic Micronutrients and (C) Inorganic Compounds

Combinations of (A) a phytotoxic micronutrient and (C) an inorganic compound for treatment of invasive species are provided in Table 4. This table provides the combinations and different rates of application of phytotoxic micronutrients comprising boron or a boron source and various inorganic compounds in liquid and granular forms.

TABLE 3

| Combination and Rates of Application | | | | | | | | |
|---|---|---|---|---|---|---|---|---|
| | Low Concentration Combination (granular) | | High Concentration Combination (granular) | | Low Concentration Combination (liquid) | | High Concentration Combination (liquid) | |
| Synthetic Herbicide (SH) | ounces SH/acre (C) | pounds B/acre (A) | ounces SH/acre (C) | pounds B/acre (A) | ounces SH/acre (C) | pounds B/acre (A) | ounces SH/acre (C) | pounds B/acre (A) |
| Imazapic | 2 | 10 | 12 | 100 | 2 | 5 | 12 | 50 |
| Rimsulfuron | 2 | 10 | 3 | 100 | 2 | 5 | 3 | 50 |

TABLE 3-continued

Combination and Rates of Application

| Synthetic Herbicide (SH) | Low Concentration Combination (granular) | | High Concentration Combination (granular) | | Low Concentration Combination (liquid) | | High Concentration Combination (liquid) | |
|---|---|---|---|---|---|---|---|---|
| | ounces SH/acre (C) | pounds B/acre (A) | ounces SH/acre (C) | pounds B/acre (A) | ounces SH/acre (C) | pounds B/acre (A) | ounces SH/acre (C) | pounds B/acre (A) |
| Indaziflam | 2 | 10 | 7 | 100 | 2 | 5 | 7 | 50 |
| 2-4D | 16 | 10 | 64 | 100 | 16 | 5 | 64 | 50 |
| glyphosate | 4 | 10 | 24 | 100 | 4 | 5 | 24 | 50 |
| FeHEDTA | 1089 | 10 | 2178 | 100 | 1089 | 5 | 2178 | 50 |
| aminopyralid | 7 | 10 | 14 | 100 | 7 | 5 | 14 | 50 |

TABLE 4

Combination and Rates of Application

| Biological compound or a related carbon-based organic compound (C) | | Low Concentration B (granular) | High Concentration B (granular) | Low Concentration B (liquid) | High Concentration B (liquid) |
|---|---|---|---|---|---|
| | Rate of (C) per acre | pounds B/acre (A) | pounds B/acre (A) | pounds B/acre (A) | pounds B/acre (A) |
| spores, bacterial inoculant | grams to pounds | 10 | 100 | 5 | 50 |
| soluble carbon | tens to hundreds of pounds | 10 | 100 | 5 | 50 |
| organic matter | tons | 10 | 100 | 5 | 50 |
| mycorrhizae | tens to hundreds of pounds | 10 | 100 | 5 | 50 |
| biochar | hundreds of pounds to tons | 10 | 100 | 5 | 50 |
| sawdust | hundreds of pounds to tons | 10 | 100 | 5 | 50 |
| manure | hundreds of pounds to tons | 10 | 100 | 5 | 50 |
| straw | hundreds of pounds to tons | 10 | 100 | 5 | 50 |
| corn stover | hundreds of pounds to tons | 10 | 100 | 5 | 50 |
| shells, meal, hulls | hundreds of pounds to tons | 10 | 100 | 5 | 50 |

TABLE 5

Combination and Rates of Application

| Inorganic compound (C) | | Low Concentration B (granular) | High Concentration B (granular) | Low Concentration B (liquid) | High Concentration B (liquid) |
|---|---|---|---|---|---|
| | Rate of (C) per acre | pounds B/acre (A) | pounds B/acre (A) | pounds B/acre (A) | pounds B/acre (A) |
| Lime | 1 to 10 tons | 10 | 100 | 5 | 50 |
| Gypsum (calcium sulfate) | 1 to 10 tons | 10 | 100 | 5 | 50 |
| Sulfur Compounds | 0.1 to 10 tons; 1 to 10 tons | 10 | 100 | 5 | 50 |
| Silica Compounds | hundreds of pounds | 10 | 100 | 5 | 50 |

Example 4

Field Trials of Combinations of (A) Phytotoxic Micronutrients and (C) Synthetic Herbicides (BASF Plateau® and Esplanade®)

Annual grasses including cheatgrass' are prevalent in the Western U.S. and cover more than 1 million acres. Effective rangeland restoration strategies are currently lacking. Synthetic herbicides such as BASF Plateau® have been used widely as a method of controlling (i.e. killing) cheatgrass plants when they are early in their lifecycles, typically immediately after germination (fall) or early in the growing season (spring). These treatment efforts, while widespread, often fail because cheatgrass seed remaining in the soil as a seedbank' are unaffected by the herbicidal treatment of the growing plants. The soil seedbank often contains sufficient amounts of seed that plants immediately grow back after herbicide treatment or within a short period of time (1-2 years). An innovative alternative herbicide Esplanade® has been developed by Bayer that controls (i.e. kills) cheatgrass seed in the seedbank prior to seed germination and emergence (pre-emergent). However, these herbicides are somewhat ineffective when used independently.

In this example, field trials in Montana and Colorado are being conducted to test effectiveness of combinations of (A) phytotoxic micronutrients of the present disclosure with (C) synthetic herbicides. The ranch used for this example had abundant cheatgrass that had invaded rangeland on a property reducing livestock yield and increasing rangeland fire frequency. Despite abundant application with herbicides for years, the health of the rangeland has continued to decline with ever-declining desirable perennial vegetation and in particular perennial grasses.

(1) Phytotoxic Micronutrient Boron with Bayer Esplanade®

Field plots (about 200-400 square feet per plot) were installed in Montana and Colorado during the spring time for the combination treatment of micronutrient(s) with Bayer Esplanade®. Bayer Esplanade® liquid will be applied with concurrent with phytotoxic liquid boron fertilizer in a fall application (such as October) as cheatgrass seedlings germinated in response to rainfall. In next spring, perennial grasses are expected to be stimulated by the boron fertilization allowing them to outcompete cheatgrass, while Bayer Esplanade® will control the germination and emergence of cheatgrass seeds in the seedbank. Perennial grasses are expected to increase from about 5% cover at the time of application (October) to about 25% or more cover one year later while cheatgrass may be reduced from about 60% to about 20%.

Example 5

Field Trials of Combinations of (A) Phytotoxic Micronutrients and (C) Synthetic Herbicides (2-4D)

The herbicide 2-4D has been used as a defoliant for broadleaf plants over decades, most recently for broadleaf plants such as dandelions and clover in turf grass. Despite its widespread use and low cost, 2-4D is marginally effective in removing undesirable and invasive broadleaf plants in turf grass since the weeds grow back from the perennial roots after defoliation. A common lawn treatment used is a combination of 2-4D and nitrogen fertilizer as a 'weed- and feed' product. An example is Scotts® Turfbuilder® Weed and Feed.

In this example, an experimental pature in Colorado can be applied with a combination of nitrogen, boron fertilizers and 2-4D herbicide as dry granular products infused with liquid 2-4D on his lawn containing nearly 50% broadleaf weeds. The product is watered into the turfgrass in August allowing the nutrients to be taken up by plant roots during the fall while the 2-4D serves to defoliate the broadleaf weeds immediately following application. Snowcover in winter adds moisture to the soil in springtime and in the beginning of the growing season lower than normal amounts of broadleaf weeds are expected. One year after application broadleaf weeds may be reduced from about 50% to 10%, while the cover of desirable turf grasses may increase up to 90%. In this example, the 2-4D serves to limit the short-term growth of broadleaf weeds while nitrogen encourages the growth to perennial grasses and boron as a phytotoxic micronutrient serves to promote perennial grass growth, but negative growth to the invasive plant species for a long-term.

Example 6

Field Trials of Combinations of (A) Phytotoxic Micronutrients and (C) Macronutrient In this example, a conventional farm operation contemplates conversion to organic operation and to see if the organic farming can successfully control weeds without herbicides. A field with low fertility and low yields can be used as a test. Instead of adding high rates of nitrogen fertilizer followed by herbicide (conventional practice), low organic nitrogen fertilization rates are utilized with companion boron, zinc and iron fertilizer. Harvest for the experimental field is expected to yield slightly lower than conventional practices, however profits are expected higher due to reduced cost of crop inputs. Weeds are seldom encountered due to the rich phytotoxic micronutrient levels in the soil. Furthermore, grain samples are collected for chemical analysis after harvest and finds protein levels similar between conventional and innovative strategies, yet mineral content in the grain shows higher levels of magnesium, iron and zinc suggesting healthier nutrient-dense grain has resulted from the innovative fertilization regime.

Example 7

Combinations of (A) Phytotoxic Micronutrients and (C) a Seed, a Seed Coating, or a Seed Inoculant Seed coatings have been used in agriculture to inoculate seed with beneficial microbes such as inoculation of alfalfa with rhizobium bacteria. Seeds have also been inoculated with compost and nitrogen fertilizer to improve plant growth. Inoculation of seed with herbicides has been contemplated but generally not practiced due to the potential harm to desirable plant species by synthetic herbicides.

A Federal Agency required to protect endangered sage grouse is compelled to restore, conserve and protect sagebrush habitat. However sagebrush habitat is critically imperiled by climate change, increasing fire frequency and invasion of exotic annual grasses. Using an innovative fertilizer prescription, sagebrush and perennial grass seeds are coated with a phytotoxic micronutrient fertilizer coating including boron, copper, iron and molybdenum. This innovative fertilizer prescription stimulates perennial grass and sagebrush seed while discouraging growth of invasive annual grasses. The coated seeds are aggregated into small balls of seed and fertilizer and applied by helicopter on rough rangeland terrain following a rangeland fire that killed nearly all the sagebrush. A few years later perennial grasses will become well established and young sagebrush plants will be growing successfully. Invasive annual grasses are present, but at levels that are not ecologically harmful. Forbs included in the seed balls beneficial to pollinators and sage grouse will germinate and become established.

In this example, phytotoxic micronutrient compounds are used to coat seeds alone or in combination with other active ingredients with the primary intent of promoting the growth of desirable (seeded) vegetation and improving the soil environment to facilitate nutrient uptake, geomicrobiological nutrient cycling, and abiotic soil conditions such as water holding and infiltration.

Combinations of (A) a phytotoxic micronutrient and (C) a seed coating for treatment of invasive species are provided in Tables 6-10.

Table 6 presents experimental comparisons of seed coating on bluebunch wheatgrass using 20.5% boron (Solubor®) as a seed coating based on field application rates of 25 and 50 pounds of boron per acre.

TABLE 6

Comparison of Seed Coating of on bluebunch wheatgrass using 20.5% boron (Solubor ®)

| Products | 20.5% B in B50* | 20.5% B in B25* |
|---|---|---|
| Boron (B) Fertilizer | | |
| Amount of B per area size | 243.9 lbs./acre (=0.006 lbs./sq. ft.) (=2.542 g/sq. ft.) | 122 lbs./acre (=0.003 lbs./sq. ft.) (=1.27 g/sq. ft.) |
| Bluebunch wheat grass seeds** | | |
| No. of Seeds per area size | 40 pounds of seeds (=128.6 seeds/sq. ft.) | 40 pounds of seeds (=128.6 seeds/sq. ft.) |

TABLE 6-continued

| Comparison of Seed Coating of on bluebunch wheatgrass using 20.5% boron (Solubor ®) | | |
|---|---|---|
| Products | 20.5% B in B50* | 20.5% B in B25* |
| Seed Coating Rate | | |
| Amount of B per seed | 19.77 mg/seed | 9.88 mg/seed |
| No. of Seeds per 1 g of B fertilizer | 50.5 seeds/g of Boron | 101 seeds/g of Boron |

B50* - Edaphix B50 products (50 lbs. Boron/acre)
B25* - Edaphix B25 products (25 lbs. Boron/acre)
Bluebunch wheat grass seeds** - about 140.000 seeds per pound (lbs.)

Table 7 presents experimental determination of the amount of seed coating that could be applied to bluebunch wheatgrass using 20.5% boron (Solubor®) starting from a base case of 40 pounds boron per acre.

TABLE 7

| Test batches for determining the amount of seed coating that could be applied to bluebunch wheatgrass using 20.5% boron (Solubor ®) | Batch 1 Seed coating with dry B fertilizer* (20.5% B fertilizer) | Batch 2 Seed coating with wet B fertilizer* (20.5% B fertilizer) | Batch 3 Seed coating with wet B fertilizer* (20.5% B fertilizer) |
|---|---|---|---|
| Bluebunch wheatgrass seed per grain | 328 | 328 | 328 |
| Amount (g) of Solubor ® | 6 | 8.69 | 2.04 |
| No. of Seeds per g of Solubor ® | 82 | 40.7641 | 39.5 |
| No. of Seeds per sq. ft. | 82 | 40.7641 | 80.3 |
| PLS** pounds per acre | 25.5 | 12.7 | 25.0 |
| Pounds of Solubor ® per acre | 575.0 | 832.8 | 195.1 |
| Pounds of B per acre | 117.9 | 170.7 | 40.0 |

B fertilizer* - 20.5% Solubor ®
PLS** - Pounds live seed

Table 8 presents use of different sizes of plant seeds (i.e. wheat and bluebunch wheatgrass) to determine the amount of boron seed coating required using varying rates of seed application in order to achieve an application rate of 40 pounds boron per acre.

TABLE 8

Calculation of Amount of B fertilizer per amount (g) of seeds per square feet for plants

| PLS** pounds per acre | No. of Seeds per sq. ft. | Amount (g) of seeds per sq. ft. | Amount (g) of B fertilizer* | Amount (mg) of Seeds per No. of seeds | Amount (g) of B fertilizer* per amount (g) of seeds per sq. ft. |
|---|---|---|---|---|---|
| Bluebunch wheatgrass (140,000 seeds per pound) | | | | | |
| 10 | 32.1 | 0.104 | 2.04 | 63.5 | 19.57 |
| 15 | 48.2 | 0.156 | 2.04 | 42.3 | 13.05 |
| 20 | 64.3 | 0.208 | 2.04 | 31.7 | 9.79 |
| 25 | 80.3 | 0.261 | 2.04 | 25.4 | 7.83 |
| 30 | 96.4 | 0.313 | 2.04 | 21.2 | 6.52 |
| 35 | 112.5 | 0.365 | 2.04 | 18.1 | 5.59 |
| 40 | 128.6 | 0.417 | 2.04 | 15.9 | 4.89 |
| Wheat (15,000 seeds per pound) | | | | | |
| 10 | 3.4 | 0.104 | 2.04 | 592.4 | 19.57 |
| 15 | 5.2 | 0.156 | 2.04 | 394.9 | 13.05 |
| 20 | 6.9 | 0.208 | 2.04 | 296.2 | 9.79 |
| 25 | 8.6 | 0.261 | 2.04 | 237.0 | 7.83 |
| 30 | 10.3 | 0.313 | 2.04 | 197.5 | 6.52 |

TABLE 8-continued

Calculation of Amount of B fertilizer per amount (g) of seeds per square feet for plants
Bluebunch wheatgrass (140,000 seeds per pound)

| PLS** pounds per acre | No. of Seeds per sq. ft. | Amount (g) of seeds per sq. ft. | Amount (g) of B fertilizer* | Amount (mg) of Seeds per No. of seeds | Amount (g) of B fertilizer* per amount (g) of seeds per sq. ft. |
|---|---|---|---|---|---|
| 35 | 12.1 | 0.365 | 2.04 | 169.3 | 5.59 |
| 40 | 13.8 | 0.417 | 2.04 | 148.1 | 4.89 |

B fertilizer* - 20.5% Solubor ®
PLS** - Pounds live seed

In Table 9, small pots with 10 seeds each are used to test the amount of Solubor® fertilizer required as a seed coating, which is presented as a set-up for greenhouse testing.

TABLE 9

Test plots for seed coating with different concentrations of B fertilizer

| | B fertilizer | Pot size (inches) | Amount (g) of B fertilizer* | Amount (g) of seeds | No. of seeds |
|---|---|---|---|---|---|
| Bluebunch wheatgrass | Control | 3x3 | 0 | 0.02 | 10 |
| | B10 | 4x4 | 0.057 | 0.02 | 10 |
| | B20 | 4x4 | 0.113 | 0.02 | 10 |
| | B30 | 4x4 | 0.170 | 0.02 | 10 |
| | B40 | 4x4 | 0.227 | 0.02 | 10 |
| Wheat | Control | 3x3 | 0 | 0.34 | 10 |
| | B10 | 3x3 | 0.1 | 0.34 | 10 |
| | B40 | 4x4 | 0.23 | 0.34 | 10 |
| | B45 | 3x3 | 0.46 | 0.34 | 10 |

B fertilizer* - 20.5% Solubor ®

In Table 10, use of Sustane® 8-2-4 organic fertilizer the amount of Solubor® required to coat individual granules of product as a coating is presented to achieve a field application rate of 40 pounds boron per acre.

TABLE 10

| Combination of B fertilizer and Sustane ® (organic fertilizer including N) | | |
|---|---|---|
| | 1 Square Feet | 0.25 Square Feet (6 in. × 6 in. plot) |
| Sustane ® Coating | 7.03 g/sq. ft. of Sustane ®*; and 2.04 g/sq.ft of B40 Solubor ® | 1.82 g/sq. ft. of Sustane ®; and 0.51 g/sq.ft of B40 Solubor ® |

Sustane ®* - 8-2-4 Sustane ®

Unless defined otherwise, all technical and scientific terms herein have the same meaning as commonly understood by one of ordinary skill in the art to which this disclosure belongs. Although any methods and materials, similar or equivalent to those described herein, can be used in the practice or testing of the present disclosure, the preferred methods and materials are described herein. All publications, patents, and patent publications cited are incorporated by reference herein in their entirety for all purposes.

The publications discussed herein are provided solely for their disclosure prior to the filing date of the present application. Nothing herein is to be construed as an admission that the present disclosure is not entitled to antedate such publication by virtue of prior disclosure.

It is understood that there are other embodiments of the disclosure other than that described herein, which is provided to explain the disclosure to those skilled in the state of the art and should not be construed as limiting the claims made below.

FURTHER NUMBERED EMBODIMENTS OF THE DISCLOSURE

1. A method for selectively controlling the growth of at least one invasive plant species existing in a perennial grass plant community, comprising applying:
   - (i) a phytotoxic micronutrient; and
   - (ii) an agricultural composition comprising one or more ingredients selected from
     - a) a micronutrient;
     - b) a macronutrient;
     - c) an adjuvant;
     - d) a synthetic herbicide;
     - e) a biological compound or a related carbon-based organic compound;
     - f) an inorganic compound; or
     - g) a seed, a seed coating, or a seed inoculant.
2. A method for negatively impacting the growth of at least one invasive plant species, including the selective control of the invasive plant species, existing in a perennial grass plant community, while preserving the perennial grass plant community species, comprising applying:
   - (i) a phytotoxic micronutrient; and
   - (ii) an agricultural composition comprising one or more ingredients selected from
     - a) a micronutrient;
     - b) a macronutrient;
     - c) an adjuvant;
     - d) a synthetic herbicide;
     - e) a biological compound or a related carbon-based organic compound;
     - f) an inorganic compound; or
     - g) a seed, a seed coating, or a seed inoculant.
3. The method of embodiment 1 or 2, wherein the phytotoxic micronutrient comprises boron or copper.
4. The method of embodiment 1 or 2, wherein the phytotoxic micronutrient comprises boron.
5. The method of embodiment 4, wherein the phytotoxic micronutrient is applied to achieve a water soluble boron concentration in the soil of the perennial grass plant community from about 3 milligrams per liter to about 50 milligrams per liter.
6. The method of embodiment 4, wherein the phytotoxic micronutrient is applied at a rate of about 1 pound of elemental boron per one acre to about 150 pounds of elemental boron per one acre.
7. The method of embodiment 4, wherein the phytotoxic micronutrient is applied at a rate of about 5, about 10, about 15, about 25, about 50, about 75, or about 100 pounds of elemental boron per one acre.
8. The method of any one of embodiments 4-7, wherein the boron in the phytotoxic micronutrient is phytotoxic to the at least one invasive plant species while maintaining or increasing the growth and vigor of the perennial grass.
9. The method of embodiment 8, wherein the at least one invasive species is selected from the group consisting of cheatgrass, dandelion, Canadian thistle, kochia, knotweed, poison ivy and spotted knapweed.
10. The method of any one of embodiments 1-9, wherein said perennial grass plant community comprises bluebunch wheatgrass, Western wheatgrass, slender wheatgrass, Idaho fescue, sheep fescue, orchard grass, smooth brome, timothy or Kentucky bluegrass.
11. The method of any one of embodiments 1-10, wherein the micronutrient in the agricultural composition is selected from copper, zinc, iron, boron, manganese, molybdenum, or chlorine.
12. The method of any one of embodiments 1-11, wherein the macronutrient in the agricultural composition is selected from nitrogen, phosphorous, or potassium.
13. The method of embodiment 11 or 12, wherein the agricultural composition further comprises an organic fertilizer or an inorganic fertilizer.
14. The method of embodiment 13, wherein the organic fertilizer or the inorganic fertilizer comprises calcium, magnesium, sulfur, carbon, hydrogen or oxygen elements.
15. The method of any one of embodiment 1-14, wherein the adjuvant in the agricultural composition is selected from a wetting agent, an activator, a crop oil concentrate, a buffer, a marker dye or a surfactant.
16. The method of any one of embodiments 1-15, wherein the synthetic herbicide in the agricultural composition is formulated from petrochemicals.
17. The method of any one of embodiments 1-15, wherein the synthetic herbicide in the agricultural composition is selected from: glyphosate, glufosinate, glufosinate ammonium, 2,4-D, 3,4-DA, MCPA (2-methyl-4-chlorophenoxyacetic acid), 2,4,5-T, 2,4-DP (dichlorprop), 2,4-DP-P, 4-CPP, 3,4-DP, fenoprop, CMPP (mecoprop), CMPP-P, 4-CPB, 2,4-DB, 3,4-DB, 2,4,5-TB, MCPB, dicamba, tricamba, chloramben, 2,3,6-TBA (2,3,6-trichlorobenzoic acid), aminopyralid, clopyralid, fluroxypyr, picloram, triclopyr, halauxifen, 4-amino-3-chloro-6-(4-chloro-2-fluoro-3-methoxyphenyl)-5-fluoropyridine-2-carboxylic acid, benzyl 4-amino-3-chloro-6-(4-chloro-2-fluoro-3-methoxyphenyl)-5-fluoropyridine-2-carboxylate, benazolin-ethyl, (±)-2-exo-(2-Methylbenzyloxy)-1-methyl-4-isopropyl-7-oxabicyclo[2.2.1]heptane, clodinafop, clodinafop-propargyl, cyhalofop, cyhalofop-butyl, diclofop, diclofop-methyl, fenoxaprop, fenoxaprop-ethyl, fenoxaprop-P, fenoxaprop-P-ethyl, fluazifop, fluazifop-butyl, fluazifop-p, fluazifop-p-butyl, haloxyfop, haloxyfop-methyl, haloxyfop-P, haloxyfop-p-methyl, metamifop, propaquizafop, quizalofop, quizalofop-ethyl, quizalofop-tefuryl, quizalofop-p, quizalofop-p-ethyl, quizalofop-p-tefuryl, alloxydim, alloxydim-sodium, butroxydim, clethodim, cycloxydim, profoxydim, sethoxydim, tepraloxydim, tralkoxydim, pinoxaden, amidosulfuron, azimsulfuron, bensulfuron, bensulfuron-methyl, chlorimuron, chlorimuron-ethyl, chlorsulfuron, cinosulfuron, cyclosulfamuron, ethametsulfuron, ethametsulfuron-methyl, ethoxysulfuron, flazasulfuron, flucetosulfuron, flupyrsulfuron, flupyrsulfuron-methyl-sodium, foramsulfuron, halosulfuron, halosulfuron-methyl, imazosulfuron, iodosulfuron, iodosulfuron-methyl-sodium, iofensulfuron, iofensulfuron-sodium, mesosulfuron, mesosulfuron-methyl, metazosulfuron, metsulfuron, metsulfuron-methyl, nicosulfuron, orthosulfamuron, oxasulfuron, primisulfuron, primisulfuron-methyl, propyrisulfuron, prosulfuron, pyrazosulfuron, pyrazosulfuron-ethyl, rimsulfuron, sulfometuron, sulfometuron-methyl, sulfosulfuron, thifensulfuron, thifensulfuron-methyl, triasulfuron, tribenuron, tribenuron-methyl, trifloxysulfuron, triflusulfuron, triflusulfuron-methyl, tritosulfuron, cloransulam, diclosulam, florasulam, flumetsulam, metosulam, penoxsulam, pyrimisulfan, pyroxsulam, flucarbazone, propoxycarbazone, thiencarbazone, bispyribac, pyribenzoxim, pyriftalid, pyriminobac, pyrithiobac, 4-[[[2-[(4,6-dimethoxy-2-pyrimidinyl)oxy]phenyl]methyl]amino]-benzoic acid-1-methylethyl ester, 4-[[[2-[(4,6-dimethoxy-2-pyrimidinyl)oxy]phenyl]methyl]amino]-benzoic acid propyl ester, N-(4-bromophenyl)-2-[(4,6-dimethoxy-2-pyrimidinyl)oxy]benzenemethanamine, bentazone, propanil, bifenox, oxadiazon, butralin, dithiopyr, fentrazamide, ipfencarbazone, cafenstrole, fenoxasulfone, aclonifen, benzobicyclon, benzofenap, bicyclopyrone, fenquintrione, isoxaflutole, isoxachlortole, mesotrione, pyrasulfotole, pyrazolynate, pyrazoxyfen, sulcotrione, tefuryltrione, tembotrione, tolpyralate, topramezone, indaziflam, indanofan, methiozolin, oxaziclomefone, iron hydroxyethylethylenediaminetriacetic acid (FeHEDTA), pelargonic acid, atrazine, metolachlor, paraquat, imazapic, imazapyr, imazamox, linuron, bentazon, sulfentrazone, or agriculturally acceptable salts, esters or amides thereof.

18. The method of any one of embodiments 1-15, wherein the synthetic herbicide in the agricultural composition is selected from: glyphosate, 2-4D, imazapic, rimsulfuron, indaziflam, FeHEDTA, or aminopyralid.
19. The method of any one of embodiments 1-18, wherein the biological compound and related carbon-based organic compound in the agricultural composition is selected from fungus, spores, bacteria, soluble carbon-based solids or liquids (including sugar), organic matter, mycorrhizae, biochar, hydromulch, hydraulic mulch, waste products such as sawdust, manure, straw, corn stover, shells, hulls, or meal.
20. The method of any one of embodiments 1-19 wherein the inorganic compound in the agricultural composition is selected from lime, silica, aluminosilicate, gypsum, or sulfur compound.
21. The method of any one of embodiments 1-19, wherein the inorganic compound in the agricultural composition is selected from calcium carbonate, calcium magnesium carbonate, calcium oxide, calcium hydroxide, cementitious waste product, or calcium sulfate.
22. The method of any one of embodiments 1-21, wherein the phytotoxic micronutrient and the agricultural composition is in a dry granular formulation or in a liquid formulation.
23. The method of any one of embodiments 1-22, wherein the agricultural composition comprises an adjuvant and the agricultural composition is in a liquid formulation.
24. The method of any one of embodiments 1-23, wherein the agricultural composition comprises the micronutrient.
25. The method of any one of embodiments 1-24, wherein the agricultural composition comprises the macronutrient.
26. The method of any one of embodiments 1-25, wherein the agricultural composition comprises the synthetic herbicide.
27. The method of any one of embodiments 1-26, wherein the agricultural composition comprises the biological compound or related carbon-based organic compound.
28. The method of any one of embodiments 1-27, wherein the agricultural composition comprises the inorganic compound.
29. The method of any one of embodiments 1-28, wherein the agricultural composition comprises the seed, the seed coating, or the seed inoculant.
30. The method of embodiment 26, wherein the agricultural composition is applied at a rate of about 1 ounce of the synthetic herbicide per one acre to about 100 ounces of the synthetic herbicide per one acre.
31. The method of embodiment 26, wherein the agricultural composition is applied at a rate of about 1 ounce of the synthetic herbicide per one acre to about 70 ounces of the synthetic herbicide per one acre.
32. The method of embodiment 26, wherein the synthetic herbicide is FeHEDTA and the agricultural composition is applied at a rate of about 900 ounces per one acre to about 2250 ounces per acre.
33. The method of any one of embodiments 1-12, wherein the phytotoxic micronutrient and the agricultural composition are applied simultaneously or sequentially.
34. The method of any one of embodiments 1-33, wherein applying the phytotoxic micronutrient and the agricultural composition provides a synergistic effect in controlling the growth of at least one invasive plant, compared to when the phototoxic micronutrient or the agricultural composition is applied alone.
35. A method of or selectively controlling the growth of at least one invasive plant species existing in a perennial grass plant community, comprising applying a composition comprising:
i) a phytotoxic micronutrient; and
ii) a synthetic herbicide.
36. A method for negatively impacting the growth of at least one invasive plant species, including the selective control of the invasive plant species, existing in a perennial grass plant community, while preserving the perennial grass plant community species, comprising applying a composition comprising:

i) a phytotoxic micronutrient; and
ii) a synthetic herbicide.

37. The method of embodiment 35 or 36, wherein the composition further comprises one or more ingredients selected from:
a) a micronutrient;
b) a macronutrient;
c) an adjuvant;
d) a biological compound or a related carbon-based organic compound;
e) an inorganic compound; or
f) a seed, a seed coating, or a seed inoculant.

38. The method of any one of embodiments 35-37, wherein the phytotoxic micronutrient comprises a boron or a copper.

39. The method of any one of embodiments 35-38, wherein the phytotoxic micronutrient comprises boron.

40. The method of embodiment 39, wherein the phytotoxic micronutrient comprises boron in about 10% to about 30% by weight.

41. The method of embodiment 39 or 40, wherein the phytotoxic micronutrient is applied to achieve a water soluble boron concentration in the soil of the perennial grass plant community from about 3 milligrams per liter to about 50 milligrams per liter.

42. The method of embodiment 39 or 40, wherein the phytotoxic micronutrient is applied at a rate of about 1 pound of elemental boron per one acre to about 150 pounds of elemental boron per one acre.

43. The method of embodiment 39 or 40, wherein the phytotoxic micronutrient is applied at a rate of about 5, about 10, about 15, about 25, about 50, about 75, or about 100 pounds of elemental boron per one acre.

44. The method of any one of embodiments 39-43, wherein the boron in the phytotoxic micronutrient is phytotoxic to the at least one invasive plant species while increasing the growth and vigor of the perennial grass.

45. The method of embodiment 44, wherein the at least one invasive species is selected from the group consisting of cheatgrass, dandelion, Canadian thistle, kochia, knotweed, poison ivy and spotted knapweed.

46. The method of any one of embodiments 35-45, wherein said perennial grass plant community comprises bluebunch wheatgrass, Western wheatgrass, slender wheatgrass, Idaho fescue, sheep fescue, orchard grass, smooth brome, timothy or Kentucky bluegrass.

47. The method of any one of embodiments 37-46, wherein the micronutrient is selected from copper, zinc, iron, boron, manganese, molybdenum, or chlorine.

48. The method of any one of embodiments 37-47, wherein the macronutrient is selected from nitrogen, phosphorous, or potassium.

49. The method of embodiment 47 or 48, further comprising an organic fertilizer or an inorganic fertilizer.

50. The method of embodiment 49, wherein the organic fertilizer or the inorganic fertilizer comprises calcium, magnesium, sulfur, carbon, hydrogen or oxygen elements.

51. The method of any one of embodiment 37-50, wherein the adjuvant is selected from a wetting agent, an activator, a crop oil concentrate, a buffer, a marker dye or a surfactant.

52. The method of any one of embodiments 35-51, wherein the synthetic herbicide is formulated from petrochemicals.

53. The method of any one of embodiments 35-51, wherein the synthetic herbicide is selected from: glyphosate, glufosinate, glufosinate ammonium, 2,4-D, 3,4-DA, MCPA (2-methyl-4-chlorophenoxyacetic acid), 2,4,5-T, 2,4-DP (dichlorprop), 2,4-DP-P, 4-CPP, 3,4-DP, fenoprop, CMPP (mecoprop), CMPP-P, 4-CPB, 2,4-DB, 3,4-DB, 2,4,5-TB, MCPB, dicamba, tricamba, chloramben, 2,3,6-TBA (2,3,6-trichlorobenzoic acid), aminopyralid, clopyralid, fluroxypyr, picloram, triclopyr, halauxifen, 4-amino-3-chloro-6-(4-chloro-2-fluoro-3-methoxyphenyl)-5-fluoropyridine-2-carboxylic acid, benzyl 4-amino-3-chloro-6-(4-chloro-2-fluoro-3-methoxyphenyl)-5-fluoropyridine-2-carboxylate, benazolin-ethyl, (±)-2-exo-(2-Methylbenzyloxy)-1-methyl-4-isopropyl-7-oxabicyclo[2.2.1]heptane, clodinafop, clodinafop-propargyl, cyhalofop, cyhalofop-butyl, diclofop, diclofop-methyl, fenoxaprop, fenoxaprop-ethyl, fenoxaprop-P, fenoxaprop-P-ethyl, fluazifop, fluazifop-butyl, fluazifop-p, fluazifop-p-butyl, haloxyfop, haloxyfop-methyl, haloxyfop-P, haloxyfop-p-methyl, metamifop, propaquizafop, quizalofop, quizalofop-ethyl, quizalofop-tefuryl, quizalofop-p, quizalofop-p-ethyl, quizalofop-p-tefuryl, alloxydim, alloxydim-sodium, butroxydim, clethodim, cycloxydim, profoxydim, sethoxydim, tepraloxydim, tralkoxydim, pinoxaden, amidosulfuron, azimsulfuron, bensulfuron, bensulfuron-methyl, chlorimuron, chlorimuron-ethyl, chlorsulfuron, cinosulfuron, cyclosulfamuron, ethametsulfuron, ethametsulfuron-methyl, ethoxysulfuron, flazasulfuron, flucetosulfuron, flupyrsulfuron, flupyrsulfuron-methyl-sodium, foramsulfuron, halosulfuron, halosulfuron-methyl, imazosulfuron, iodosulfuron, iodosulfuron-methyl-sodium, iofensulfuron, iofensulfuron-sodium, mesosulfuron, mesosulfuron-methyl, metazosulfuron, metsulfuron, metsulfuron-methyl, nicosulfuron, orthosulfamuron, oxasulfuron, primisulfuron, primisulfuron-methyl, propyrisulfuron, prosulfuron, pyrazosulfuron, pyrazosulfuron-ethyl, rimsulfuron, sulfometuron, sulfometuron-methyl, sulfosulfuron, thifensulfuron, thifensulfuron-methyl, triasulfuron, tribenuron, tribenuron-methyl, trifloxysulfuron, triflusulfuron, triflusulfuron-methyl, tritosulfuron, cloransulam, diclosulam, florasulam, flumetsulam, metosulam, penoxsulam, pyrimisulfan, pyroxsulam, flucarbazone, propoxycarbazone, thiencarbazone, bispyribac, pyribenzoxim, pyriftalid, pyriminobac, pyrithiobac, 4-[[[2-[(4,6-dimethoxy-2-pyrimidinyl)oxy]phenyl]methyl]amino]-benzoic acid-1-methylethyl ester, 4-[[[2-[(4,6-dimethoxy-2-pyrimidinyl)oxy]phenyl]methyl]amino]-benzoic acid propyl ester, N-(4-bromophenyl)-2-[(4,6-dimethoxy-2-pyrimidinyl)oxy]benzenemethanamine, bentazone, propanil, bifenox, oxadiazon, butralin, dithiopyr, fentrazamide, ipfencarbazone, cafenstrole, fenoxasulfone, aclonifen, benzobicyclon, benzofenap, bicyclopyrone, fenquintrione, isoxaflutole, isoxachlortole, mesotrione, pyrasulfotole, pyrazolynate, pyrazoxyfen, sulcotrione, tefuryltrione, tembotrione, tolpyralate, topramezone, indaziflam, indanofan, methiozolin, oxaziclomefone, iron hydroxyethylethylenediaminetriacetic acid (FeHEDTA), pelargonic acid, atrazine, metolachlor, paraquat, imazapic, imazapyr, imazamox, linuron, bentazon, sulfentrazone, or agriculturally acceptable salts, esters or amides thereof.

54. The method of any one of embodiments 35-51, wherein the synthetic herbicide is selected from: glyphosate, 2-4D, imazapic, rimsulfuron, indaziflam, FeHEDTA, or aminopyralid.

55. The method of any one of embodiments 37-54, wherein the biological compound and related carbon-based organic compound is selected from fungus, spores, bacteria, soluble carbon-based solids or liquids (including sugar), organic matter, mycorrhizae, biochar, hydromulch, hydraulic mulch, waste products such as sawdust, manure, straw, corn stover, shells, hulls, or meal.
56. The method of any one of embodiments 37-55, wherein the inorganic compound is selected from lime, silica, aluminosilicate, gypsum, or sulfur compound.
57. The method of any one of embodiments 37-56, wherein the inorganic compound is selected from calcium carbonate, calcium magnesium carbonate, calcium oxide, calcium hydroxide, cementitious waste product, or calcium sulfate.
58. The method of any one of embodiments 35-57, wherein the composition is in a dry granular formulation.
59. The method of any one of embodiments 35-57, wherein the composition comprises an adjuvant and the composition is in a liquid formulation.
60. The method of any one of embodiments 37-59, wherein the composition comprises the micronutrient.
61. The method of any one of embodiments 37-60, wherein the composition comprises the macronutrient.
62. The method of any one of embodiments 35-61, wherein the composition comprises the synthetic herbicide.
63. The method of any one of embodiments 37-62, wherein the composition comprises the biological compound or related carbon-based organic compound.
64. The method of any one of embodiments 37-63, wherein the composition comprises the inorganic compound.
65. The method of any one of embodiments 37-64, wherein the composition comprises the seed, the seed coating, or the seed inoculant.
66. The method of any one of embodiments 35-65, wherein the phytotoxic micronutrient is in a dry granular form or in a liquid form.
67. The method of embodiment 62, wherein the composition is applied at a rate of about 1 ounce of the synthetic herbicide per one acre to about 100 ounces of the synthetic herbicide per one acre.
68. The method of embodiment 62, wherein the composition is applied at a rate of about 1 ounce of the synthetic herbicide per one acre to about 70 ounces of the synthetic herbicide per one acre.
69. The method of embodiment 62, wherein the synthetic herbicide is FeHEDTA and the composition is applied at a rate of about 900 ounces per one acre to about 2250 ounces per acre.
70. The method of any one of embodiments 35-69, wherein applying the composition comprising the phytotoxic micronutrient and the synthetic herbicide provides a synergistic effect in controlling the growth of at least one invasive plant, compared to when the phototoxic micronutrient or the synthetic herbicide is applied alone.
71. A composition comprising a phytotoxic micronutrient and a synthetic herbicide.
72. The composition of embodiment 71, further comprising one or more ingredients selected from:
    a) a micronutrient;
    b) a macronutrient;
    c) an adjuvant;
    d) a synthetic herbicide;
    e) a biological compound or a related carbon-based organic compound;
    f) an inorganic compound; or
    g) a seed, a seed coating, or a seed inoculant.
73. The composition of embodiment 71 or 72, wherein the phytotoxic micronutrient comprises boron or a copper.
74. The composition of any one of embodiments 71-73, wherein the phytotoxic micronutrient comprises boron.
75. The composition of embodiment 74, wherein the phytotoxic micronutrient comprises boron in about 10% to about 30% by weight.
76. The composition of any one of embodiments 72-75, wherein the micronutrient is selected from copper, zinc, iron, boron, manganese, molybdenum, or chlorine.
77. The composition of any one of embodiments 72-76, wherein the macronutrient is selected from nitrogen, phosphorous, or potassium.
78. The composition of embodiment 76 or 77, further comprising an organic fertilizer or an inorganic fertilizer.
79. The composition of embodiment 78, wherein the organic fertilizer or the inorganic fertilizer comprises calcium, magnesium, sulfur, carbon, hydrogen or oxygen elements.
80. The composition of any one of embodiment 72-79, wherein the adjuvant is selected from a wetting agent, an activator, a crop oil concentrate, a buffer, a marker dye or a surfactant.
81. The composition of any one of embodiments 71-81, wherein the synthetic herbicide is formulated from petrochemicals.
82. The composition of any one of embodiments 71-81 wherein the synthetic herbicide is selected from: glyphosate, glufosinate, glufosinate ammonium, 2,4-D, 3,4-DA, MCPA (2-methyl-4-chlorophenoxyacetic acid), 2,4,5-T, 2,4-DP (dichlorprop), 2,4-DP-P, 4-CPP, 3,4-DP, fenoprop, CMPP (mecoprop), CMPP-P, 4-CPB, 2,4-DB, 3,4-DB, 2,4,5-TB, MCPB, dicamba, tricamba, chloramben, 2,3,6-TBA (2,3,6-trichlorobenzoic acid), aminopyralid, clopyralid, fluroxypyr, picloram, triclopyr, halauxifen, 4-amino-3-chloro-6-(4-chloro-2-fluoro-3-methoxyphenyl)-5-fluoropyridine-2-carboxylic acid, benzyl 4-amino-3-chloro-6-(4-chloro-2-fluoro-3-methoxyphenyl)-5-fluoropyridine-2-carboxylate, benazolin-ethyl, (±)-2-exo-(2-Methylbenzyloxy)-1-methyl-4-isopropyl-7-oxabicyclo [2.2.1]heptane, clodinafop, clodinafop-propargyl, cyhalofop, cyhalofop-butyl, diclofop, diclofop-methyl, fenoxaprop, fenoxaprop-ethyl, fenoxaprop-P, fenoxaprop-P-ethyl, fluazifop, fluazifop-butyl, fluazifop-p, fluazifop-p-butyl, haloxyfop, haloxyfop-methyl, haloxyfop-P, haloxyfop-p-methyl, metamifop, propaquizafop, quizalofop, quizalofop-ethyl, quizalofop-tefuryl, quizalofop-p, quizalofop-p-ethyl, quizalofop-p-tefuryl, alloxydim, alloxydim-sodium, butroxydim, clethodim, cycloxydim, profoxydim, sethoxydim, tepraloxydim, tralkoxydim, pinoxaden, amidosulfuron, azimsulfuron, bensulfuron, bensulfuron-methyl, chlorimuron, chlorimuron-ethyl, chlorsulfuron, cinosulfuron, cyclosulfamuron, ethametsulfuron, ethametsulfuron-methyl, ethoxysulfuron, flazasulfuron, flucetosulfuron, flupyrsulfuron, flupyrsulfuron-methyl-sodium, foramsulfuron, halosulfuron, halosulfuron-methyl, imazosulfuron, iodosulfuron, iodosulfuronmethyl-sodium, iofensulfuron, iofensulfuron-sodium, mesosulfuron, mesosulfuron-methyl, metazosulfuron, metsulfuron, metsulfuron-methyl, nicosulfuron, orthosulfamuron, oxasulfuron, primisulfuron, primisulfuron-methyl, propyrisulfuron, prosulfuron, pyrazosulfuron, pyrazosulfuron-ethyl, rimsulfuron, sulfometuron, sulfometuron-methyl, sulfosulfuron, thifensulfuron, thifensulfuron-methyl, triasulfuron, tribenuron, tribenuron-methyl, trifloxysulfuron, triflusulfuron, triflusulfuron-methyl, tritosulfuron, cloransulam, diclosulam, florasulam, flumetsulam, metosulam, penoxsulam, pyrimisulfan, pyroxsulam, flucarbazone, propoxycarbazone, thiencarbazone, bispyribac, pyribenzoxim, pyriftalid, pyriminobac, pyrithiobac, 4-[[[2-[(4,6-dimethoxy-2-pyrimidinyl)oxy]phenyl]methyl]amino]-benzoic acid-1-methylethyl ester, 4-[[[2-[(4,6-dimethoxy-2-pyrimidinyl)oxy]phenyl]methyl]amino]-benzoic acid propyl ester, N-(4-bromophenyl)-2-[(4,6-dimethoxy-2-pyrimidinyl)oxy]benzenemethanamine, bentazone, propanil, bifenox, oxadiazon, butralin, dithiopyr, fentrazamide, ipfencarbazone, cafenstrole, fenoxasulfone, aclonifen, benzobicyclon, benzofenap, bicyclopyrone, fenquintri one, isoxaflutole, isoxachlortole, mesotrione, pyrasulfotole, pyrazolynate, pyrazoxyfen, sulcotrione, tefuryltrione, tembotrione, tolpyralate, topramezone, indaziflam, indanofan, methiozolin, oxaziclomefone, iron hydroxyethylethylenediaminetriacetic acid (FeHEDTA), pelargonic acid, atrazine, metolachlor, paraquat, imazapic, imazapyr, imazamox, linuron, bentazon, sulfentrazone, or agriculturally acceptable salts, esters or amides thereof.

83. The composition of any one of embodiments 71-81, wherein the synthetic herbicide is selected from: glyphosate, 2-4D, imazapic, rimsulfuron, indaziflam, FeHEDTA, or aminopyralid.
84. The composition of any one of embodiments 72-83, wherein the biological compound and related carbon-based organic compound is selected from fungus, spores, bacteria, soluble carbon-based solids or liquids (including sugar), organic matter, mycorrhizae, biochar, hydromulch, hydraulic mulch, waste products such as sawdust, manure, straw, corn stover, shells, hulls, or meal.
85. The composition of any one of embodiments 72-84, wherein the inorganic compound is selected from lime, silica, aluminosilicate, gypsum, or sulfur compound.
86. The composition of any one of embodiments 72-84, wherein the inorganic compound is selected from calcium carbonate, calcium magnesium carbonate, calcium oxide, calcium hydroxide, cementitious waste product, or calcium sulfate.
87. The composition of any one of embodiments 72-86, wherein the composition is in a dry granular form.
88. The composition of any one of embodiments 72-86, wherein the composition comprises the adjuvant and the composition is a liquid.
89. The composition of any one of embodiments 72-88, wherein the composition comprises the micronutrient.
90. The composition of any one of embodiments 72-89, wherein the composition comprises the macronutrient.
91. The composition of any one of embodiments 72-90, wherein the composition comprises the synthetic herbicide.
92. The composition of any one of embodiments 72-91, wherein the composition comprises the biological compound or related carbon-based organic compound.
93. The composition of any one of embodiments 72-92, wherein the composition comprises the inorganic compound.
94. The composition of any one of embodiments 72-93 wherein the composition comprises the seed, the seed coating, or the seed inoculant.
95. An agricultural kit comprising:
    (i) a phytotoxic micronutrient; and
    (ii) an agricultural composition comprising one or more ingredients selected from
        a) a micronutrient;
        b) a macronutrient;
        c) a synthetic herbicide;
        d) a biological compound or a related carbon-based organic compound;
        e) an inorganic compound; or
        f) a seed, a seed coating, or a seed inoculant.
96. The agricultural kit of embodiment 95, wherein the agricultural composition is a liquid formulation further comprising an adjuvant.
97. The agricultural kit of embodiment 95 or 96, wherein the phytotoxic micronutrient comprises boron.
98. The agricultural kit of any one of embodiments 95-97, wherein the agricultural composition comprises a synthetic herbicide.
99. An agricultural combination comprising:
    (i) a phytotoxic micronutrient; and
    (ii) an agricultural composition comprising one or more ingredients selected from
        a) a micronutrient;
        b) a macronutrient;
        c) a synthetic herbicide;
        d) a biological compound or a related carbon-based organic compound;
        e) an inorganic compound; or
        f) a seed, a seed coating, or a seed inoculant.
100. The agricultural combination of embodiment 99, wherein the agricultural composition is a liquid formulation further comprising an adjuvant.
101. The agricultural combination of embodiment 99 or 100, wherein the phytotoxic micronutrient comprises boron.
102. The agricultural combination of any one of embodiments 99-101, wherein the agricultural composition comprises a synthetic herbicide.

INCORPORATION BY REFERENCE

All references, articles, publications, patents, patent publications, and patent applications cited herein within the above text and/or cited below are incorporated by reference in their entireties for all purposes. However, mention of any reference, article, publication, patent, patent publication, and patent application cited herein is not, and should not be taken as acknowledgment or any form of suggestion that they constitute valid prior art or form part of the common general knowledge in any country in the world. Further, U.S. Pat. No. 8,835,355 (issued on Sep. 16, 2014), U.S. Pat. No. 9,096,478 (issued on Aug. 4, 2019), U.S. Pat. No. 9,775,357 (issued on Oct. 3, 2017), U.S. Pat. No. 10,251,399 (issued on Apr. 9, 2019), U.S. Pat. No. 10,681,913 (issued on Jun. 16, 2020), are hereby incorporated by reference. Also, U.S. patent application Ser. No. 16/714,177 (published as US2020/0187504 A1 on Jun. 18, 2020) and U.S. Ser. No. 16/868,118 (filed on May 6, 2020) are hereby incorporated by reference.

ADDITIONAL REFERENCES

Bangsund, D. A., and Leistritz, F. L. 1991. Economic impacts of leafy spurge on grazing lands in the northern Great Plains. NDSU Agriculture Economic Report No. 275-S.

Elliott, G. C. and P. V., Nelson. 1981. Acute boron toxicity in Begonia×hiemalis Schwabenland Red.' Commun. Soil Sci. Plant Annu. 12(8):775-783.

Gogue, G. J. and K. C. Sanderson. 1973. Boron toxicity of Chrysanthemum. HortScience 8:473-475.

Hammer, P. A. and D. A. Bailey. 1987. Poinsettia tolerance of molybdenum. HortScience 22: 1284-1285.

Heap I. 2006. *The International Survey of Herbicide Resistant Weeds*. Available from URL: http://www.weedscience.com.

Jong-Myung, Chun-Ho Pak, and Chiwon W. Lee, 1996. Micro-nutrient toxicity in French marigold. J. Plant Nut. 19(6): 901-916.

Kabata-Pendias, A. and H. Pendias. 2001. Trace Elements in Soils and Plants, Third Edition. CRC Press.

Keren R and Bingham F T 1985 Boron in water, soils, and plants. Adv. Soil Sci. 1,230-276.

Lee, Chiwon W., Jong-Myung Choi, and Chun-Ho Pak. 1996. Micronutrient Toxicity in Seed Geranium (*Pelargonium×hortorum* Bailey). J. Amer. Soc. Hort. Sci. 121 (1):77-82.

Marousky, F. J. 1981. Symptomology of fluoride and boron injury in *Lilium longiflorum* Thunb. J. Amer. Soc. Hort. Sci. 106:341-344.

Maxwell B. D., Roush M. L. and Radosevich S. R. 1990. Predicting the evolution and dynamics of herbicide resistance in weed populations. *Weed Technol.* 4, 2-13.

Pimentel, D., McNair, S., Janecka, J., Wightman, J., Simmonds, C., O'Connell, C., Wong, E., Russel, L., Zern, J., Aquino, T. and Tsomondo, T. 2001. Economic and environmental threats of alien plant, animal, and microbe invasions. Agriculture, Ecosystems and Environment 84: 1-20

Pimentel, D., Zuniga, R., and Morrison, D. 2005. Update on the environmental and economic costs associated with alien-invasive species in the United States. Ecological Economics. 52: 273-288.

Yamada, T., R. J. Kremer, P. R. de Camargo e Castro, and B. W. Wood. 2009. Glyphosate Interactions with physiology, nutrition, and diseases of plants: Threat to agricultural sustainability? Europ. J. Agron. 31:111-113.

The invention claimed is:

1. A method of treating degraded rangeland to reduce the number of annual plants on the rangeland while increasing the number of perennial plants on the rangeland, the method consisting of:

applying to the degraded rangeland a combination of a phytotoxic micronutrient, wherein the phytotoxic micronutrient is elemental boron;

a synthetic herbicide, wherein the synthetic herbicide is indaziflam; and an adjuvant; wherein the degraded rangeland comprises at least one annual plant species; wherein the phytotoxic micronutrient is applied at a rate of about 10 pounds to about 25 pounds of elemental boron per acre, and wherein the synthetic herbicide is applied at a rate of about 3 ounces to about 7 ounces per acre; and wherein the degraded rangeland comprises disturbed land sites.

2. The method of claim 1, wherein the annual plant species is selected from the group consisting of *Bromus tectorum, Bromus Japonicus, Bromus hordeaceus, Aegilops cylindrica, Bromus rubens*, Taeniatherum *caput-medusae, Ventenata dubia, Poa bulbosa, Eremopyrum triticeum, Echinochloa crusgalli, Vulpia myuros, Eleusine indica, Digitaria* spp., Poa annual, Bassia, *Lolium* multifloru, *panicum* spp., *Amaranthus, Chenopodium berlandieri, Setaria*, Digitus, *Sinapis arvensis, Thlaspi arvense, Lolium, Galium aparine, Avena fatua, Abutilon theophrasti, Portulaca oleracea*, Echninochloa, *Polygonum pensylvanicum, Xanthium, Fallopia convolvulus, Medicago, Agrostemma githago, Ambrosia, Sonchus*, Chicorium *intybus, Senna Obtusifolia, Senna occidentalis, Sesbania* berbacea, Croton, *Cuphea*, Cucuta, Fumaria, *Senecio, Galeopsis*, Scleranthus *annuus, Euphorbia*, Spergula, *Echinochloa colona, Potamogeton, Eupatorium capillifolium, Mollugo* verticillate, Convolvulaceae, *Galium aparine* and *Heteranthera limosa.*

3. The method of claim 1, wherein said perennial plant species are selected from the group consisting of Pseudoroegneria *spicata, Achnatherum thurberianum, Hesperostipa comata*, Pascopyrum *smithii*, Elymus *cinereus, Festuca idahoensis, Festuca altaica, Elymus elymoides, Poa secunda, Achnatherum hymenoides, Bouteloua gracilis, Agropyron* dasystachyum, *Elymus trachycaulus, Andropogon* gerardii, *Bromus marginatus, Calamovilfa longifolia, Elymus canadensis, Koelaria pyramidata, Poa secunda, Sporobolus* cryptandrus, *Stipa comata*, Stipa *viridula, Agropyron desertorum, Poa pratensis, Poa compressa, Dactylis glomerata, Phleum pratense, Bromus inermis, Lolium perenne, Festuca rubra, Festuca arundinacea, Thinopyrum intermedium, Thinopyrum ponticum, Festuca ovina, Psathyrostachys junceus, Bromus biebersteinii*, and *Agrostis* spp.

4. The method of claim 1, wherein the adjuvant is selected from a wetting agent, an activator, a crop oil concentrate, a buffer, a marker dye or a surfactant.

5. The method of claim 1, wherein the phytotoxic micronutrient and the synthetic herbicide is in a dry granular formulation or in a liquid formulation.

6. The method of claim 5, wherein the phytotoxic micronutrient and the synthetic herbicide is in a liquid formulation.

7. The method of claim 5, wherein the phytotoxic micronutrient and the synthetic herbicide is in a dry granular formulation.

8. The method of claim 1, wherein the phytotoxic micronutrient and the synthetic herbicide are applied simultaneously.

9. The method of claim 1, wherein the phytotoxic micronutrient and the synthetic herbicide are applied sequentially.

* * * * *